US012694817B1

(12) United States Patent
Wang et al.

(10) Patent No.: US 12,694,817 B1
(45) Date of Patent: Jul. 28, 2026

(54) DISPLAY PANEL, METHOD FOR DRIVING DISPLAY PANEL, AND DISPLAY APPARATUS

(71) Applicant: Xiamen Tianma Optoelectronics Co., Ltd., Xiamen (CN)

(72) Inventors: Yu Wang, Xiamen (CN); Wei Huang, Xiamen (CN); Dongquan Hou, Xiamen (CN); Xiaolin Wang, Xiamen (CN); Hongyuan Huang, Xiamen (CN); Na Zeng, Xiamen (CN); Youqin Yuan, Xiamen (CN)

(73) Assignee: Xiamen Tianma Optoelectronics Co., Ltd., Xiamen (CN)

( * ) Notice: Subject to any disclaimer, the term of this patent is extended or adjusted under 35 U.S.C. 154(b) by 0 days.

(21) Appl. No.: 19/203,161

(22) Filed: May 8, 2025

(30) Foreign Application Priority Data

Jan. 24, 2025 (CN) ......................... 202510120749.8

(51) Int. Cl.
*G09G 3/20* (2006.01)

(52) U.S. Cl.
CPC ... *G09G 3/2092* (2013.01); *G09G 2310/0286* (2013.01); *G09G 2320/0233* (2013.01)

(58) Field of Classification Search
CPC ......... G09G 3/2092; G09G 2310/0286; G09G 2320/0233
See application file for complete search history.

(56) References Cited

U.S. PATENT DOCUMENTS

| | | | | |
|---|---|---|---|---|
| 9,881,572 | B2 * | 1/2018 | Huang | G09G 3/3648 |
| 10,541,039 | B2 * | 1/2020 | Zhang | G09G 3/20 |
| 10,796,780 | B2 * | 10/2020 | Li | G11C 19/287 |
| 11,568,778 | B2 * | 1/2023 | Miao | G11C 19/28 |
| 11,574,575 | B2 * | 2/2023 | Zong | G09G 3/20 |
| 11,721,261 | B2 * | 8/2023 | Liu | G06F 3/04184 345/174 |
| 11,798,487 | B2 * | 10/2023 | Feng | H10K 59/1315 |
| 11,974,464 | B2 * | 4/2024 | Feng | G09G 3/3266 |
| 12,033,554 | B2 * | 7/2024 | Zong | G09G 3/20 |
| 12,380,866 | B2 * | 8/2025 | Liu | G09G 3/3677 |
| 12,437,693 | B2 * | 10/2025 | Miao | G09G 3/20 |
| 12,482,400 | B2 * | 11/2025 | Jiang | G09G 3/3677 |
| 12,488,757 | B2 * | 12/2025 | Kim | G09G 3/3291 |
| 12,614,508 | B2 * | 4/2026 | Zhang | G09G 3/32 |
| 2017/0032752 | A1 * | 2/2017 | Huang | G11C 19/28 |
| 2019/0051365 | A1 * | 2/2019 | Li | G09G 3/20 |
| 2019/0080779 | A1 * | 3/2019 | Zhang | G11C 19/28 |
| 2022/0101769 | A1 * | 3/2022 | Miao | G09G 3/20 |

(Continued)

FOREIGN PATENT DOCUMENTS

| | | | |
|---|---|---|---|
| CN | 104992661 | A | 10/2015 |
| CN | 105206243 | A | 12/2015 |
| CN | 111653228 | A | 9/2020 |

*Primary Examiner* — Michael J Jansen, II
(74) *Attorney, Agent, or Firm* — East IP P.C.

(57) ABSTRACT

The present application discloses a display panel, a method for driving the display panel, and a display apparatus. The display panel includes a driver circuit which includes a plurality of stages of shift register units; at least a part of the plurality of stages of shift register units are first-type shift register units which each include an input module, an output module, a signal input terminal, a first clock terminal, a first level terminal, a signal output terminal, a restoration module, and a restoration signal terminal.

17 Claims, 44 Drawing Sheets

(56) References Cited

U.S. PATENT DOCUMENTS

| | | | | |
|---|---|---|---|---|
| 2022/0238056 | A1* | 7/2022 | Liu | G06F 3/0443 |
| 2022/0270532 | A1* | 8/2022 | Zong | G09G 3/20 |
| 2022/0284843 | A1* | 9/2022 | Zong | G09G 3/20 |
| 2023/0162686 | A1* | 5/2023 | Feng | G09G 3/3266 345/204 |
| 2023/0345763 | A1* | 10/2023 | Feng | H10K 59/1213 |
| 2024/0161702 | A1* | 5/2024 | Kim | G09G 3/20 |
| 2024/0321172 | A1* | 9/2024 | Jiang | G09G 3/20 |
| 2024/0321229 | A1* | 9/2024 | Liu | G09G 3/3677 |
| 2024/0428717 | A1* | 12/2024 | Miao | G09G 3/20 |
| 2025/0124857 | A1* | 4/2025 | Zhang | G09G 3/32 |

* cited by examiner

DISPLAY PANEL, METHOD FOR DRIVING DISPLAY PANEL, AND DISPLAY APPARATUS

The present application claims priority to Chinese patent application No. 202510120749.8, entitled "DISPLAY PANEL, METHOD FOR DRIVING DISPLAY PANEL, AND DISPLAY APPARATUS", filed on Jan. 24, 2025, the entire contents of which are incorporated here by reference.

TECHNICAL FIELD

Embodiments of the present application relates to display technology, and in particular, to a display panel, a method for driving a display panel, and a display apparatus.

BACKGROUND

Display panels are widely used in electronic devices such as smart phones, tablet computers, and car navigators, and become indispensable in people's life and work. With the development of display technology, users' requirements on the display quality of the display panels are getting higher and higher.

A display panel includes a driver circuit and a plurality of pixels which are arranged in an array, and the gate driving signals which are provided by the driver circuit can carry out progressive scanning on the pixels, so that data signals can be written to the pixels in a one-to-one correspondence to control the display light-emitting brightness of the pixels, thereby controlling the display panel to present corresponding display images.

However, due to the effect of the structure of the driver circuit and the signals which are received by the driver circuit, the signal output terminal of the driver circuit has noise, thereby affecting the accuracy of the gate driving signals which are output by the driver circuit, and affecting the display effect of the display panel.

SUMMARY

The present application provides a display panel, a method for driving the display panel, and a display apparatus, so as to reduce the noise of signal output terminals of stages of shift register units in a driver circuit and to increase the accuracy of gate driving signals which are output by the stages of shift register units.

In a first aspect, the present application provides a display panel which includes a driver circuit, the driver circuit includes a plurality of stages of shift register units which each include an input module, an output module, a signal input terminal, a first clock terminal, a first level terminal, and a signal output terminal;

- in each of the shift register units, the input module is electrically connected to the signal input terminal and the output module, and the input module and the output module are electrically connected to a first node; the output module is electrically connected to the first node, the first clock terminal, and the signal output terminal; the first clock terminal is configured to receive a first clock signal; and the first level terminal is configured to receive a first level signal;
- at least a part of the shift register units are first-type shift register units which each further include a restoration module and a restoration signal terminal; in each of the first-type shift register units, the restoration module is electrically connected to the restoration signal terminal and the first level terminal, and the restoration module is further electrically connected to the first node and/or the signal output terminal; and the restoration signal terminal is configured to receive a restoration signal;
- the signal output terminal of the i-th stage of the shift register units is electrically connected to the signal input terminal of the (i+N)-th stage of the shift register units; and i and N are both positive integers;
- a plurality of stages of the first-type shift register units each include at least one stage of first shift register unit and at least one stage of second shift register unit; and
- the restoration signal of the second shift register unit includes a first active pulse, and at least within a time period in which the first active pulse of the restoration signal of the second shift register unit is, the restoration signal of the first shift register unit is at an inactive level; and a starting moment of the first active pulse is before a starting moment of a starting active pulse of the first clock signal of the at least one stage of first shift register unit.

In a second aspect, the present application further provides a display panel which includes a driver circuit, a first restoration signal line, and a second restoration signal line;

- the driver circuit includes a plurality of stages of shift register units which include an input module, an output module, a signal input terminal, a first clock terminal, a first level terminal, and a signal output terminal;
- in each of the shift register units, the input module is electrically connected to the signal input terminal and the output module, and the input module and the output module are electrically connected to a first node; the output module is electrically connected to the first node, the first clock terminal, and the signal output terminal; the first level terminal is configured to receive a first level signal; and the first clock terminal is configured to receive a first clock signal;
- at least a part of the shift register units are first-type shift register units which each further include a restoration module and a restoration signal terminal; in each of the first-type shift register units, the restoration module is electrically connected to the restoration signal terminal and the first level terminal, and the restoration module is further electrically connected to the first node and/or the signal output terminal; and the restoration signal terminal is configured to receive a restoration signal;
- a plurality of stages of the first-type shift register units include at least one stage of first shift register unit and at least one stage of second shift register unit; the restoration signal terminal of the first shift register unit is electrically connected to the first restoration signal line; and the restoration signal terminal of the second shift register unit is electrically connected to the second restoration signal line; and
- the first restoration signal line and the second restoration signal line are insulated from each other.

In a third aspect, the present application further provides a method for driving a display panel, the display panel includes a driver circuit, the driver circuit includes a plurality of stages of shift register units and is configured to receive a start control signal, a restoration signal, and a clock signal; and an operation process of the display panel includes a frame period;

- the method includes: in the frame period, the start control signal includes a start control pulse, the restoration signal includes a first active pulse, and the clock signal includes a starting active pulse;

the first active pulse is the same as the start control pulse; and a starting moment of the starting active pulse is later than a starting moment of the start control pulse.

In a fourth aspect, the present application further provides a display apparatus which includes the above display panel.

DETAILED DESCRIPTION

Figure 1:
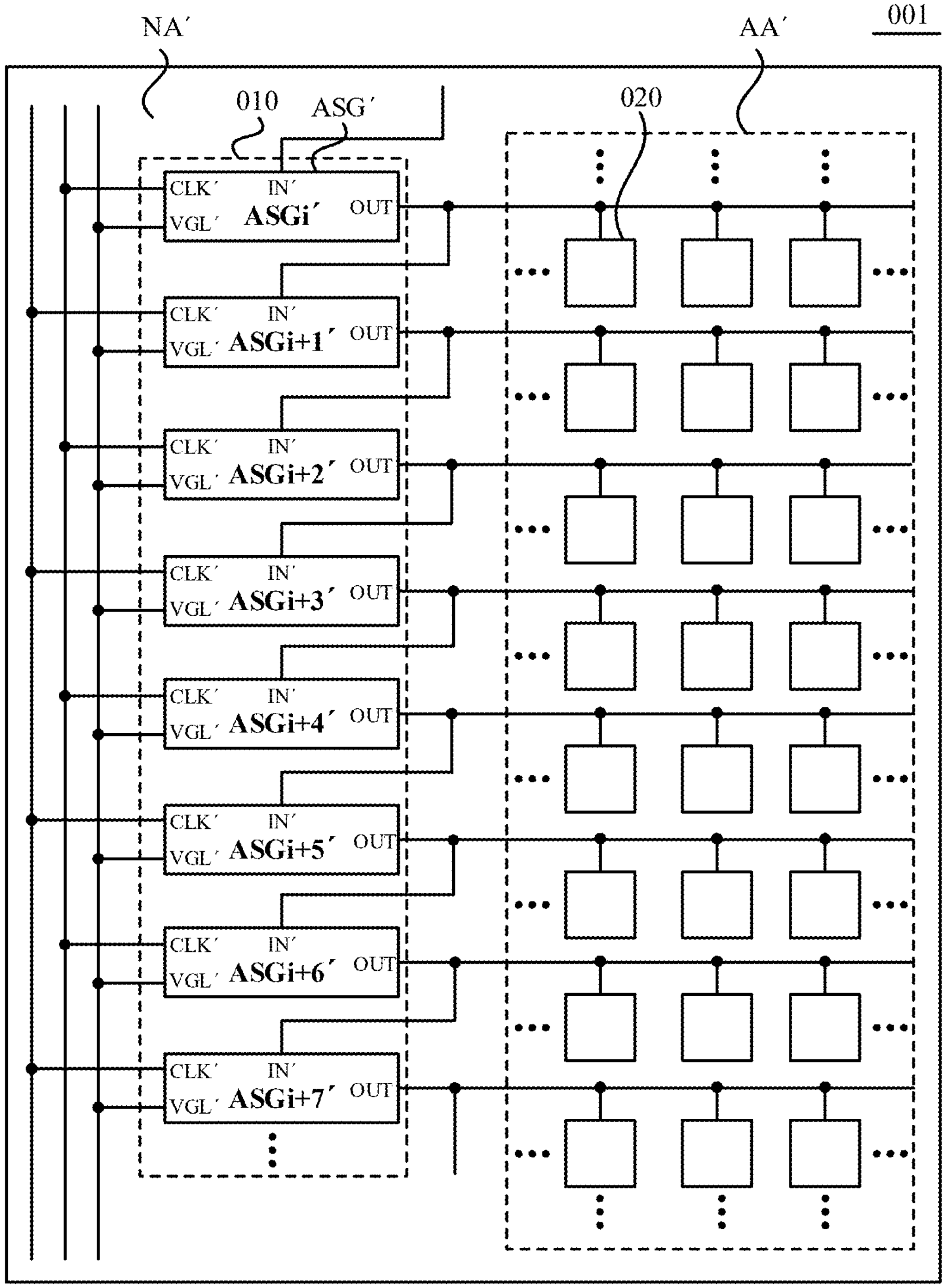
FIG. 1 is a schematic structural view of a display panel in the related art.

The present application will be described in further detail below with reference to the drawings and embodiments. It may be understood that the specific embodiments described herein are merely intended to explain the present application and do not limit the present application. In addition, it should be noted that, for ease of description, only some, but not all, of the structures related to the present application are shown in the drawings. The embodiments of the present application and the features of the embodiments may be combined with each other without conflict of technical features.

It should be noted that the term "electrically connected" mentioned in the present application may be understood as "directly electrically connected" or "indirectly electrically connected"; for example, device A is electrically connected to device B may mean that device A is directly electrically connected to device B or device A is electrically connected to device B through device C.

FIG. 1 is a schematic structural view of a display panel in the related art; as shown in FIG. 1, in the related art, the display panel 001 may include the display area AA' and the non-display area NA' which at least partially surrounds the display area AA', the display area AA' may be provided with a plurality of pixels 020 which are arranged in an array, and the non-display area NA' is provided with the driver circuit 010. The driver circuit 010 may include a plurality of stages of shift register units ASG' (ASGi', ASGi+1', ASGi+2', ASGi+3', ASGi+4', ASGi+5', ASGi+6', ASGi+7') in a cascaded connection, the shift register units ASG' each include the signal input terminal IN', the first clock terminal CLK', the first level terminal VGL', and the signal output terminal OUT', and the signal output terminals of the shift register units ASG' are electrically connected to rows of pixels 020, respectively, to provide the gate driving signals for the rows of pixels 020. In the same shift register unit ASG', the input signal Vin' of the signal input terminal IN', the first clock signal CK' of the first clock terminal CLK', and the first level signal Vgl' of the first level terminal VGL' can control the gate driving signal Gout' which is output by the signal output terminal OUT'; for example, when the first clock signal CK' changes to the active level for the first time after the level of the input signal Vin' changes to the active level, the signal output terminal OUT' can be controlled to output the active level of the gate driving signal Gout'; when the first clock signal CK' changes to the inactive level for the first time after the level of the input signal Vin' changes to the inactive level, the signal output terminal OUT' can be controlled to output the inactive level of the gate driving signal Gout'.

The gate driving signal Goutx' which is output by the x-th stage of shift register unit ASGx' may be used as the input signal Viny' of the y-th stage of shift register unit ASGy', that is, the signal output terminal OUT' of the x-th stage of shift register unit ASGx' is electrically connected to the signal input terminal IN' of the y-th stage of shift register unit ASGy'; for example, the signal output terminal OUT' of the i-th stage of shift register unit ASGi' is electrically connected to the signal input terminal IN' of the (i+1)-th stage of shift register unit ASGi+1', the signal output terminal OUT' of the (i+1)-th stage of shift register unit ASGi+1' is electrically connected to the signal input terminal IN' of the (i+2)-th stage of shift register unit ASGi+2', and similarly, the signal output terminal of the previous stage of shift register unit is electrically connected to the signal input terminal of the next stage of shift register unit, so that the next stage of shift register unit can control the gate driving signal Gout' which is output by the next stage of shift register unit based on the gate driving signal Gout' which is output by the previous stage of shift register unit and the first clock signal CK' and the first level signal Vgl' which are received by the previous stage of shift register unit. The signal input terminal IN' of the first stage of shift register unit ASG1' may be configured to receive the start control signal, so that the first stage of shift register unit ASG1' can output the corresponding gate driving signal Gout1' under the control of the start control signal STV'.

Before the control driver circuit outputs the active level of the gate driving signal Gout', the start control pulse of the start control signal STV' may be provided first to the signal input terminal IN' of the first stage of shift register unit ASG1' to charge the node in the first stage of shift register unit ASG1'; when the signal of the node in the first stage of shift register unit ASG1' changes to the active level, the active level of the first clock signal CK' may be provided for the first stage of shift register unit ASG1', so that the first stage of shift register unit ASG1' can output the active level of the gate driving signal Gout1'.

Figure 2:
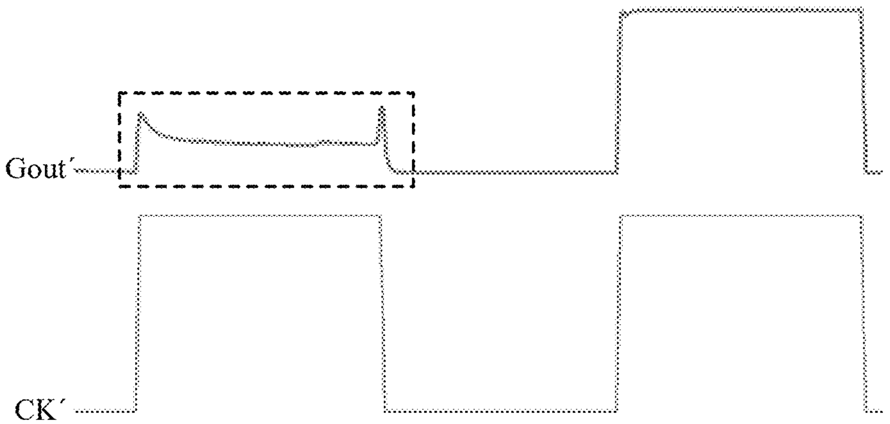
FIG. 2 is a driving time sequence chart of a shift register unit in the related art.

However, since when the first clock signal CK' of the first stage of shift register unit ASG1' jumps to the active level for the first time, the corresponding signals have not been written to the nodes of other stages of shift register units ASG', and since there is the parasitic capacitance among the clock signal line which transmits the first clock signal CK' and other stages of shift register units ASG', at least a part of the shift register units ASG' are affected by the jumping of the first clock signal CK' which is received by the first stage of shift register unit ASG1' and output the gate driving signal Gout' (as shown in FIG. 2) which has the same jumping trend as that of the first clock signal CK', that is, the gate driving signal Gout' contains the noise pulse as shown by the pulse in the dashed box in the drawing, and the noise interference is particularly great on the rising edge and the falling edge of the first clock signal CK', so that the part of the shift register units ASG' cannot accurately output the gate driving signal and cannot accurately carry out progressive scanning on the pixels 020 in the display area AA', thereby affecting the display effect of the display panel 001.

In order to solve the above technical problem, embodiments of the present application provide a display panel which includes the driver circuit; the driver circuit includes a plurality of stages of shift register units each including the input module, the output module, the signal input terminal, the first clock terminal, the first level terminal, and the signal output terminal; in each of the shift register units, the input module is electrically connected to the signal input terminal and the output module, and the input module and the output module are electrically connected to the first node; the output module is electrically connected to the first node, the first clock terminal, and the signal output terminal; the first level terminal is configured to receive the first level signal; and the first clock terminal is configured to receive the first clock signal.

At least a part of the shift register units are the first-type shift register units; the first-type shift register units each further include the restoration module and the restoration signal terminal; in each of the first-type shift register units, the restoration module is electrically connected to the restoration signal terminal, the first node, and the signal output terminal; the restoration signal terminal is configured to receive the restoration signal; the signal output terminal of the i-th stage of shift register unit is electrically connected to the signal input terminal of the (i+N)-th stage of shift register unit, and i and N are both positive integers; a plurality of stages of first-type shift register units include at least one stage of first shift register unit and at least one stage of second shift register unit; the restoration signal of the first shift register unit is at the inactive level; the restoration signal of the second shift register unit includes the first active pulse; the starting moment of the first active pulse is before the starting moment of the starting active pulse of the first clock signal of the at least one stage of first shift register unit.

With the above technical solution, in each of the first-type shift register units, the input module and the restoration module are used for jointly controlling the signal of the first node, so that the signal of the first node and the first clock signal jointly control the gate driving signal provided by the output module to the signal output terminal, and the output module and the restoration module are used for jointly controlling the gate driving signal which is output by the signal output terminal to ensure that the signal output terminal can accurately output the gate driving signal; further, the plurality of stages of first-type shift register units include the at least one stage of first shift register unit and the at least one stage of second shift register unit, and the restoration signal of the restoration signal terminal of the first shift register unit is maintained at the inactive level, and the restoration signal of the restoration signal terminal of the second shift register unit includes the first active pulse, and the starting moment of the first active pulse is provided before the starting moment of the starting active pulse of the first clock signal of the at least one stage of first shift register unit, so that the restoration module in the first shift register unit does not affect the signal of the first node and the signal of the signal output terminal in the first shift register unit under the control of the inactive level of the restoration signal to ensure that the first shift register unit can control the signal output terminal thereof to accurately output the active level of the gate driving signal when receiving the active pulse of the first clock signal; before the first shift register unit receives the starting active pulse of the first clock signal, the restoration module in the second shift register unit can pull down the signal of the first node and the signal of the signal output terminal under the control of the first active pulse of the restoration signal which is received by the restoration module and the first level signal of the first level terminal to reduce the interference in the signal of the first node and the gate driving signal which is output by the signal output terminal in the second shift register unit due to the jumping of the first clock signal which is received by the first shift register unit, reduce the noise of the signal output terminal of the second shift register unit, and improve the accuracy of the gate driving signal which is output by the second shift register unit, thereby improving the display effect of the display panel.

The above is the core idea of the present application, and based on the embodiments of the present application, all other embodiments obtained by those ordinary skilled in the art without any creative work shall fall within the protection scope of the present application. The technical solutions in the embodiments of the present application will be described clearly and completely below with reference to the drawings of the embodiments of the present application.

The display panel according to the embodiments of the present application include, but is not limited to, a display panels such as a liquid crystal display (LCD), a organic light-emitting display (OLED), or a micro light-emitting diode display (Micro LED).

Figure 3:
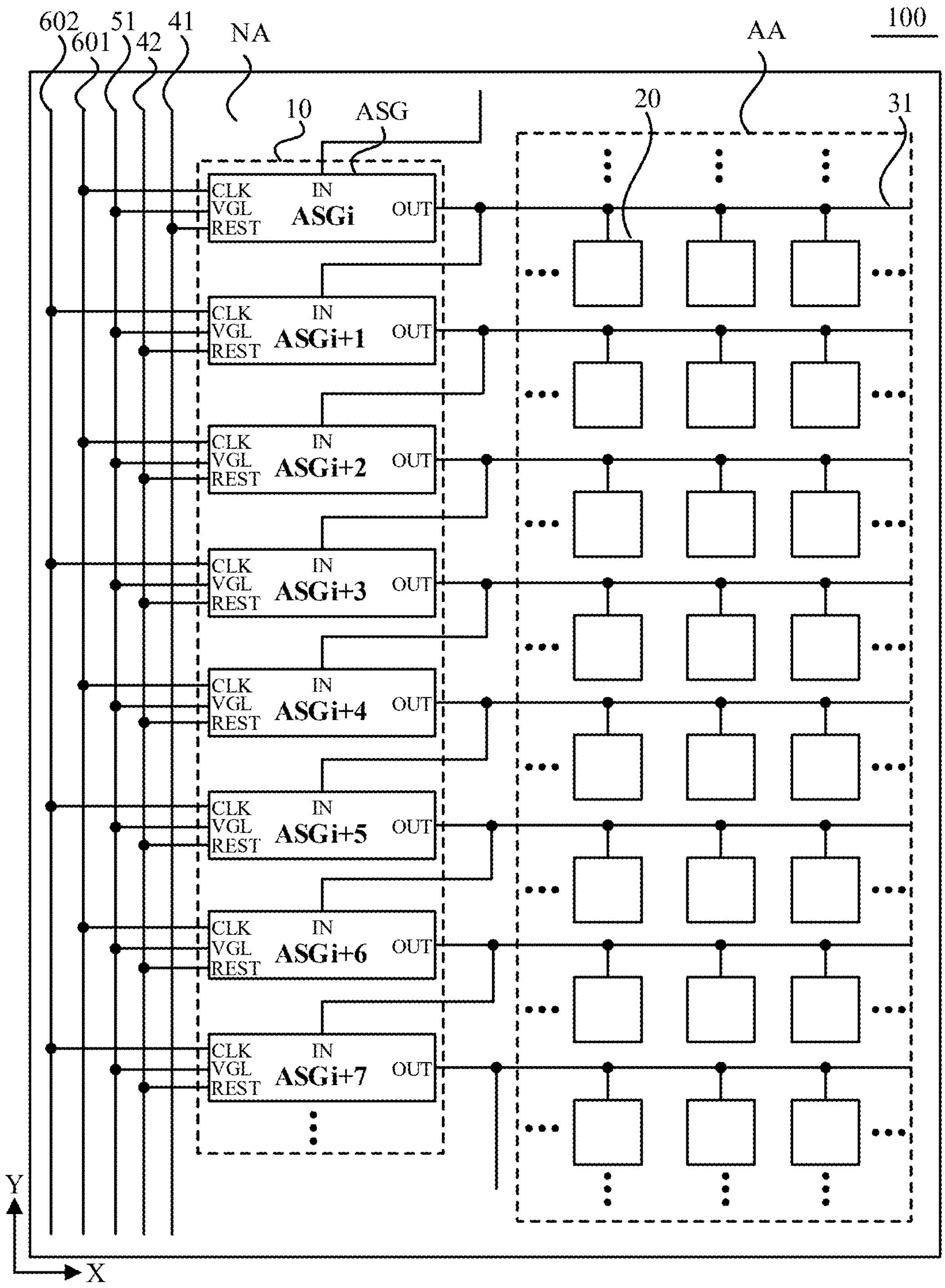
FIG. 3 is a schematic structural view of a display panel according to embodiments of the present application.
Figure 4:
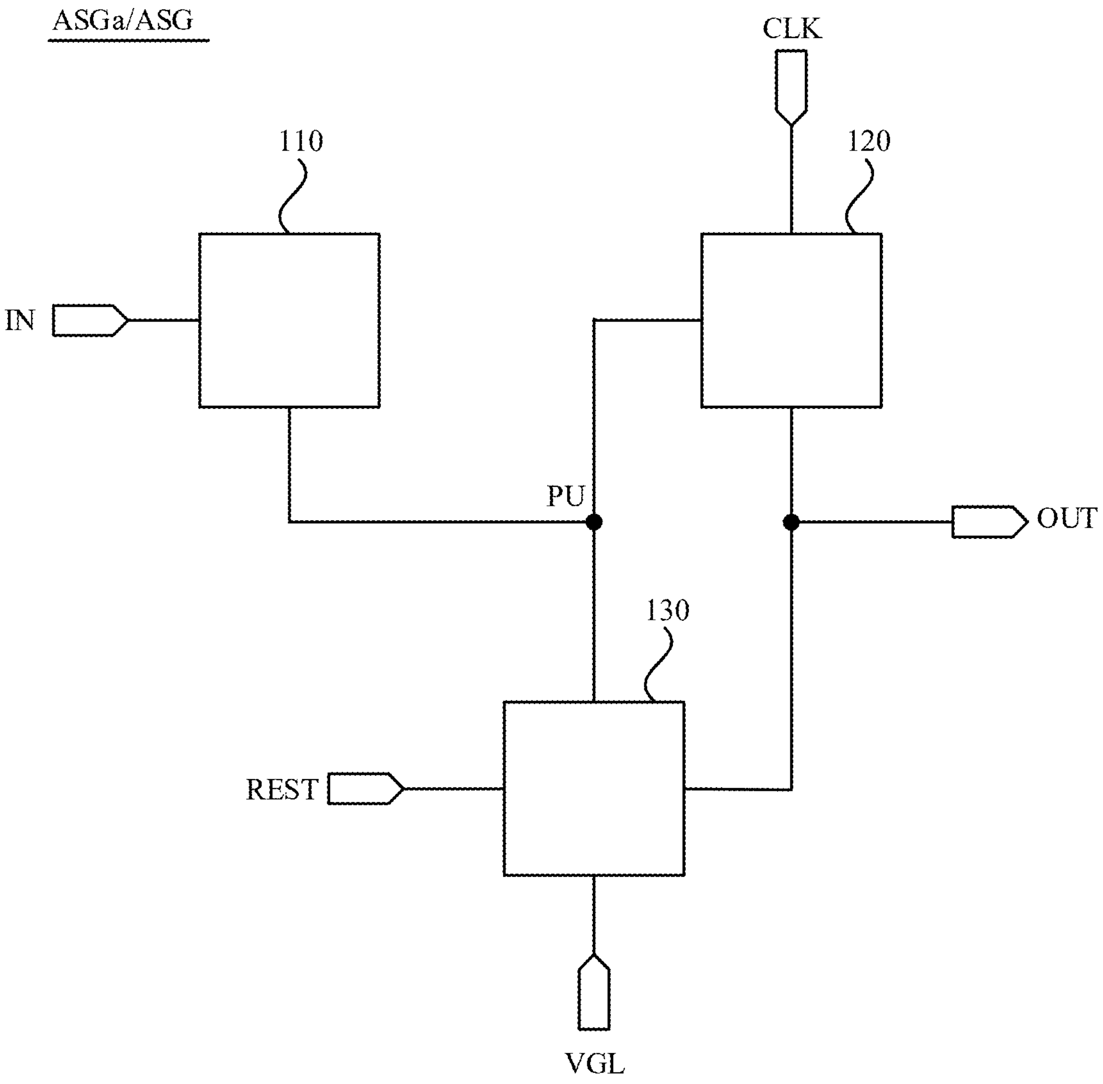
FIG. 4 is a schematic structural view of a shift register unit according to embodiments of the present application.

FIG. 3 is a schematic structural view of a display panel according to embodiments of the present application, and FIG. 4 is a schematic structural view of a shift register unit according to embodiments of the present application; referring to FIG. 3 and FIG. 4, the display panel 100 includes the driver circuit 10 which includes a plurality of shift register units ASG in a cascaded connection; the shift register units ASG each include the input module 110, the output module 120, the signal input terminal IN, the first clock terminal CLK, the first level terminal VGL, and the signal output terminal OUT; in each of the shift register units ASG, the input module 110 is electrically connected to the signal input terminal IN and the output module 120, and the input module 110 and the output module 120 are electrically connected to the first node PU; the output module 120 is electrically connected to the first node PU, the first clock terminal CLK and the signal output terminal OUT; and the first clock terminal CLK is configured to receive the first clock signal CK, and the first level terminal VGL is configured to receive the first level signal Vgl.

In an exemplary embodiment, the input module 110 can control the signal of the first node PU based on the input signal Vin of the signal input terminal IN. For example, when the input signal Vin of the signal input terminal IN is at the active level, the input module 110 can control the signal of the first node PU to be at the active level; and when the input signal Vin of the signal input terminal IN is at the inactive level, the input module 110 no longer inputs the signal to the first node PU, that is, the potential of the first node PU under this condition is not affected by the input module 110. The output module 120 can control the ON path between the first clock terminal CLK and the signal output terminal OUT under the control of the signal of the first node PU to control the duration the signal output terminal OUT outputs the first clock signal CK as the gate driving signal Gout. For example, when the signal of the first node PU is at the active level, the output module 120 may be in the ON state, and the ON path between the first clock terminal CLK and the signal output terminal OUT is formed, so that the first clock signal CK of the first clock terminal CLK can be transmitted to the signal output terminal OUT, and the gate driving signal Gout which is output by the signal output terminal OUT is consistent with the first clock signal CLK; or, when the signal of the first node PU is at the inactive level, the output module 120 is in the OFF state, so that the ON path between the first clock terminal CLK and the signal output terminal OUT cannot be formed, and the first clock signal CK cannot be transmitted to the signal output terminal OUT.

Still referring to FIG. 3 and FIG. 4, at least a part of the shift register units ASG are the first-type shift register units ASGa; the first-type shift register units ASGa each may further include the restoration module 130 and the restoration signal terminal REST; in each of the first-type shift register units ASGa, the restoration module 130 is electrically connected to the restoration signal terminal REST and the first level terminal VGL and may further be electrically connected to the first node PU and/or the signal output terminal OUT; the restoration signal terminal REST is configured to receive the restoration signal Vrest; the restoration module 130 can control the signal of the first node PU and/or the gate driving signal Gout which is output by the signal output terminal OUT based on the restoration signal Vrest and the first level signal Vgl. For example, when the restoration signal Vrest is at the active level, the restoration module 130 can transmit the first level signal Vgl to the first node PU and the signal output terminal OUT, and the signal of the first node PU and the gate driving signal Gout of the signal output terminal OUT may be both consistent with the first level signal Vgl; and when the restoration signal Vrest is at the inactive level, the restoration module 130 cannot transmit the first level signal Vgl to the first node PU, that is, the potential of the first node PU under this condition is not affected by the restoration module 130. In this way, in each of the first-type shift register units ASGa, the restoration module 130 and the input module 110 jointly control the signal of the first node PU to ensure that the signal of the first node PU can accurately control the output module 120 to be turned on or turned off; in addition, the output module 120 and the restoration module 130 are used for jointly controlling the gate driving signal Gout which is output by the signal output terminal OUT, which is beneficial to increasing the output accuracy of the gate driving signal Gout.

In each of the first-type shift register units ASGa according to the embodiments of the present application, the restoration module 130 may be electrically connected only to the first node PU or the signal output terminal OUT, or the restoration module 130 may be electrically connected to both the first node PU and the signal output terminal OUT at the same time, which is not specifically limited by the embodiments of the present application under a condition that the accuracy of the gate driving signal Gout which is output by the shift register unit can be increased. For the convenience of description, and without any particular limitation, the example in which the restoration module 130 is electrically connected to the first node PU and the signal output terminal OUT at the same time is given in the embodiments of the present application to exemplarily illustrate the technical solutions of the embodiments of the present application.

It may be understood that at least a part of the shift register units ASG are the first-type shift register units ASGa, that is, a part of the shift register units ASG are the first-type shift register units ASGa or the shift register units ASG are all the first-type shift register units ASGa, which may be specifically provided based on actual needs and is not specifically limited by the embodiments of the present application. For the convenience of description, and without any particular limitation, the example in which the shift register units ASG are all the first-type shift register units ASGa is given in the embodiments of the present application to illustrate the technical solutions of the embodiments of the present application.

It may also be understood that the first clock signal CK may change alternately between the active level and the inactive level, and one of the active level and the inactive level may be the high level, and the other may be the low level, which may be specifically provided based on actual needs; the first level signal Vgl may be continuously at the high level or continuously at the low level, and when the first level signal Vgl is transmitted to the first node PU, the signal of the first node PU may control the output module 120 to be in the OFF state, and thus the first level signal Vgl is at the inactive level which controls the output module 120 to be in the OFF state and may be provided based on the specific structure of the output module 120; the restoration signal Vrest may include the active level and/or the inactive level, the active level of the restoration signal Vrest may be the high level, and the inactive level of the restoration signal Vrest may be the low level, or, the active level of the restoration signal Vrest may be the low level, and the inactive level of the restoration signal Vrest may be the high level; and the active level of the restoration signal Vrest may control the restoration module 130 to be in the ON state, and the inactive level of the restoration signal Vrest may control the restoration module 130 to be in the OFF state, which is not specifically limited by the embodiments of the present application. When the transistors in the shift register units are the N-type transistors, the active level is the high level which controls the N-type transistors to be turned on, and the inactive level is the low level which controls the N-type transistors to be turned off (or cut off); and when the transistors in the shift register units are the P-type transistors, the active level is the low level which controls the P-type transistors to be turned on, and the inactive level is the high level which controls the P-type transistors to be turned off (or cut off). For the convenience of description, and without any particular limitation, the example in which the transistors in the shift register units are the N-type transistors, the active level is the high level, and the ineffective level is the low level is given in the embodiments of the present application to exemplarily illustrate the technical solutions of the embodiments of the present application.

Still referring to FIG. 3, the signal output terminal OUT of the i-th stage of shift register unit ASGi is electrically connected to the signal input terminal IN of the (i+N)-th stage of shift register unit ASGi+1, so that the gate driving signal Gout which is output by the signal output terminal OUT of the i-th stage of shift register unit ASGi may be used as the input signal Vin which is received by the signal input terminal IN of the (i+N)-th stage of shift register unit ASGi+N, and the (i+N)-th stage of shift register unit ASGi+N can output the corresponding gate driving signal Gouti+N under the control of the gate driving signal Gouti which is output by the i-th stage of shift register unit ASGi, ensuring that the active levels of the gate driving signals Gout which are output by the stages of shift register units ASG can be shifted in sequence. i and N are both positive integers, that is, i may be any integer such as 1, 2, 3 . . . , and the value of N may be any integer of 1, 2, 3 . . . .

Figure 5:
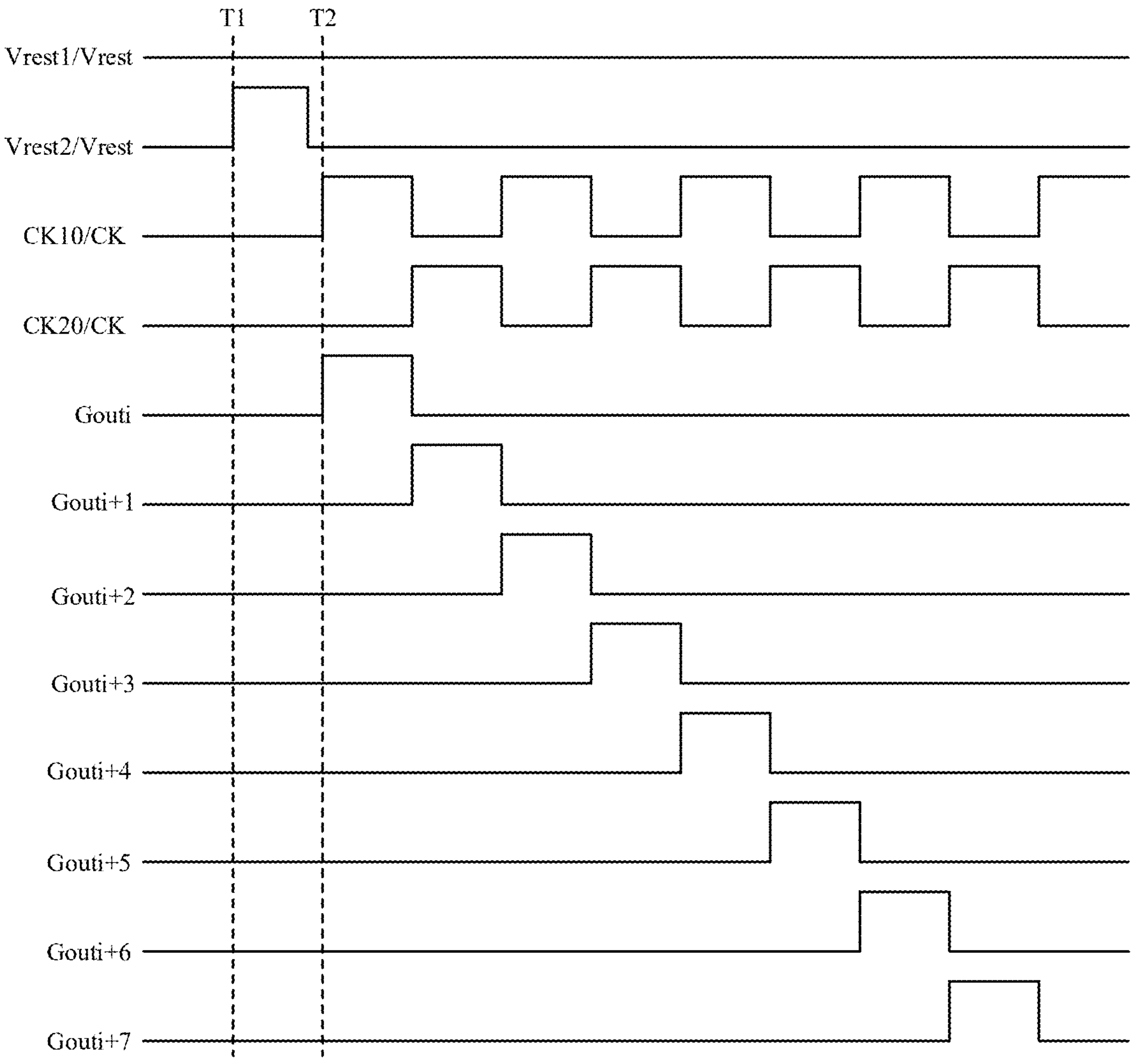
FIG. 5 is a driving time sequence chart of a display panel according to embodiments of the present application.

In an example, FIG. 5 is a driving time sequence chart of a display panel according to embodiments of the present application; referring to FIG. 3 and FIG. 5, when N is equal to 1, the signal output terminal OUT of the i-th stage of shift register unit ASGi may be electrically connected to the signal input terminal IN of the (i+1)-th stage of shift register unit ASGi+1, the signal output terminal OUT of the (i+1)-th stage of shift register unit ASGi+1 may be electrically connected to the signal input terminal IN of the (i+2)-th stage of shift register unit ASGi+2, and similarly, the signal output terminal OUT of the previous stage of shift register unit ASG may be electrically connected to the signal input terminal of the next stage of shift register unit ASG, so that the gate driving signal Gout which is output by the previous stage of shift register unit ASG and the first clock signal CK, the restoration signal Vrest, and the first level signal Vgl which are received by the next stage of shift register unit ASG can jointly control the gate driving signal Gout which is output by the next stage of shift register unit ASG, thereby ensuring that the active levels of the gate driving signals Gout (Gouti, Gouti+1, Gouti+2, Gouti+3, Gouti+4, Gouti+5, Gouti+6, Gouti+7) which are output by the stages of shift register units ASG can be shifted in sequence.

It should be noted that, when N is equal to 1, the cascaded connection manner of the stages of shift register units is exemplarily illustrated above only as an example; the cascaded connection manner of the shift register units is not limited in the embodiments of the present application, and the value of N may be any positive integer, which may be specifically provided based on actual needs and is not specifically limited in the embodiments of the present application.

Figure 6:
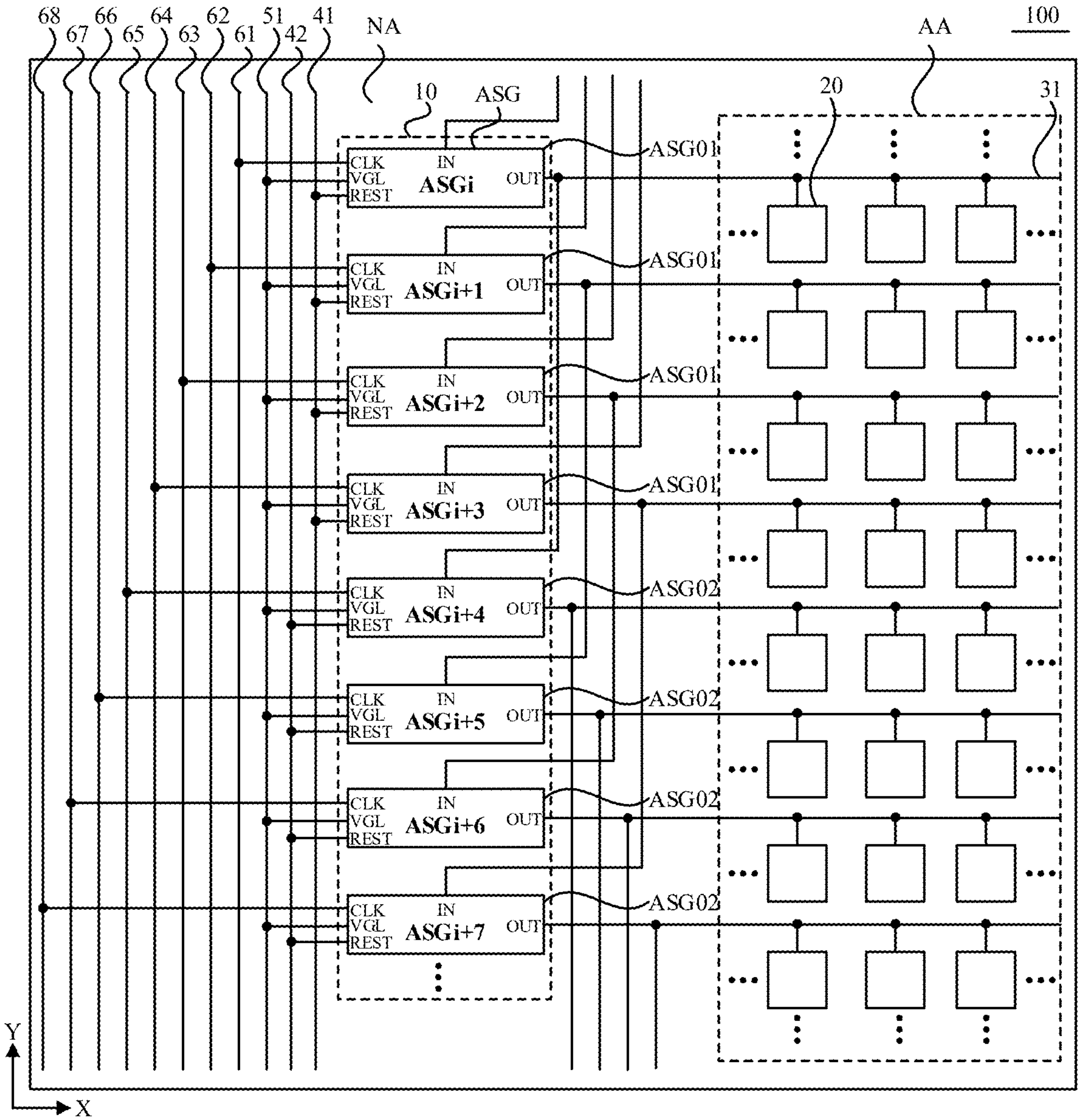
FIG. 6 is a schematic structural view of another display panel according to embodiments of the present application.
Figure 7:
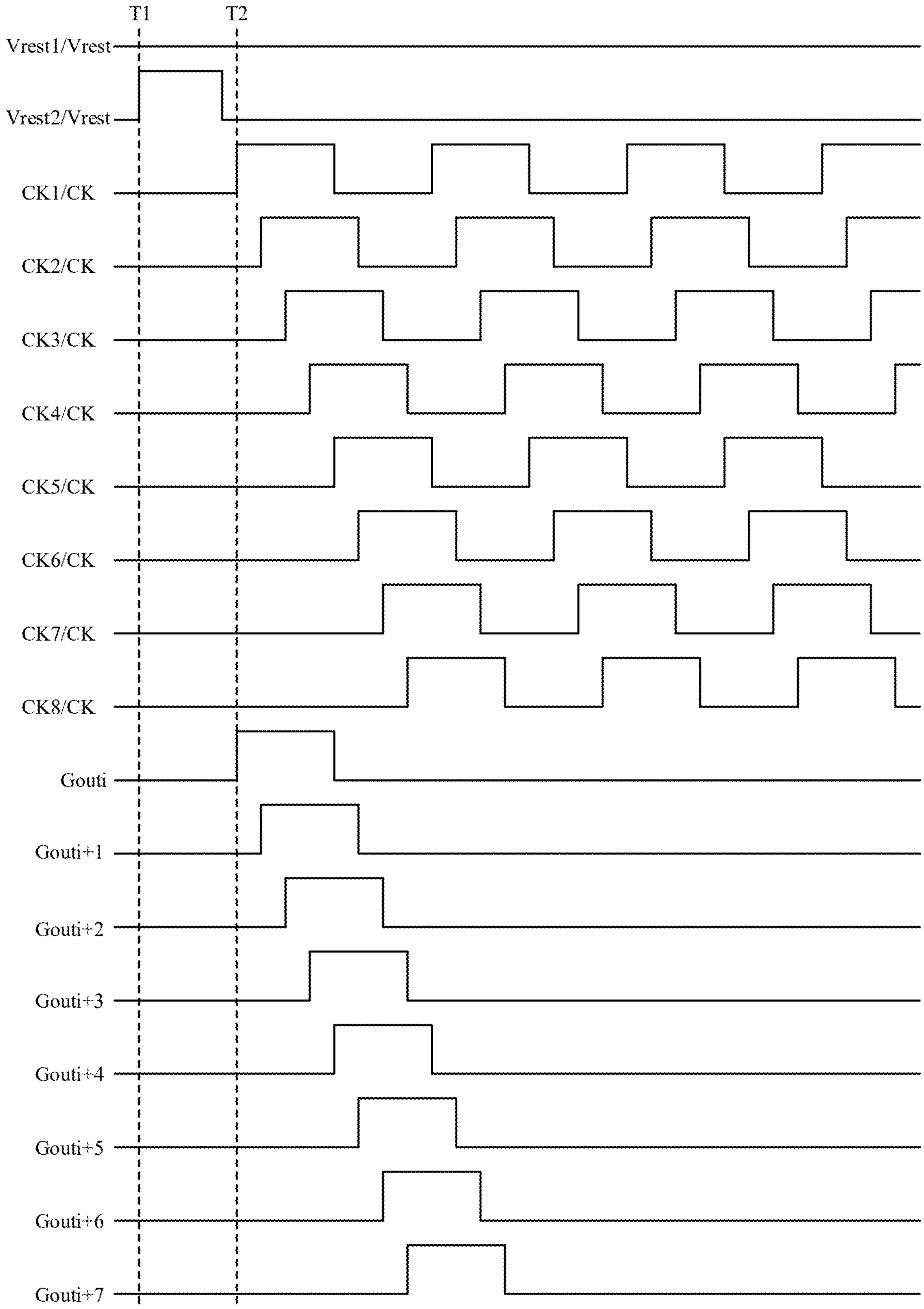
FIG. 7 is a driving time sequence chart of another display panel according to embodiments of the present application.

As an example, referring to FIG. 6 and FIG. 7, when N is equal to 4, the signal output terminal OUT of the i-th stage of shift register unit ASGi may be electrically connected to the signal input terminal of the (i+4)-th stage of shift register unit ASGi+4, the signal output terminal OUT of the (i+1)-th stage of shift register unit ASGi+1 may be electrically connected to the signal input terminal of the (i+5)-th stage of shift register unit ASGi+5, and the signal output terminal OUT of the (i+2)-th stage of shift register unit ASGi+2 may be electrically connected to the signal input terminal of the (i+6)-th stage of shift register unit ASGi+6, and the signal output terminal OUT of the (i+3)-th stage of shift register unit ASGi+3 may be electrically connected to the signal input terminal of the (i+7)-th stage of shift register unit ASGi+7; in this way, the gate driving signal Gouti which is output by the i-th stage of shift register unit ASGi and the first clock signal CK and the first level signal Vgl which are received by the (i+4)-th stage of shift register unit ASGi+4 control the (i+4)-th stage of shift register unit ASGi+4 to output the gate driving signal Gouti+4, so as to ensure that the starting moments of the active levels of the gate driving signals Gout (Gouti, Gouti+1, Gouti+2, Gouti+3, Gouti+4, Gouti+5, Gouti+6, Gouti+7) which are output by the stages of shift register units can be shifted in sequence.

For the convenience of description, and without any particular limitation, the example in which N is equal to 4 is given in the embodiments of the present application to exemplarily illustrate the technical solutions of the embodiments of the present application.

The signal output terminal OUT of the shift register unit ASGi may be understood as the gate driving signal output terminal, and the gate driving signal output terminal OUT is electrically connected to the gate signal line 31 and the signal input terminal IN of the shift register unit ASGi+N; or, the signal output terminal OUT of the shift register unit ASGi may be understood as the cascaded signal output terminal OUT, that is, the shift register unit ASGi includes the cascaded signal output terminal OUT and the gate driving signal output terminal, the cascaded signal output terminal OUT of the shift register unit ASGi is electrically connected to the signal input terminal IN of the shift register unit ASGi+N, and the gate driving signal output terminal of the shift register unit ASGi is electrically connected to the gate signal line 31.

In an optional embodiment, referring to FIG. 2, FIG. 6, and FIG. 7, a plurality of stages of first-type shift register units ASGa include at least one stage of first shift register unit ASG01 and at least one stage of second shift register unit ASG02; the restoration signal Vrest2 of the second shift register unit ASG02 includes the first active pulse, and at least within the time period in which the first active pulse of the restoration signal Vrest2 of the second shift register unit ASG02 is, the restoration signal Vrest1 of the first shift register unit ASG01 is at the inactive level; and the starting moment T1 of the first active pulse is before the starting moment T2 of the starting active pulse of the first clock signal CK of the at least one stage first shift register unit ASG01.

The display images of the display panel are refreshed in the certain refresh frequency during the operation process, and the duration from the starting moment of the previous image refresh to the starting moment of the next image refresh is the duration which is required by the display panel to display one image frame, that is, the frame period; in an example, within the frame period, the driver circuit of the display panel provides the gate driving signals in sequence to the gate signal lines, and writes the data signals to the pixels row by row in coordination with the data signal lines. Within the frame period, the first clock signal may include a plurality of active pulses, that is, the first clock signal includes a plurality of active level durations, and the starting active pulse of the first clock signal is the first active level duration of the first clock signal within the frame period. The plurality of active pulses of the first clock signal may be provided periodically.

It may also be understood that the plurality of stages of first-type shift register units ASGa include the at least one stage of first shift register unit ASG01, that is, the plurality of stages of first-type shift register units ASGa may include one or more stages of first shift register units ASG01; similarly, the plurality of stages of first-type shift register units ASGa further include the at least one stage of second shift register unit ASG02, that is, the plurality of stages of first-type shift register units ASGa may include one or more stages of second shift register units ASG02. In an exemplary embodiment, as shown in FIG. 3, the i-th stage of shift register unit ASGi may be the first shift register unit ASG01, and the (i+1)-th stage of shift register unit ASGi+1 to the (i+7)-th stage of shift register unit are all the second shift register units ASG02. In another exemplary embodiment, as shown in FIG. 6, the i-th stage of shift register unit ASGi to the (i+3)-th stage of shift register unit ASGi+3 may be the first shift register units ASG01, and the (i+4)-th stage of shift register unit ASGi+4 to the (i+7)-th stage of shift register unit may be all the second shift register units ASG02.

In an example, taking the display panel shown in FIG. 6 as an example, referring to FIG. 2, FIG. 6, and FIG. 7, since the signal output terminal Gout of the i-th stage of shift register unit ASGi is electrically connected to the signal input terminal IN of the (i+4)-th stage of shift register unit ASGi+4, in the i-th stage of shift register unit ASGi, when the signal of the first node PU is at the active level and the first clock signal CK1 is the active pulse, the signal output terminal OUT of the i-th stage of shift register unit ASGi can output the active level of the gate driving signal Gouti; only when the (i+4)-th stage of shift register unit ASGi+4 receives the active level of the gate driving signal Gouti which is output by the i-th stage of shift register unit ASGi, the (i+4)-th stage of shift register unit ASGi+4 can control the input module 110 of the (i+4)-th stage of shift register unit ASGi+4 to charge the first node PU of the (i+4)-th stage of shift register unit ASGi+4, and the first clock signal CK5 which is received by the (i+4)-th stage of shift register unit ASGi+4 changes to the active pulse, so that the signal output terminal OUT of the (i+4)-th stage of shift register unit ASGi+4 outputs the active level of the gate driving signal Gouti+4.

Referring to the schematic structural views of the shift register units, the shift register units each may further include the pull-down module 140 and the pull-down control module 150; the pull-down module 140 may control the signal of the first node PU based on the signal of the second node PD and the first level signal Vgl of the first level terminal VGL, the pull-down control module 150 may control the signal of the second node PD based on the signal of the first node PU and the first level signal Vgl of the first level terminal VGL, and the first node PU and the second node PD restrict one another. If the first-type shift register units ASGa are not provided with the restoration modules, before the first clock signal CK1 of the i-th stage of shift register unit ASGi changes to the active pulse for the first time, the second nodes PD of the stages of first-type shift register units ASG are not at the active level; when the first clock signal CK1 of the i-th stage of shift register unit ASGi changes to the active pulse for the first time, the first nodes PU of the stages of first-type shift register units ASG are interfered by the starting active pulse of the first clock signal CK1 and are not at the inactive level; and before the shift register units normally output the gate driving signals, the starting active pulse of the incoming first clock signal CK1 easily causes a relatively great noise output, resulting in a reliance risk on the gate driving signals which are output by the driver circuit.

It may be understood that the (i+1)-th shift register unit ASGi+1, the (i+2)-th shift register unit ASGi+2, and the (i+3)-th shift register unit ASGi+3 have operation processes which are similar to that of the i-th shift register unit ASGi, and problems in the (i+5)-th shift register unit ASGi+5, the (i+6)-th shift register unit ASGi+6, and the (i+7)-th shift register unit ASGi+7 are similar to that in the (i+4)-th shift register unit ASGi+4, thus for common problems, reference may be made to the above description, which is not repeated here.

Still referring to FIG. 2, FIG. 6, and FIG. 7, in the embodiments of the present application, the first-type shift register units ASGa each are further provided with the restoration module 130 and the restoration signal terminal REST, and the restoration module 130 can control the signal of the first node PU under the control of the restoration signal Vrest of the restoration signal terminal REST and the first level signal Vgl of the first level terminal VGL.

For the first shift register units ASG01 in the first-type shift register units ASGa, such as the i-th stage of shift register unit ASGi, the (i+1)-th stage of shift register unit ASGi+1, the (i+2)-th stage of shift register unit ASGi+2, and the (i+3)-th stage of shift register unit ASGi+3, the restoration signal Vrest1 of the restoration signal terminals REST thereof is at the inactive level, the restoration signal terminals REST control the restoration modules 130 to be in the OFF state, and the restoration modules 130 cannot transmit the first level signal Vgl of the first level terminals VGL to the first nodes PU and/or the signal output terminals OUT, so that the signals of the first nodes PU can be consistent with the signals which are provided by the input modules 110; the output modules 120 of the first shift register units ASG01 can turned on under the control of the signals which are provided by the input modules 110 thereof to the first nodes PU and provide the first clock signals CK which are received by the first clock terminals CLK thereof to the signal output terminals OUT, so that the gate driving signals Gout which are output by the signal output terminals OUT can be consistent with the first clock signals CK, that is, when the first clock signals CK of the first clock terminals CLK are the active pulses, the signal output terminals OUT can output the active levels of the gate driving signals Gout, and when the first clock signals CK of the first clock terminals CLK are the inactive pulses, the signal output terminals OUT can output the inactive levels of the gate driving signals Gout.

For a condition in which the restoration modules 130 of the first shift register units ASG01 are electrically connected to the first nodes PU, under a condition that the restoration signal Vrest1 which is received by the first shift register units ASG01 contains the active pulse, the input modules 110 of the first shift register units ASG01 provide the active levels to the first nodes PU to charge the first nodes PU; in addition, the restoration modules 130 of the first shift register units ASG01 provide the inactive level (the first level signal Vgl of the first level terminals VGL) to the first nodes PU under the control of the active pulse to discharge the first nodes PU, causing that the first shift register units ASG01 cannot operate normally.

For a condition in which the restoration modules 130 of the first shift register units ASG01 are electrically connected to the signal output terminals OUT, under a condition that the restoration signal Vrest1 which is received by the first shift register units ASG01 contains the active pulse, the output modules 120 of the first shift register units ASG01 transmit the first clock signals CK of the first clock terminals CLK to the signal output terminals OUT, and the restoration modules 130 of the first shift register units ASG01 provide the inactive level (the first level signal Vgl of the first level terminals VGL) to the signal output terminals OUT under the control of the active pulse; when the signal output terminals OUT receive the active level of the first clock signals CK and the first level signal Vgl at the same time, the signal output terminals OUT cannot normally output signals.

For the second shift register units ASG02 in the first-type shift register unit ASGa, such as the (i+4)-th stage of shift register unit ASGi+4, the (i+5)-th stage of shift register unit ASGi+5, the (i+6)-th stage of shift register unit ASGi+6, and the (i+7)-th stage of shift register unit ASGi+7, the restoration signal Vrest2 of the restoration signal terminals REST thereof includes the first active pulse, and the starting moment T1 of the first active pulse is before the starting active pulse of the first clock signal CK which is received by the at least one stage of first shift register unit ASG01, (for example, before the starting active pulse of any one of the first clock signal CK1 which is received by the i-th stage of shift register unit ASGi, the first clock signal CK2 which is received by the (i+1)-th stage of shift register unit ASGi+1, the first clock signal CK3 which is received by the (i+2)-th stage of shift register unit ASGi+2, and the first clock signal CK4 which is received by the (i+3)-th stage of shift register unit ASGi+3), so that before the first clock signals CK which are received by the first shift register units ASG01 jump to the active level for the first time, the first active pulse of the restoration signal Vrest2 which is received by the restoration signal terminals REST in the second shift register units ASG02 can control the restoration modules 130 thereof to be turned on, the restoration modules 130 can provide the first level signal Vgl of the first level terminals VGL to the first nodes PU and/or the signal output terminals OUT, and the signals of the first nodes PU and the gate driving signals Gout which are output by the signal output terminals OUT can be maintained consistent with the first level signal Vgl to ensure that the signals of the first nodes PU can accurately control the output modules 120 to be in the OFF state, and the gate driving signals OUT which are output by the signal output terminals OUT can be maintained at the inactive level to prevent the case in which the first nodes PU of the second shift register units ASG02 are not at the inactive level due to the effect of the starting active pulses of the first clock signals CK of the first shift register units ASG01 and/or to reduce the problem that the signal output terminals OUT output noise when the signal output terminals OUT output the first level signal Vgl, thereby increasing the accuracy and reliability of the gate driving signals Gout which are output by the signal output terminals OUT of the second shift register units ASG02.

The first active pulse refers to the time period during which the restoration signal of the second shift register unit ASG02 is maintained at the active level, the starting moment of the first active pulse refers to the moment at which the restoration signal is changed from the inactive level to the active level, and the terminating moment of the first active pulse refers to the moment at which the restoration signal is changed from the active level to the inactive level. The same explanation may be made for the starting moments and the terminating moments of the pulses of the other signals.

The first shift register units ASG01 and the second shift register units ASG02 each include the restoration module 130, the restoration signal which is received by the restoration modules 130 of the first shift register units ASG01 is at the inactive level, and the restoration signal which is received by the restoration modules 130 of the second shift register units ASG02 includes the first active pulse; although the restoration modules 130 of the first shift register units ASG01 do not provide the first level signal Vgl to the first nodes PU and/or the signal output terminals, the restoration modules 130 still remain in the first shift register units ASG01, so that the current leakage of the first nodes PU (or the signal output terminals OUT) of the first shift register units ASG01 may be substantially the same as the current leakage of the first nodes PU (or the signal output terminals OUT) of the second shift register units ASG02, the internal capacitance of the first shift register units ASG01 may be substantially the same as the internal capacitance of the second shift register units ASG02, and the operation performance of the first shift register units ASG01 is similar to or the same as the operation performance of the second shift register units ASG02, increasing the consistency of the gate driving signals which are output by the driver circuits.

Based on the above embodiments, the display panel 100 may further include a plurality of gate signal lines 31 and a plurality of pixels 20 which are arranged in an array, the pixels 20 each may include at least one switching transistor, and the specific structure of the pixels 20 may be specifically designed based on actual needs and is not specifically limited by the embodiments of the present application. At least a part of the pixels 20 which are located in the same row may be electrically connected to the same gate signal line 31, and the signal output terminals OUT of the stages of shift register units ASG in the driver circuit 10 may be electrically connected to the gate signal lines 31, respectively, to control the transistors in the pixels 20 to be turned on or turned off, so that the corresponding display signals (for example, the data signals) may be written to the pixels 20 to control the display light-emitting brightness of the pixels 20, and the display panel 100 can present corresponding display images. In this way, by increasing the accuracy and reliability of the gate driving signals which are output by the stages of shift register units ASG, the accuracy of writing the display signals to the pixels 20 can be increased, which is beneficial for improving the display effect of the display panel 100.

It may be understood that when the switching transistors in the pixels 20 are the N-type transistors, the active levels of the gate driving signals Gout which are output by the signal output terminals OUT of the shift register units ASG are the high level; and when the transistors in the pixels 20 are the P-type transistors, the active levels of the gate driving signals Gout which are output by the signal output terminals OUT of the shift register units ASG are the low level. For the convenience of description, and without any particular limitation, the example in which the active levels of the gate driving signals Gout are the high level and the inactive levels of the gate driving signal Gouts are the low level is given in the embodiments of the present application to exemplarily illustrate the technical solutions of the embodiments of the present application.

It should be noted that the case in which the restoration signal Vrest1 which is received by the first shift register units ASG01 is different from the restoration signal Vref2 which is received by the second shift register units ASG02 is illustrated above only as an example; and under a condition that the core inventive point of the embodiments of the present application can be achieved, the restoration signal Vrest1 which is received by the first shift register units ASG01 and the restoration signal Vref2 which is received by the second shift register units ASG02 may be provided based on actual needs, which is not specifically limited by the embodiments of the present application.

In other optional embodiments, still referring to FIG. 2, FIG. 6, and FIG. 7, when the plurality of stages of first-type shift register units include the at least one stage of first shift register unit ASG01 and the at least one stage of second shift register unit ASG02, the display panel 100 may further include the first restoration signal line 41 and the second restoration signal line 42, the restoration signal terminals REST of the first shift register units ASG01 may be electrically connected to the first restoration signal line 41, and the restoration signal terminals REST of the second shift register units ASG02 may be electrically connected to the second restoration signal line 42; and the first restoration signal line 41 and the second restoration signal line 42 are insulated from each other.

It may be understood that the first restoration signal line 41 and the second restoration signal line 42 are insulated from each other, so that the restoration signals Vrest which are transmitted by the first restoration signal line 41 and the second restoration signal line 42 do not interfere with each other, and the restoration signal Vrest which is transmitted by the first restoration signal line 41 is the same as or different from the restoration signal Vrest which is transmitted by the second restoration signal line 42, which may be provided based on actual needs.

As a feasible embodiment, when the display panel 100 is required to have a better display effect, the restoration signal Vrest1 which is transmitted by the first restoration signal line 41 may include the inactive level, and the inactive level may control the restoration modules 130 in the first shift register units ASG01 to be in the OFF state to prevent the ON duration of the output modules 120 in the first shift register units ASG01 and the accuracy of the gate driving signals Gout which are output by the signal output terminals OUT from being affected due to the transmission of the first level signal Vgl of the first level terminals VGL to the first nodes PU and the signal output terminals OUT, thereby ensuring that the first shift register units ASG01 accurately output the gate driving signals Gout. The restoration signal Vrest2 which is transmitted by the second restoration signal line 42 may include the first active pulse, and before the second shift register units ASG02 output the active level of the gate driving signals Gout, the first active pulse may control the restoration modules 130 in the second shift register units ASG02 to be in the ON state, so that the first level signal Vgl of the first level terminals VGL can be transmitted to the first nodes PU and/or the signal output terminals OUT to ensure that the signals of the first nodes PU can control the output modules 120 to be in the OFF state and control that the gate driving signals Gout which are output by the control signal output terminals OUT are consistent with the first level signal Vgl, preventing the accuracy of the gate driving signals Gout which are output by the signal output terminals OUT of the second shift register units ASG02 from being affected due to the state of the output modules 120 being uncontrollable and the jumping of the first clock signals CK which are received by the first shift register units ASG01 for the first time. In this way, the first restoration signal line 41 and the second restoration signal line 42 transmit different restoration signals Vrest, so that the accuracy of the gate driving signals Gout which are output by the stages of shift register units ASG can be increased.

Figure 8:
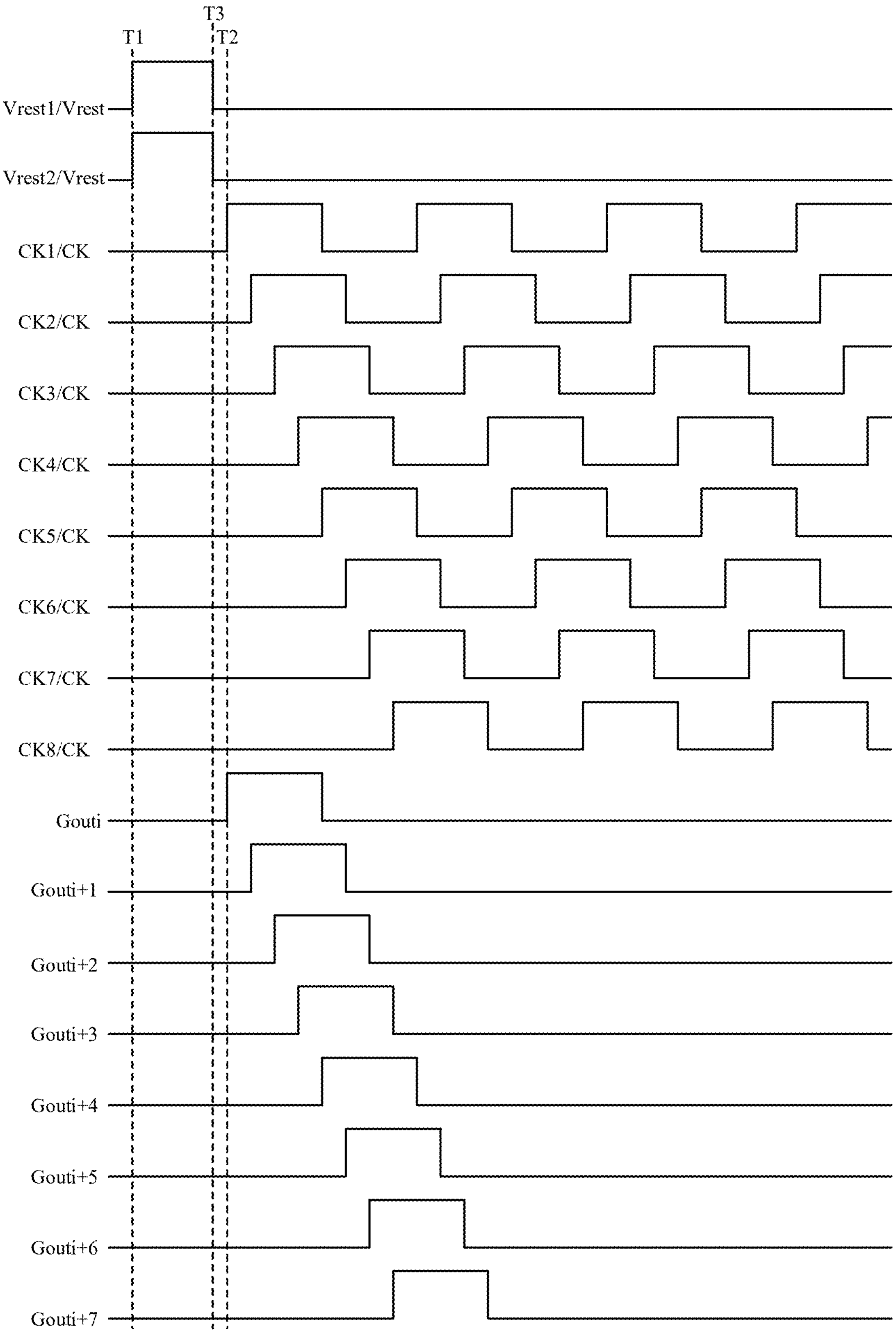
FIG. 8 is a driving time sequence chart of yet another display panel according to embodiments of the present application.

As another feasible embodiment, referring to FIG. 2, FIG. 6, and FIG. 8, the restoration signal Vrest1 which is transmitted by the first restoration signal line 41 and the restoration signal Vrest2 which is transmitted by the second restoration signal line 42 may both include the first active pulse, and the terminating moment T1 of the first active pulse may be before the starting moments T2 of the starting active pulses of the first clock signals CK which are received by the stages of shift register units ASG, so that the restoration modules 130 in the stages of the shift register units ASG can be controlled by the restoration signals Vrest to be in the ON state before the stages of shift register units ASG receive the active pulses of the first clock signals CK, and the first level signal Vgl of the first level terminals VGL can be transmitted to the first nodes PU and/or the signal output terminals OUT to ensure that the signals of the first nodes PU can control the output modules 120 to be in the OFF state and control that the signals of the signal output terminals OUT are maintained consistent with the first level signal Vgl, preventing the accuracy of the gate driving signals Gout which are output by the signal output terminals OUT of the stages of shift register units ASG from being affected due to the state of the output modules 120 being uncontrollable and the jumping of the first clock signals CK of the first shift register units ASG01 for the first time. In this way, the first restoration signal line 41 and the second restoration signal line 42 transmit the same restoration signal Vrest, and the restoration signal Vrest includes the first active pulse, so that the accuracy of the gate driving signals Gout which are output by the stages of shift register units ASG can be increased.

Figure 9:
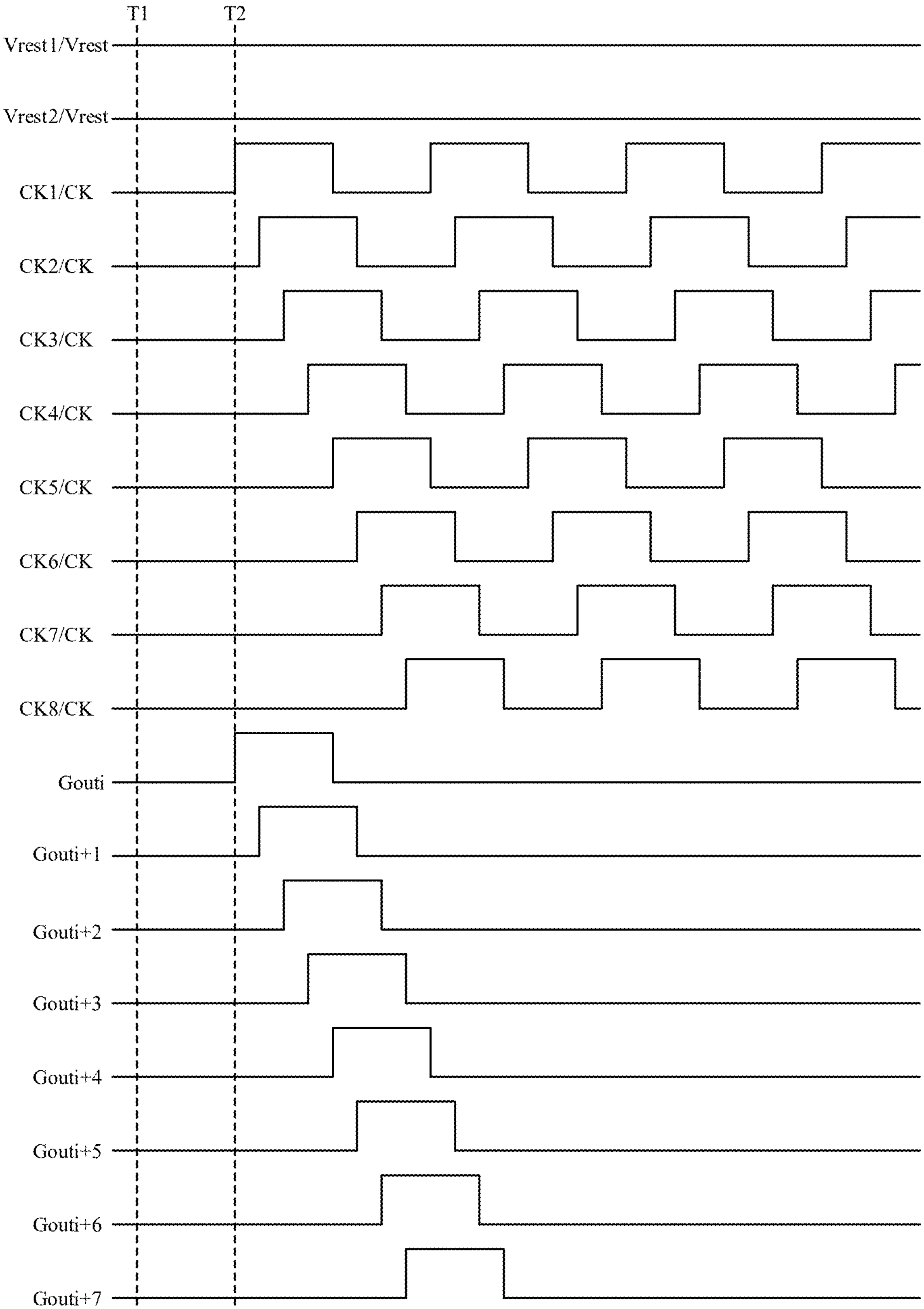
FIG. 9 is a driving time sequence chart of yet another display panel according to embodiments of the present application.

As other feasible embodiments, referring to FIG. 2, FIG. 6, and FIG. 9, when the display panel is in the standby state or has a low refresh frequency, the restoration signal Vrest1 which is transmitted by the first restoration signal line 41 and the restoration signal Vrest2 which is transmitted by the second restoration signal line 42 may be both at the inactive level to reduce the power consumption due to the level changes of the first restoration signal line 41 and the second restoration signal line 42, which is beneficial for low power consumption of the display panel 100.

It should be noted that the restoration signals which are transmitted by the first restoration signal line and the second restoration signal line are illustrated above only as an example, and under a condition that the relatively high accuracy of the gate driving signals which are output by the stages of shift register units can be ensured, the restoration signal which is transmitted by the first restoration signal line and the restoration signal which is transmitted by the second restoration signal line are not specifically limited by the embodiments of the present application.

Figure 10:
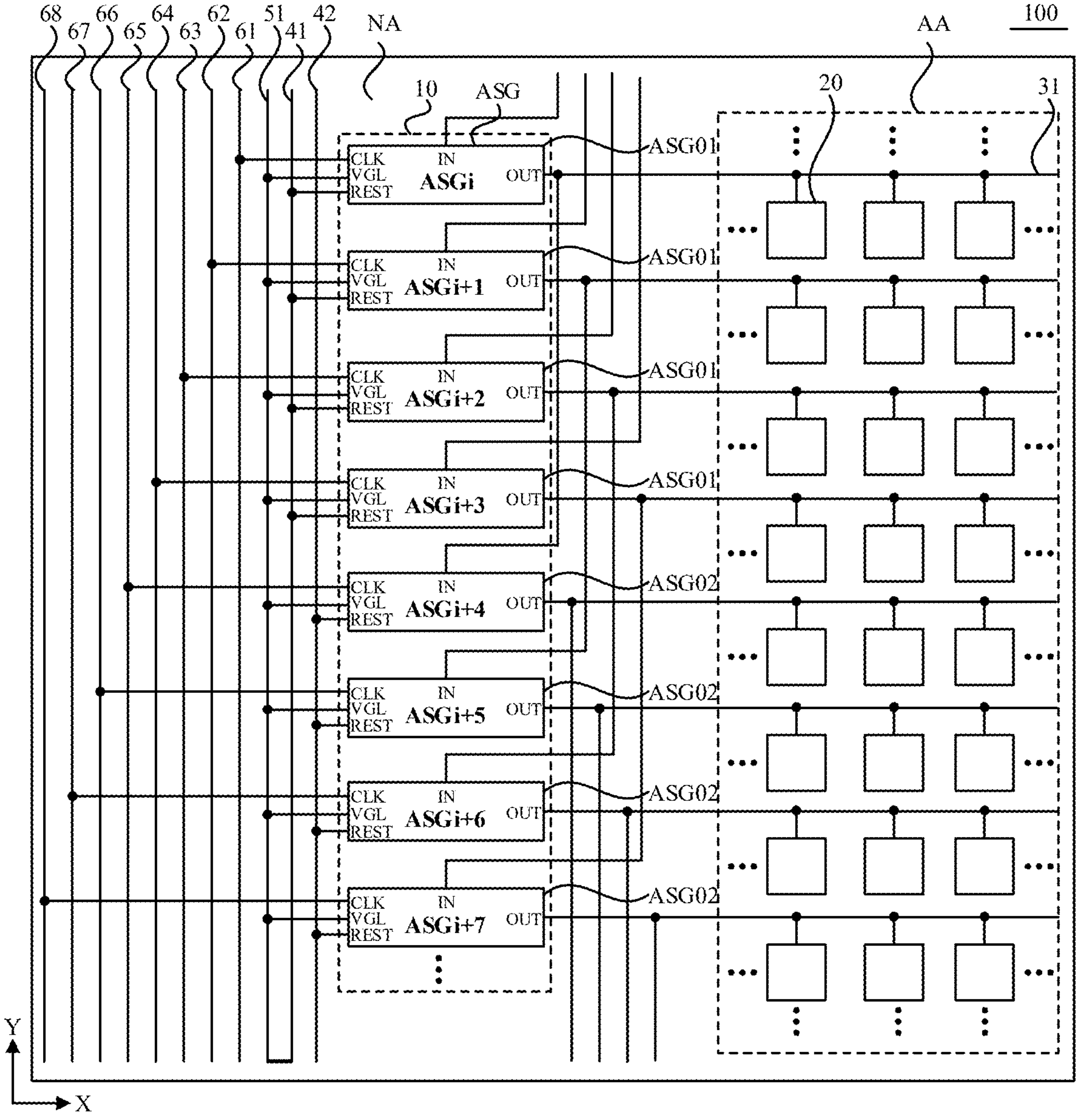
FIG. 10 is a schematic structural view of yet another display panel according to embodiments of the present application.

Based on above embodiments, optionally, FIG. 10 is a schematic structural view of yet another display panel according to embodiments of the present application; as shown in FIG. 10, the display panel 100 may further include the first level signal line 51, and the first level terminal VGL of the at least one stage of first shift register unit ASG01 and the first level terminals VGL of the at least one stage of second shift register unit ASG02 are both electrically connected to the first level signal line 51, so that the first level signal which is transmitted by the first level signal line 51 can be provided to the first level terminals VGL of the stages of first shift register units ASG01 and the stages of second shift register units ASG02.

Still referring to FIG. 10, the first restoration signal line 41 may be electrically connected to the first level signal line 51, so that the restoration signal Vrest1 may be the same signal as the first level signal Vgl, that is, the restoration signal Vrest1 which is transmitted by the first restoration signal line 41 may be at the same inactive level as the first level signal Vgl, that is, the first level signal Vgl may be reused as the restoration signal Vrest1 of the first shift register units ASG01. Under this condition, the first restoration signal line 41 and the first level signal line 51 may be electrically connected to the same signal terminal to receive the same signal by the signal terminal, which is beneficial for reducing the number of the signal terminals which are provided in the display panel 100 and simplifying the structure of the display panel 100; meanwhile, since the driver chip for providing the signals to the display panel 100 includes the output terminals which are electrically connected to the signal terminals of the display panel 100 in a one-to-one correspondence, when the number of the signal terminals of the display panel 100 is reduced, the number of the output terminals of the driver chip may be reduced accordingly, which can simplify the structure of the driver chip and reduce the cost of the driver chip, thereby reducing the driving cost of the display panel 100.

It should be noted that the case in which the display panel includes the first restoration signal line 41, the second restoration signal line 42, and the first level signal line 51 is illustrated above only as an example, and in the embodiments of the present application, when the first level signal Vgl is reused as the restoration signals Vrest of the first shift register units ASG, the first level signal line 51 may be reused as the first restoration signal line 42. Under a condition that the core inventive point of the embodiments of the present application can be achieved, the arrangement of the signal lines in the display panel is not specifically limited by the embodiments of the present application.

Figure 11:
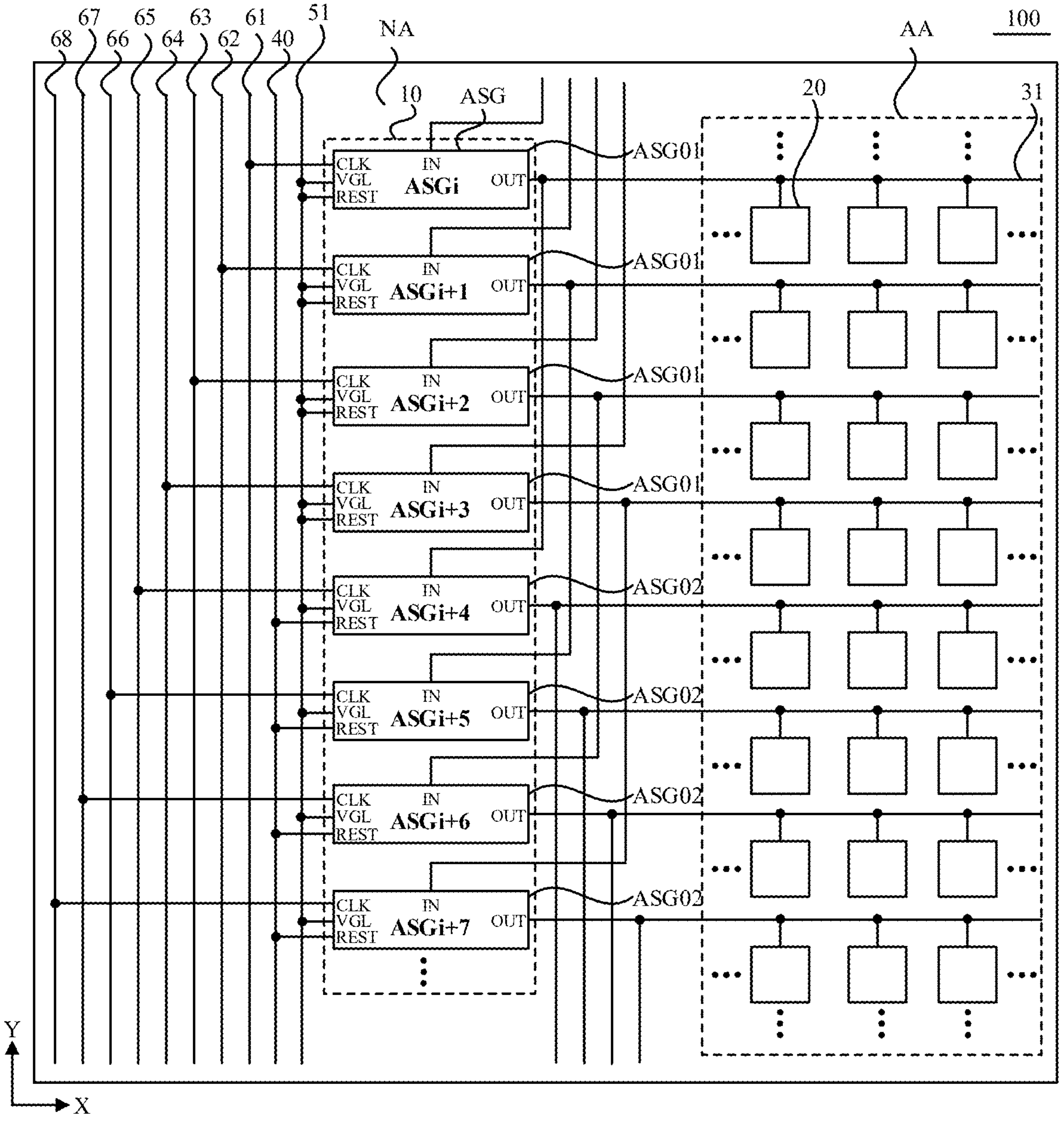
FIG. 11 is a schematic structural view of yet another display panel according to embodiments of the present application.

In an optional embodiment, FIG. 11 is a schematic structural view of yet another display panel according to embodiments of the present application; as shown in FIG. 11, the display panel 100 may include the first level signal line 51 and the restoration signal line 40 which are insulated from each other; the first level terminal VGL of the at least one stage of first shift register unit ASG01 and the first level terminal VGL of the at least one stage of second shift register unit ASG02 are both electrically connected to the first level signal line 51; the restoration signal terminal REST of the at least one stage of first shift register unit ASG01 is electrically connected to the first level signal line 51; and the restoration signal terminal REST of the at least one stage of second shift register unit ASG02 is electrically connected to the restoration signal line 40.

In this way, the first level terminals VGL of the first shift register units ASG01, the first level terminals VGL of the second shift register units ASG02, and the restoration signal terminals REST of the first shift register units ASG01 can receive the first level signal Vgl which is transmitted by the first level signal line 51, so that the restoration modules of the first shift register units ASG01 can be in the OFF state under the control of the first level signal Vgl which is received by the first level terminals VGL and the restoration signal terminals REST thereof, ensuring that the first shift register units ASG01 can accurately output the gate driving signals Gout; the restoration signal terminals REST of the second shift register units ASG02 can receive the restoration signal Vrest2 which is transmitted by the restoration signal line 40, so that the restoration modules of the second shift register units ASG02 can be turned on or turned off under the control of the first level signal Vgl which is received by the first level terminals VGL thereof and the restoration signal Vrest2 which is received by the restoration signal terminals REST thereof, thereby increasing the accuracy of the gate driving signals Gout which are output by the second shift register units ASG02 under a condition that the noise which is output by the second shift register units ASG02 is reduced.

Further, when the first level terminal VGL of the at least one stage of first shift register unit ASG01, the restoration signal terminal REST of the at least one stage of first shift register unit ASG01, and the first level terminal VGL of the at least one stage of second shift register unit ASG02 are all electrically connected to the first level signal line 51, there is no need to separately provide a signal line which is electrically connected to the restoration signal terminal REST of the at least one stage of first shift register unit ASG01, which is beneficial for reducing the number of the signal lines which are provided in the display panel 100 and simplifying the structure of the display panel 100; in addition, when the first level signal line 51 and the restoration signal line 40 are both located in the non-display area NA of the display panel 100, it is beneficial for reducing the dimension of the non-display area NA of the display panel 100, which is beneficial for achieving the narrow bezel of the display panel 100.

Figure 12:
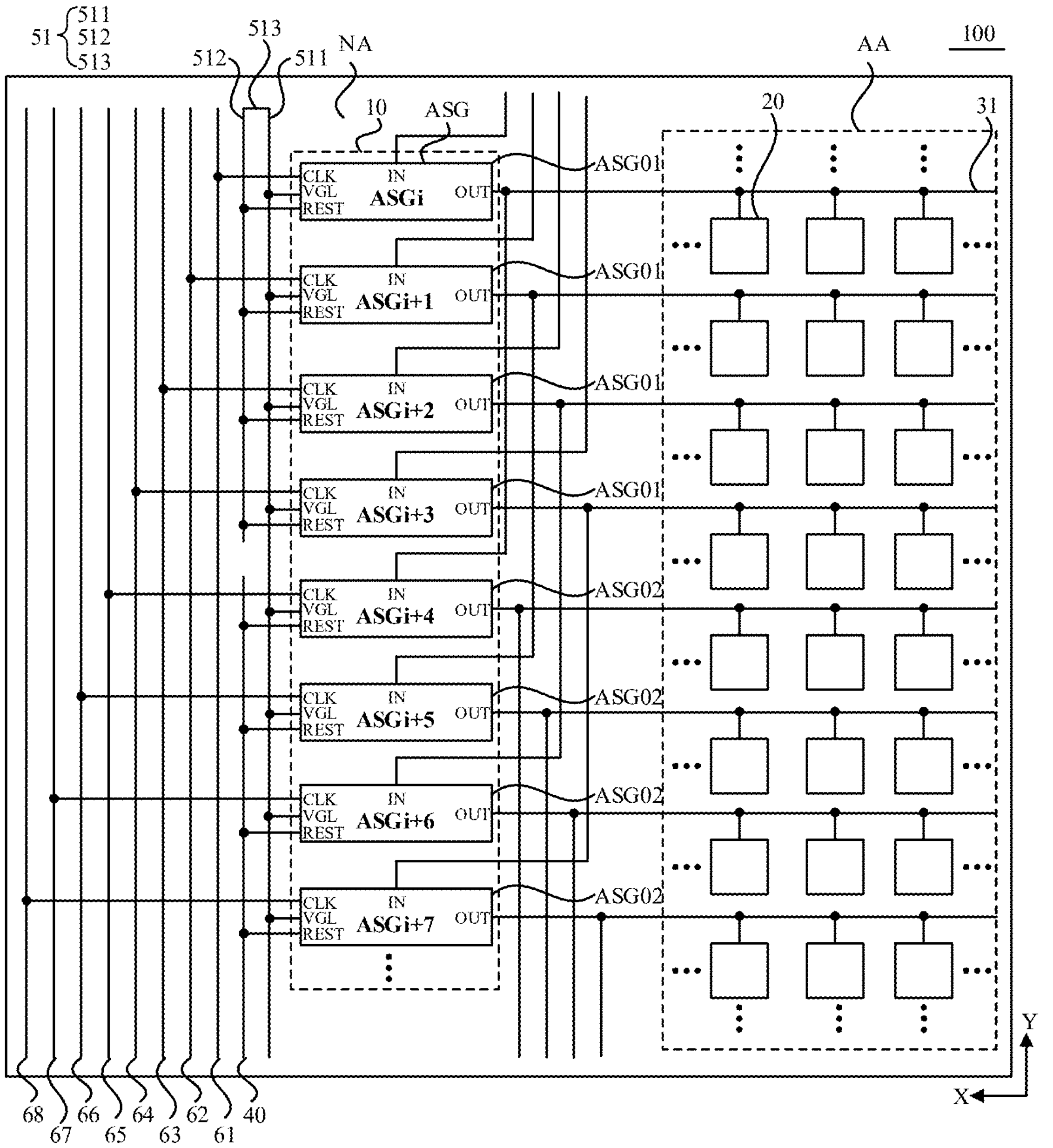
FIG. 12 is a schematic structural view of yet another display panel according to embodiments of the present application.

Optionally, FIG. 12 is a schematic structural view of yet another display panel according to embodiments of the present application; as shown in FIG. 12, when the stages of shift register units ASG are sequentially arranged along the first direction Y, the first-level signal line 51 may include the first portion 511 and the second portion 512 which extend along the first direction Y and are electrically connected to each other; the first portion 511 and the second portion 512 are arranged along the second direction X; the second direction X intersects with the first direction Y, and the second direction X is parallel to the plane where the display panel 100 is located; the restoration signal line 40 extends along the first direction Y, and the restoration signal line 40 and the first portion 511 are arranged along the second direction X; along the second direction X, the first portion 511 and the second portion 512 overlap the at least one stage of first shift register unit ASG01, and the first portion 511 and the restoration signal line 40 overlap the at least one stage of second shift register unit ASG02.

Specifically, along the second direction X, the at least one stage of first shift register unit ASG01 overlaps both the first portion 511 and the second portion 512 of the first level signal line 51 which is electrically connected thereto, so that the parasitic capacitance which is formed between the first shift register unit ASG01 and the first level signal line 51 includes the parasitic capacitance which is formed between the first shift register unit ASG01 and the first portion 511 and the parasitic capacitance which is formed between the first shift register unit ASG01 and the second portion 512; meanwhile, along the second direction X, the first portion 511 and the restoration signal line 40 overlap the at least one stage of second shift register unit ASG02, so that the second shift register unit ASG02 can form the parasitic capacitance with the restoration signal line 40 and the first portion 511 at the same time. In this way, the parasitic capacitance which is formed between the first shift register unit ASG01 and the first level signal line 51 may be maintained consistent with the parasitic capacitance which is formed between the second shift register unit ASG02 and the first level signal line 51 and the parasitic capacitance which is formed between the second shift register unit ASG02 and the restoration signal line 40, so that the impedance of the first shift register unit ASG01 is maintained consistent with the impedance of the second shift register unit ASG02, which is beneficial for increasing the consistency between the active levels of the gate driving signals which are output by the first shift register unit ASG01 and the second shift register unit ASG02 and is further beneficial for improving the display uniformity of the display panel 100.

In an optional embodiment, still referring to FIG. 12, when the first level signal line 51 includes the first portion 511 and the second portion 512, the restoration signal terminal REST of the first shift register unit ASG01 may be electrically connected to the second portion 512, and the first level terminals VGL of the first shift register units ASG01 and the first level terminals VGL of the second shift register units ASG02 may be electrically connected to the first portion 511, so that the first level terminals VGL and the restoration signal terminals REST of the first shift register units ASG01 are electrically connected to different sections of the first level signal line 51 to ensure that the first shift register units ASG01 and the second shift register units ASG02 have the similar connection and further increase the consistency of the gate driving signals which are output by the first shift register units ASG01 and the second shift register units ASG02.

Based on the above embodiments, optionally, still referring to FIG. 12, along the first direction Y, the second portion 512 overlaps the restoration signal line 40.

Specifically, when the first-type shift register units ASG have the same structure, overlapping the second portion 512 and the restoration signal line 40 along the first direction Y can ensure that the connection of the restoration signal terminals REST of the first shift register units ASG01 to the second portion 512 is consistent with the connection of the restoration signal terminals REST of the second shift register units ASG02 to the restoration signal line 40, so that the impedance of the first shift register units ASG01 can be consistent with the impedance of the second shift register units ASG02, increasing the consistency of the gate driving signals which are output by the first shift register units ASG01 and the second shift register units ASG02.

In the embodiment which includes the technical feature that the second portion 512 overlaps the restoration signal line 40 along the first direction Y, the second portion 512 and the restoration signal line 40 may be located at a side of the shift register units (including the thin film transistors and the capacitors) away from the display area (including the pixels), or the second portion 512 and the restoration signal line 40 may be located in the circuit layout area of the shift register units, that is, the second portion 512 and the restoration signal line 40 penetrate through the shift register units.

Based on the above embodiment, optionally, still referring to FIG. 12, the first level signal line 51 further includes the connection portion 513 which connects the first portion 511 to the second portion 512; and along the second direction X, the connection portion 513 does not overlap the stages of shift register units ASG.

Specifically, the connection portion 513 may extend along the second direction X, and the connection portion 513 may be connected to the first connection portion 511, the first end of the first connection portion 511, and the first end of the second connection portion 512, and the first end of the first connection portion 511 and the first end of the second connection portion 512 may be both located on a side of the first shift register units ASG01 away from the second shift register units ASG02. Not overlapping the connection portion 513 and the stages of shift register units ASG along the second direction X can prevent the case in which the impedance of the shift register units ASG is inconsistent due to the overlapping of the connection portion 513 and only a part of the shift register units ASG, thereby ensuring the consistency of the gate driving signals which are output by the stages of shift register units ASG, and improving the display uniformity of the display panel.

It should be noted that the connection relationship of the restoration signal terminals of the first shift register units and the second shift register units and the signal lines is illustrated above only as an example; under a condition that the core inventive point of the embodiments of the present application can be achieved, the connection relationship of the first shift register units, the second shift register units and the signal lines is not limited herein and may be designed based on actual needs; for the convenience of description, and without any particular limitation, an example in which the restoration signal terminals of the first shift register units are electrically connected to the first level signal line and the restoration signal terminals of the second shift register units are electrically connected to the restoration signal line is given in the embodiments of the present application to exemplarily illustrate the technical solutions of the embodiments of the present application.

Figure 13:
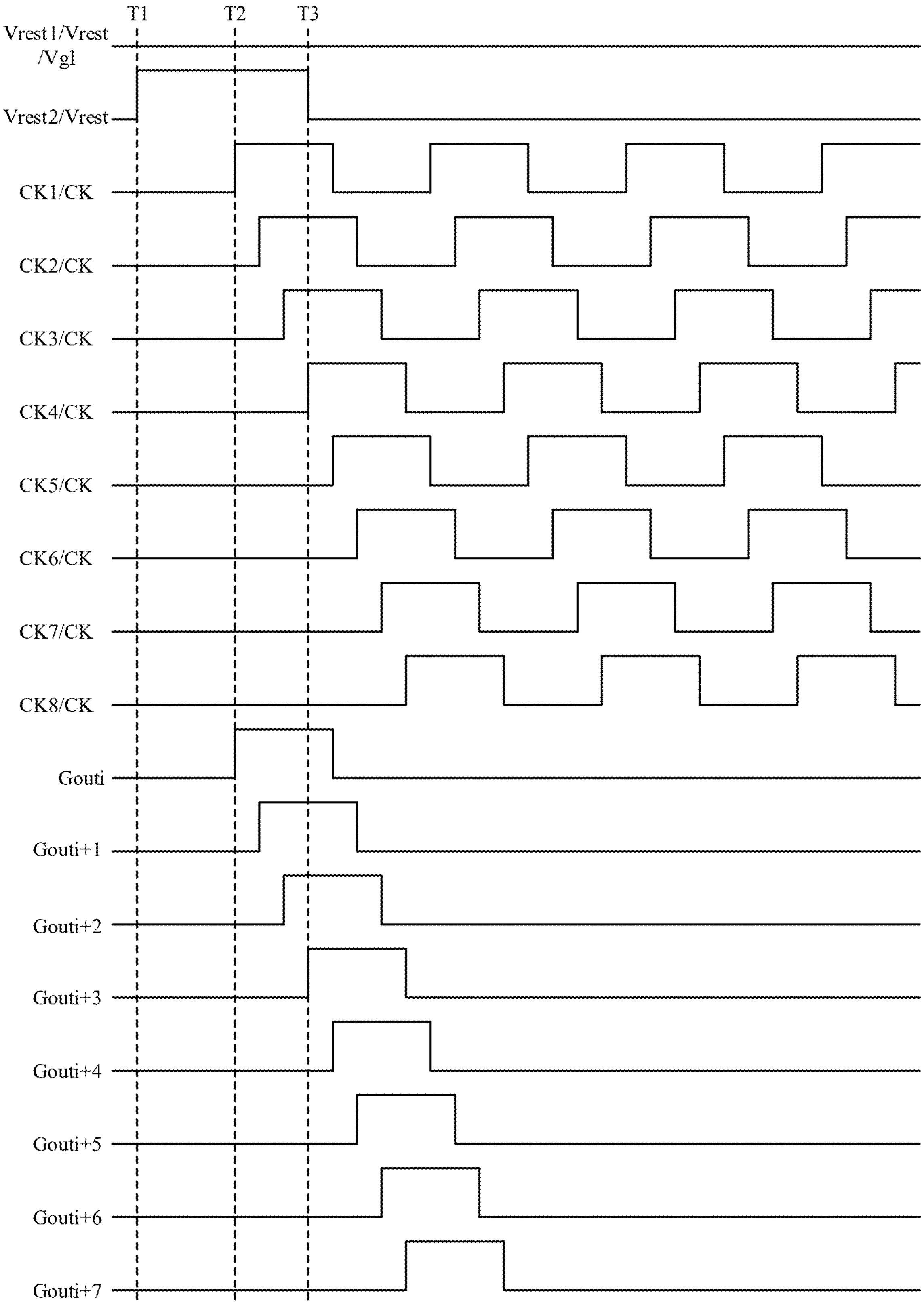
FIG. 13 is a driving time sequence chart of yet another display panel according to embodiments of the present application.

Based on the above embodiment, optionally, FIG. 13 is a driving time sequence chart of yet another display panel according to embodiments of the present application, referring to FIG. 2, FIG. 12, and FIG. 13, the first active pulse overlaps the starting active pulse of the first clock signal CK (CK1, CK2, CK3, and CK4) of the at least one stage of first shift register unit ASG01, that is, the terminating moment T3 of the first active pulse is after the starting moment of the starting active pulse of the first clock signal CK (CK1, CK2, CK3, and CK4) of the at least one stage of shift register unit ASG01 and before the terminating moment of the starting active pulse of the first clock signal CK (CK1, CK2, CK3, and CK4) of the at least one stage of shift register unit ASG01.

Specifically, taking for the example that the terminating moment T3 of the first active pulse is after the starting moments of the starting active pulses of the first clock signal CK1 of the i-th stage of shift register unit ASGi, the first clock signal CK2 of the (i+1)-th stage of shift register unit ASGi+1, and the first clock signal CK3 of the (i+2)-th stage of shift register unit ASGi+2, since the i-th stage of shift register unit ASGi, the (i+1)-th stage of shift register unit ASGi+1 and the (i+2)-th stage of shift register unit ASGi+2 are all the first shift register units ASG01, the restoration modules 130 of the first shift register units ASG01 (ASGi, ASGi+1, and ASGi+2) may be continuously in the OFF state, and thus when the first clock signals CK (CK1, CK2, and CK3) of the first shift register units ASG01 (ASGi, ASGi+1, and ASGi+2) are at the active level, the first active pulse does not affect the active pulse of the gate driving signals Gout (Gouti, Gouti+1, and Gouti+2) which are output by the first shift register units ASG01 (ASGi, ASGi+1, and ASGi+2). In the second shift register units ASG02 (ASGi+4, ASGi+5, ASGi+6, and ASGi+7), the restoration modules 130 may be continuously in the ON state within the time period during which the restoration signal Vrest2 is the first active pulse, so that the restoration modules 130 may continuously provide the first level signal Vgl to the first nodes PU and the signal output terminals OUT thereof. In this way, when the first clock signals CK (CK1, CK2, and CK3) which are received by the first shift register units ASG01 (ASGi, ASGi+1, and ASGi+2) jump from the inactive level to the active level, since the restoration modules 130 of the second shift register units ASG02 (ASGi+4, ASGi+5, ASGi+6, and ASGi+7) continuously provide the first level signal Vgl to the first nodes PU and the signal output terminals OUT thereof, the gate driving signals Gout (Gouti+4, Gouti+5, Gouti+6, and Gouti+7) which are output by the signal output terminals OUT of the second shift register units ASG02 (ASGi+4, ASGi+5, ASGi+6, and ASGi+7) do not change as the first clock signals CK (CK1, CK2, and CK3) which are received by the first shift register units ASG01 (ASGi, ASGi+1, and ASGi+2) jump, ensuring that the signal output terminals OUT of the second shift register units ASG02 (ASGi+4, ASGi+5, ASGi+6, and ASGi+7) can output the inactive level of the gate driving signals Gout (Gouti+4, Gouti+5, Gouti+6, and Gouti+7) and the rising edge (the process in which the signal changes from the low level to the high level) of the starting active pulses of the first clock signals CK (CK1, CK2, and CK3) which are received by the first shift register units ASG01 (ASGi, ASGi+1, and ASGi+2) is within the time period in which the first active pulse is, so as to reduce the problem that the signal output terminals OUT of the second shift register units ASG02 (ASGi+4, ASGi+5, ASGi+6, and ASGi+7) output noise due to the rising edge of the starting active pulses of the first clock signals CK (CK1, CK2, and CK3) which are received by the first shift register units ASG01 (ASGi, ASGi+1, and ASGi+2), thereby increasing the accuracy of the gate driving signals Gout (Gouti+4, Gouti+5, Gouti+6, and Gouti+7) which are output by the second shift register units ASG02 (ASGi+4, ASGi+5, ASGi+6, and ASGi+7).

Figure 14:
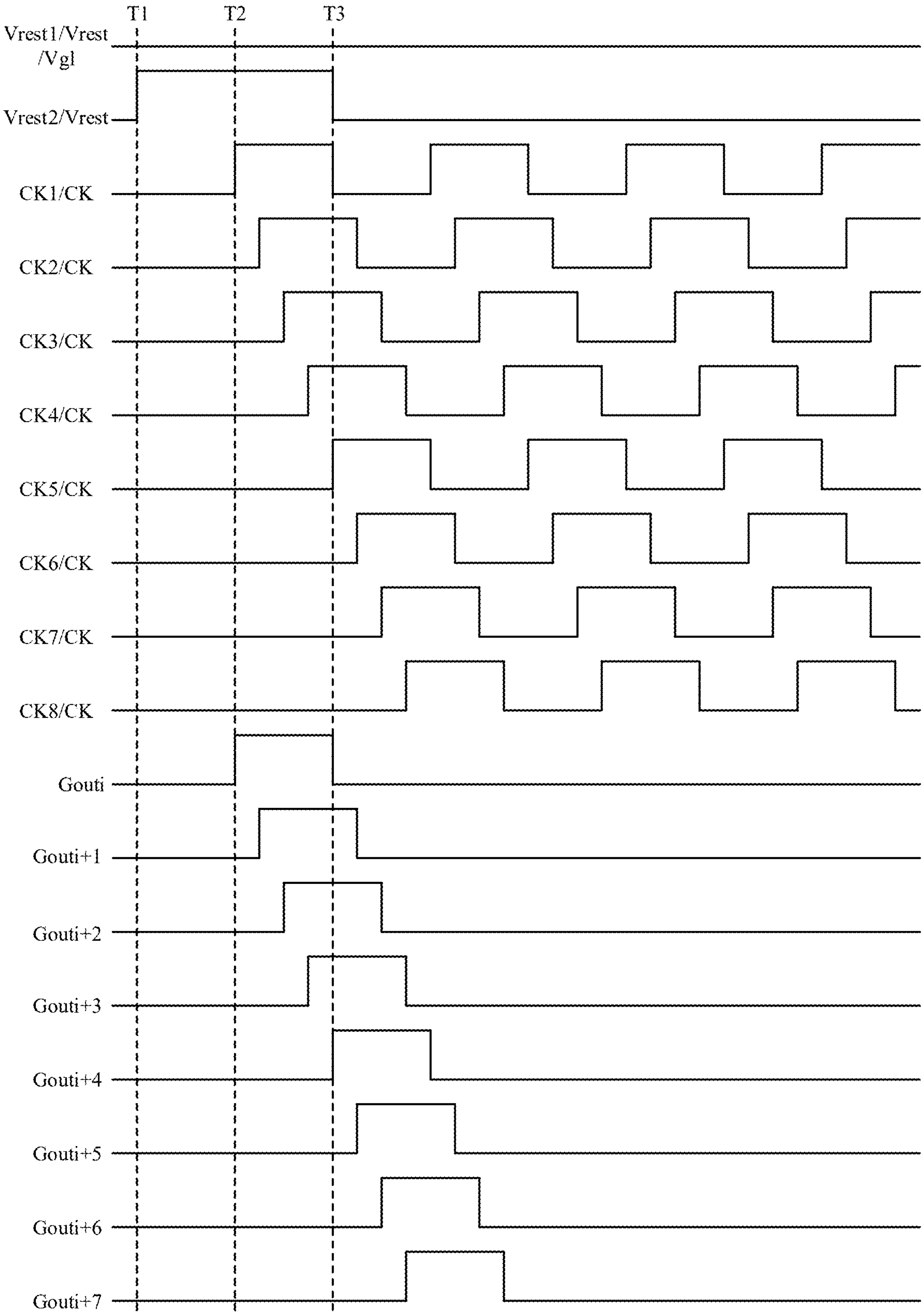
FIG. 14 is a driving time sequence chart of yet another display panel according to embodiments of the present application.

Optionally, FIG. 14 is a driving time sequence chart of yet another display panel according to embodiments of the present application, referring to FIG. 2, FIG. 12, and FIG. 14, the time period in which the starting active pulse of the first clock signal CK of the at least one stage of first shift register unit ASG01 is is within the time period in which the first active pulse is, that is, the starting moment T2 of the starting active pulse of the first clock signal CK of the at least one stage of first shift register unit ASG01 is after the starting moment T1 of the first active pulse, and the terminating moment of the starting active pulse of the first clock signal CK is the same moment as the terminating moment T3 of the first active pulse or before the terminating moment T3 of the first active pulse.

In an example, the time period in which the starting active pulse of the first clock signal CK1 of the i-th stage of shift register unit ASGi is is within the time period (T1-T3) that the first active pulse is in; under this condition, when the starting active pulse of the first clock signal CK1 of the i-th stage of shift register unit ASGi jumps from the inactive level to the active level and jumps from the active level to the inactive level, since the first active pulse can control the restoration modules of the second shift register units ASG02 (ASGi+4, ASGi+5, ASGi+6, and ASGi+7) to be in the ON state, the gate driving signals Gout (Gouti+4, Gouti+5, Gouti+6, and Gouti+7) which are output by the signal output terminals OUT of the second shift register units ASG02

(ASGi+4, ASGi+5, ASGi+6, and ASGi+7) do not change as the starting active pulse of the first clock signal CK1 of the i-th stage of shift register unit ASGi jumps, so as to reduce the problem that the signal output terminals OUT of the second shift register units ASG02 (ASGi+4, ASGi+5, ASGi+6, and ASGi+7) output noise due to the rising edge and the falling edge (the process in which the pulse changes from the active level to the inactive level) of the starting active pulse of the first clock signal CK1 of the i-th stage of shift register unit ASGi, thereby increasing the accuracy of the gate driving signals Gout (Gouti+4, Gouti+5, Gouti+6, and Gouti+7) which are output by the signal output terminals OUT of the second shift register units ASG02 (ASGi+4, ASGi+5, ASGi+6, and ASGi+7).

It should be noted that the case in which the time period in which the starting active pulse of the first clock signal CK1 of the i-th stage of shift register unit ASGi is is within the time period in which the first active pulse is is exemplarily illustrated above only as an example; in the embodiments of the present application, the time period in which the starting active pulse of the first clock signals of one or more stages of first shift register units is may be within the time period in which the first active pulse is, which is not specifically limited by the embodiments of the present application under a condition that the core inventive point of the embodiments of the present application can be achieved.

It may be understood that the example in which the i-th stage of shift register unit ASGi to the (i+3)-th stage of shift register unit ASGi+3 are the first shift register units ASG01 is given above only as an example to exemplarily illustrate the technical solution of the embodiments of the present application, and the specific number and distribution of the first shift register units ASG01 in the embodiments of the present application may be provided based on actual needs, which is not specifically limited by the embodiments of the present application.

Optionally, the first stage of the first-type shift register units to the L-th stage of the first-type shift register units are the first shift register units; the starting moment of the first active pulse is before the starting moment of the starting active pulse of the first clock signal which is received by the first stage of first-type shift register unit; and L is a positive integer.

Figure 15:
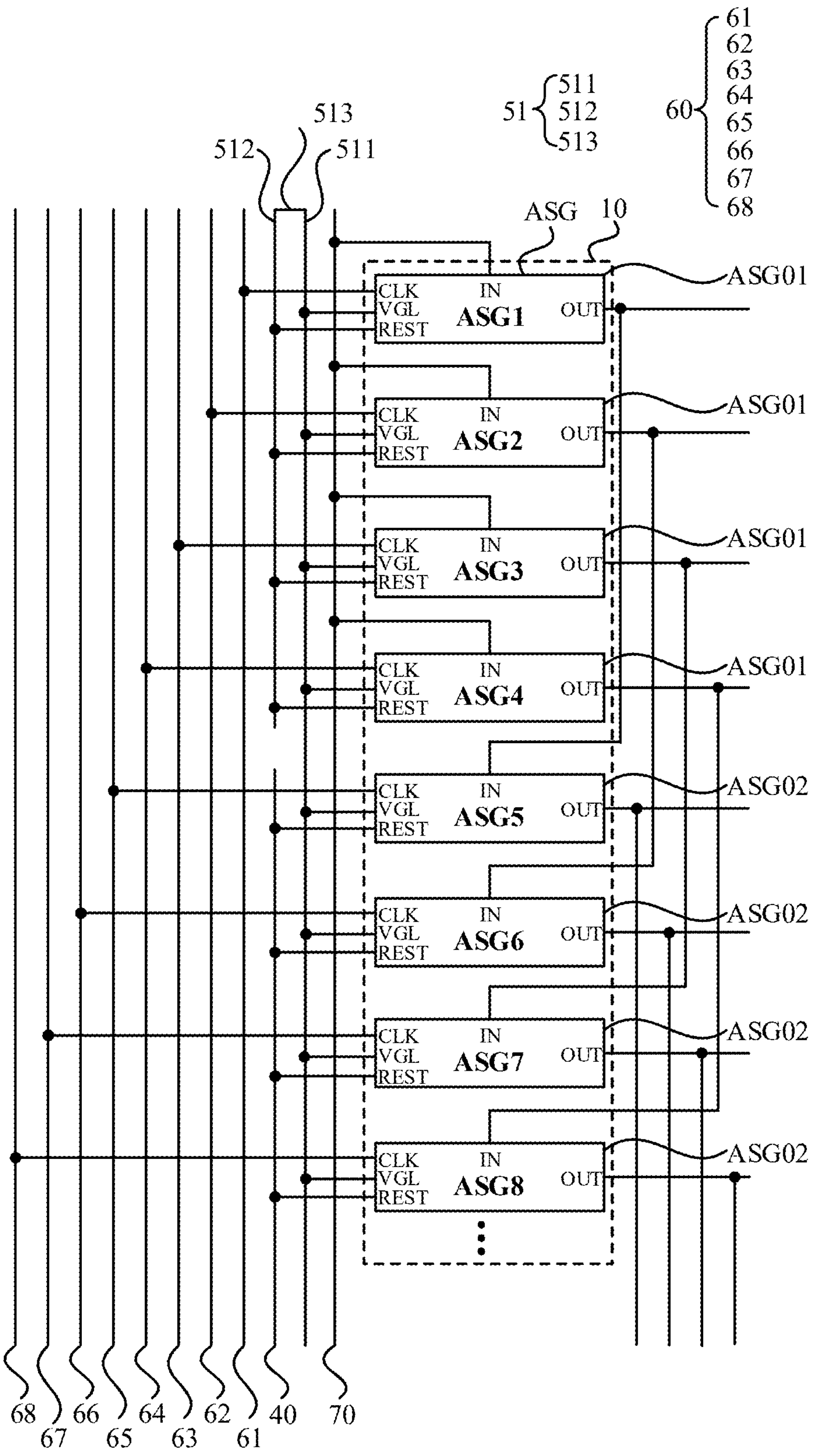
FIG. 15 is a partial schematic structural view of a display panel according to embodiments of the present application.
Figure 16:
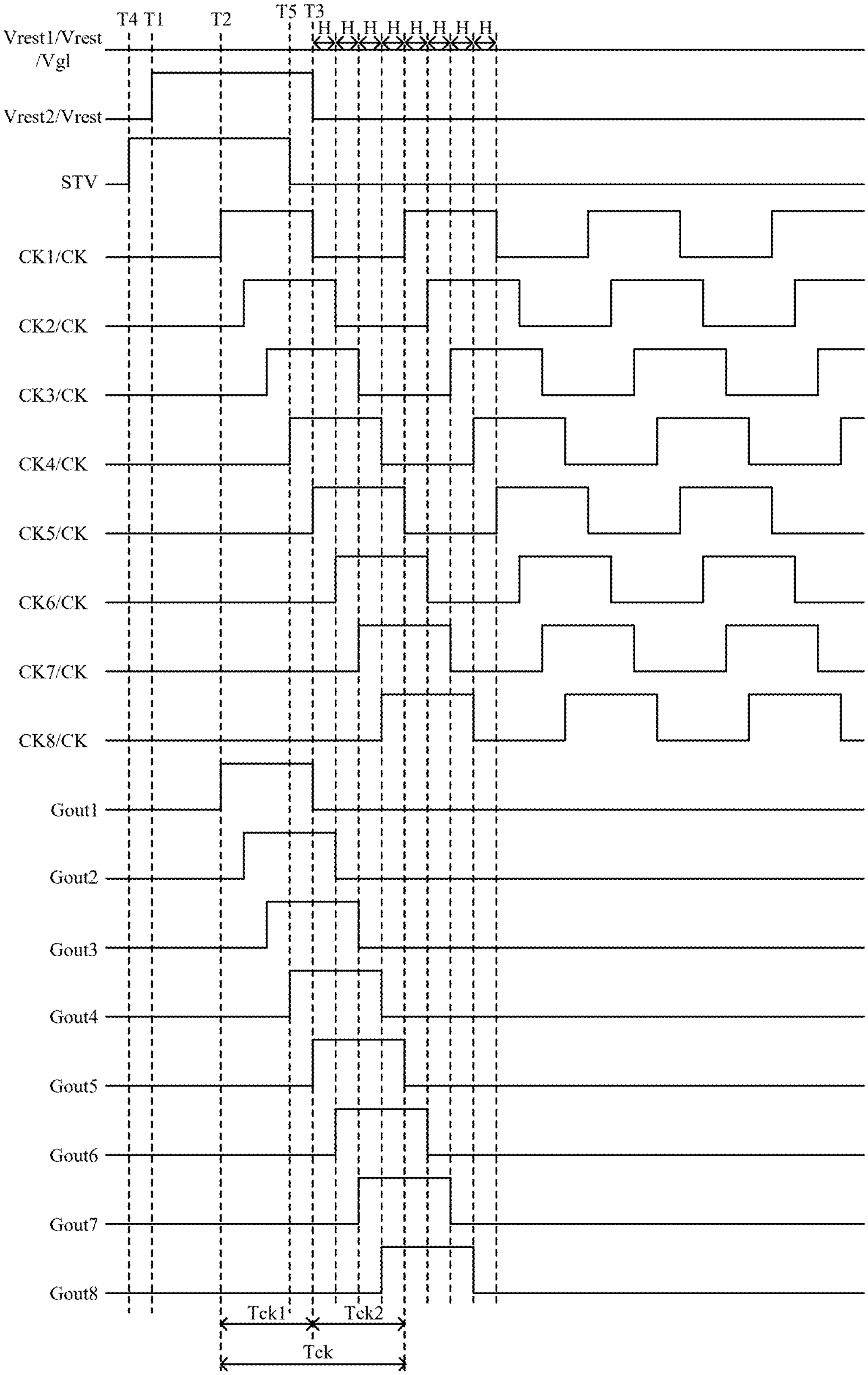
FIG. 16 is a driving time sequence chart of yet another display panel according to embodiments of the present application.

In an example, FIG. 15 is a partial schematic structural view of a display panel according to embodiments of the present application, and FIG. 16 is a driving time sequence chart of yet another display panel according to embodiments of the present application; referring to FIG. 15 and FIG. 16, when the stages of shift register units in the driver circuit are all the first-type shift register units, the first stage of the first-type shift register units to the L-th stage of the first-type shift register units are the first shift register units may mean that the first stage of shift register unit ASG1 to the L-th stage of shift register unit ASGL are the first shift register units. In order to sequentially shift the active levels of the gate driving signals Gout (Gout1, . . . , and GoutL) which are output by the first stage of shift register unit ASG1 to the L-th stage of shift register unit ASGL, the active pulses of the first clock signals CK (CK1, . . . , and CKL) which are received by the first stage of shift register unit ASG1 to the L-th stage of shift register unit ASGL are sequentially shifted; and under this condition, the starting moment of the starting active pulse of the first clock signal CK1 which is received by the first stage of shift register unit ASG1 is before the starting moment of the starting active pulse of the first clock signal CK1 which is received by other stages of shift register units ASG. When that the starting moment T1 of the first active pulse is before the starting moment T2 of the starting active pulse of the first clock signal CK1 which is received by the first stage of first-type shift register unit ASG1, the starting moment T1 of the first active pulse may be before the starting moments of the starting active pulses of the first clock signals CK which are received by the stages of first-type shift register units ASG01, which can reduce the problem that the signal output terminals OUT of the stages of second shift register units ASG02 output noise due to the jumping of the starting active pulses of the first clock signals CK which are received by the first shift register units ASG01 from the inactive level to the active level, and increase the accuracy of the gate driving signals Gout which are output by the stages of second shift register units ASG02.

It may be understood that L may be any positive integer and may be specifically provided based on actual needs, which is not specifically limited by the embodiments of the present application. In an optional embodiment, L may be greater than or equal to N, and under this condition, at least the first stage of shift register unit to the N-th stage of shift register unit are the first shift register units; as shown in FIG. 15 and FIG. 16, when N is equal to 4, at least the first stage of shift register unit ASG1 to the fourth stage of shift register unit ASG4 are the first shift register units ASG01, that is, the restoration signal Vrest1 which is received by the restoration signal terminals REST of the first stage of shift register unit ASG1 to the fourth stage of shift register unit ASG4 is at the inactive level, so as to ensure that the stages of shift register units in the first stage of shift register unit ASG1 to the fourth stage of shift register unit ASG4 can sequentially output the active level of the gate driving signals Gout (Gout1, Gout2, Gout3, and Gout4); and meanwhile, since the starting moment T1 of the first active pulse is before the starting moments of the first active pulses of the first clock signals CK (CK1, CK2, CK3, and CK4) which are received by the stages of shift register units in the first stage of shift register unit ASG1 to the fourth stage of shift register unit ASG4, the problem can be reduced that the signal output terminals OUT of the stages of second shift register units ASG02 (ASG5, ASG6, ASG7, and ASG8.) output noise due to the jumping of the first clock signals CK which are received by the first stage of shift register unit ASG1 to the fourth stage of shift register unit ASG4 to the active level for the first time, which is beneficial for increasing the accuracy of the gate driving signals Gout which are output by the stages of shift register units ASG.

Based on the above embodiment, optionally, still referring to FIG. 15 and FIG. 16, every 2*N stages of shift register units ASG in a plurality of stages of shift register units ASG are one shift register unit group, for example, when N is equal to 4, the first stage of shift register unit ASG1 to the eighth stage of shift register unit ASG8 are one shift register unit group; and the display panel further includes 2*N clock signal lines 60, for example, the display panel includes the first clock signal line 61, the second clock signal line 62, the third clock signal line 63, the fourth clock signal line 64, the fifth clock signal line 65, the sixth clock signal line 66, the seventh clock signal line 67, and the eighth clock signal line 68.

The first clock terminals CLK of the shift register units ASG in the same shift register unit group are connected to the clock signal lines 60; for example, the first clock terminal CLK of the first stage of shift register unit ASG1 is connected to the first clock signal line 61, the first clock terminal CLK of the second stage of shift register unit ASG2 is connected to the second clock signal line 62, the first clock terminal CLK of the third stage of shift register unit ASG3 is connected to the third clock signal line 63, the first clock terminal CLK of the fourth stage of shift register unit ASG4 is connected to the fourth clock signal line 64, the first clock terminal CLK of the fifth stage of shift register unit ASG5 is connected to the fifth clock signal line 65, the first clock terminal CLK of the sixth stage of shift register unit ASG6 is connected to the sixth clock signal line 66, the first clock terminal CLK of the seventh stage of shift register unit ASG7 is connected to the seventh clock signal line 67, and the first clock terminal CLK of the eighth stage of shift register unit ASG8 is connected to the eighth clock signal line 68; so that the stages of shift register units ASG (ASG1, ASG2, ASG3, ASG4, ASG5, ASG6, ASG7, and ASG8) in the same shift register unit group can receive different first clock signals CK (CK1, CK2, CK3, CK4, CK5, CK6, CK7, and CK8), respectively.

The time length of the clock cycle Tck of the clock signals CK which are provided by the clock signal lines 60 is 2*N*H, and H is one clock unit time length; the time length Tck1 of the active pulse of the first clock signal CK is N*H; within one clock cycle Tck, the starting moments of the active pulses of the clock signals CK which are provided by the clock signal lines 60 are sequentially shifted by 1H, that is, the starting moments of the active pulses of the first clock signals CK which are received by the stages of shift register units ASG in the same shift register unit group are sequentially shifted.

Specifically, since the gate driving signal Gouti which is output by the i-th stage of shift register unit ASGi is used as the input signal Vini+N of the (i+N)-th stage of shift register unit ASGi+N, for example, the gate driving signal Gout1 which is output by the first stage of shift register unit ASG1 is the input signal Vin5 of the fifth stage of shift register unit ASG5, so that the input module 110 of the fifth stage of shift register unit ASG5 can charge the first node PU under the control of the received input signal Vin5; in addition, in the process of charging the first node PU of the fifth stage of shift register unit ASG5, the first clock signal CK5 which is received by the output module 120 thereof is at the inactive level, and within the time period Tck2 during which the first clock signal CK1 of the first stage of shift register unit ASG1 is at the inactive level, the first clock signal CK5 of the fifth stage of shift register unit ASG5 may be at the active level, so as to prevent the ON feature of the output module 120 of the fifth stage of shift register unit ASG5 from being affected due to the signal instability of the first node PU in the process of charging the first node PU, which further prevent the accuracy of the active level of the gate driving signal Gout5 which is output by the fifth stage of shift register unit ASG5 being affected. In this way, the active pulse duration of the first clock signal CK5 which is received by the fifth stage of shift register unit ASG5 does not overlap the active pulse duration of the first clock signal CK1 which is received by the first stage of shift register unit ASG1, and similar requirements are made on the first clock signal CK2 which is received by the second stage of shift register unit ASG2 and the first clock signal CK6 which is received by the sixth stage of shift register unit ASG6, the first clock signal CK3 which is received by the third stage of shift register unit ASG3 and the first clock signal CK7 which is received by the seventh stage of shift register unit ASG7, and the first clock signal CK4 which is received by the fourth stage of shift register unit ASG4 and the first clock signal CK8 which is received by the eighth stage of shift register unit ASG8.

In addition, since the output modules 120 in the shift register units ASG can transmit the first clock signals CK to the signal output terminals OUT thereof when the signals of the first nodes PU thereof are at the active level, the gate driving signals Gout which are output by the signal output terminals OUT can be maintained consistent with the first clock signals CK which are received thereby, that is, when the first clock signals CK are at the active level, the gate driving signals Gout which are output by the signal output terminals Gout thereof are at the active level. In this way, sequentially shifting the starting moments of the active pulses of the first clock signals CK which are received by the stages of shift register units ASG in the same shift register unit group by 1H can ensure that the moments of the active pulses of the gate driving signals Gout which are output by the stages of shift register units ASG in the same shift register unit group are sequentially shifted by 1H. For example, the starting moments of the active pulses of the first clock signals CK (CK1, CK2, CK3, CK4, CK5, CK6, CK7, and CK8) which are received by the first stage of shift register unit ASG1 to the eighth stage of shift register unit ASG8 are sequentially shifted by 1H, so that the starting moments of the active levels of the gate driving signals Gout (Gout1, Gout2, Gout3, Gout4, Gout5, Gout6, Gout7, Gout8) which are output by the first stage of shift register unit ASG1 to the eighth stage of shift register unit ASG8 may be sequentially shifted by 1H.

It may be understood that, since the display panel may further include the plurality of pixels which are arranged in an array and the plurality of gate signal lines, and the pixels which are located in the same row may be electrically connected to the same gate signal line, it is necessary to control the stages of shift register units to provide the gate driving signals to the gate signal lines within one frame period to sequentially scan the rows of pixels, so that the display signals (such as the data signals) of the rows of pixels can be written in a time-shared manner. Under this condition, by sequentially shifting the active pulses of the gate driving signals which are output by the stages of shift register units in the driver circuit by 1H, the active pulses of the gate driving signals corresponding to two adjacent rows of pixels contain overlapped 3H, and the next gate driving signal is delayed by 1H compared to the previous gate driving signal, so that the row where the pixels corresponding to the next gate driving signal are located may have the time length of 3H for pre-charging using the data signal corresponding to the pixels corresponding to the previous gate driving signal and contain the time length of 1H for charging using the data signal corresponding to the current row of pixels, which can ensure that the duration for separately writing the display signal to each row of pixels is 1H and ensure the charging time length and the writing accuracy of the display signals of the pixels.

Further, when the starting moment T1 of the first active pulse is before the starting moment T2 of the starting active pulse of the first clock signal CK1 of the first stage of shift register unit ASG1, the starting moment T1 of the first active pulse may be before the starting moments of the starting active pulses of the first clock signals CK of the stages of shift register units ASG, which can reduce the problem that the signal output terminals OUT of the second shift register units ASG02 output noise due to the jumping of the first clock signals CK of the stages of shift register units ASG to the active level for the first time and can ensure the accuracy of the gate driving signals Gout which are output by the stages of shift register units ASG01.

Figure 17:
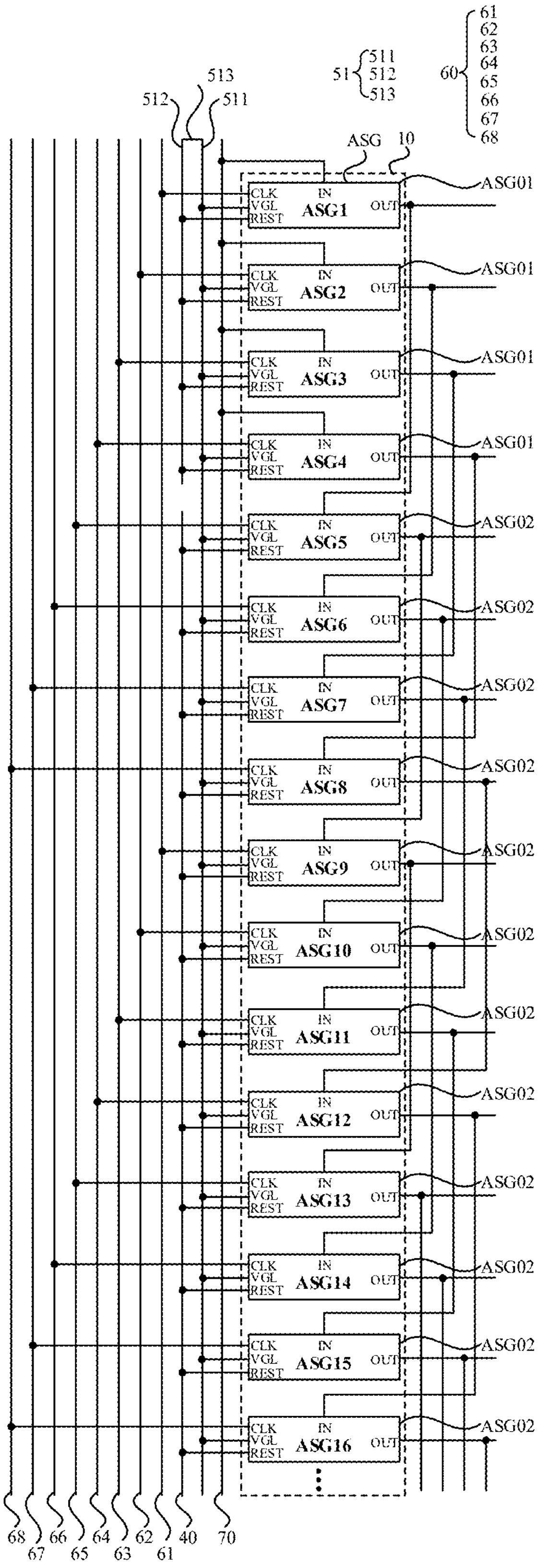
FIG. 17 is a partial schematic structural view of another display panel according to embodiments of the present application.

Based on the above embodiment, optionally, FIG. 17 is a partial schematic structural view of another display panel according to embodiments of the present application; when every 2*N stages of shift register units ASG are one shift register unit group, and the stages of shift register units ASG in the same shift register unit group are electrically connected to the clock signal lines 60, respectively; the first clock terminal CLK of the i-th stage of shift register unit ASGi and the first clock terminal CLK of the (i+2*N)-th stage of shift register unit ASGi+2*N are connected to the same clock signal line 60, for example, taking for the example that N is equal to 4, the first clock terminal CLK of the first stage of shift register unit ASG1 and the first clock terminal CLK of the ninth stage of shift register unit ASG9 are both connected to the first clock signal line 61, the first clock terminal CLK of the second stage of shift register unit ASG2 and the first clock terminal CLK of the tenth stage of shift register unit ASG10 are both connected to the second clock signal line 62, the first clock terminal CLK of the third stage of shift register unit ASG3 and the first clock terminal CLK of the eleventh stage of shift register unit ASG11 are both connected to the third clock signal line 63, the first clock terminal CLK of the fourth stage of shift register unit ASG4 and the first clock terminal CLK of the twelfth stage of shift register unit ASG12 are both connected to the fourth clock signal line 64, the first clock terminal CLK of the fifth stage of shift register unit ASG5 and the first clock terminal CLK of the thirteenth stage of shift register unit ASG13 are both connected to the fifth clock signal line 65, the first clock terminal CLK of the sixth stage of shift register unit ASG6 and the first clock terminal CLK of the fourteenth stage of shift register unit ASG14 are both connected to the sixth clock signal line 66, the first clock terminal CLK of the seventh stage of shift register unit ASG7 and the first clock terminal CLK of the fifteenth stage of shift register unit ASG15 are both connected to the seventh clock signal line 67, and the first clock terminal CLK of the eighth stage of shift register unit ASG8 and the first clock terminal CLK of the sixteenth stage of shift register unit ASG16 are both connected to the eighth clock signal line 68. Under a condition that the sequentially shifting of the active pulses of the gate driving signals Gout which are output by the stages of shift register units ASG can be ensured, this configuration can be beneficial for reducing the number of the clock signal lines 60, and simplifying the structure of the display panel, and thereby beneficial for the narrow bezel of the display panel.

Figure 18:
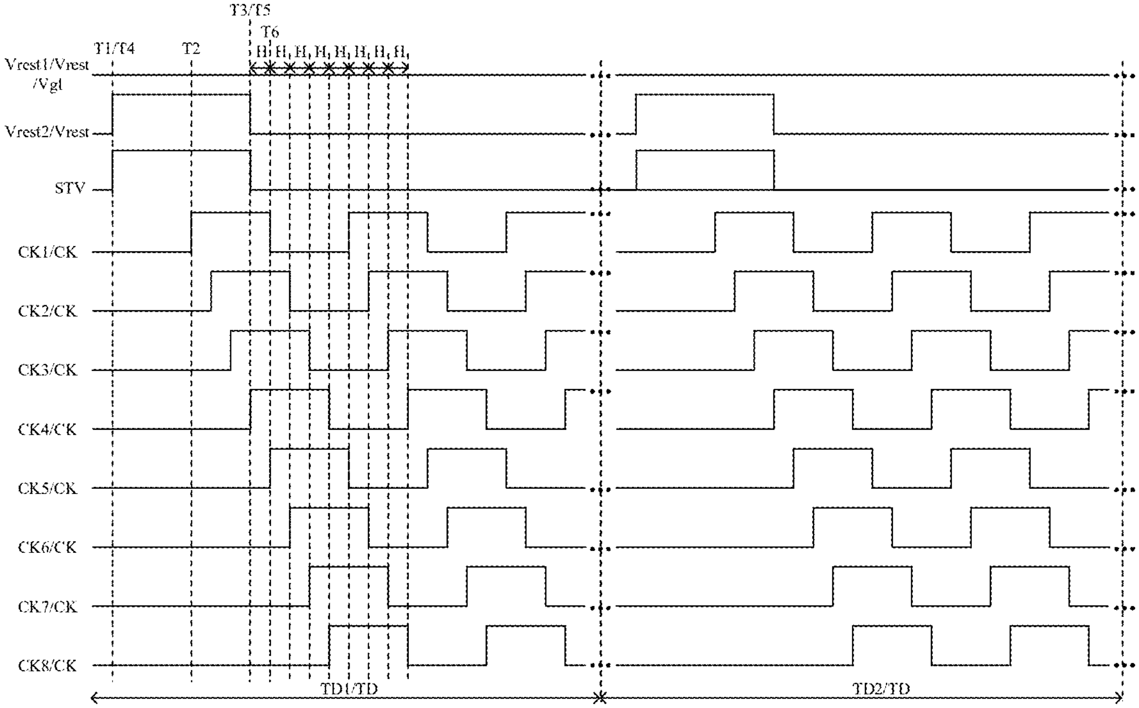
FIG. 18 is a driving time sequence chart of yet another display panel according to embodiments of the present application.

Based on the above embodiment, optionally, FIG. 18 is a driving time sequence chart of yet another display panel according to embodiments of the present application; as shown in FIG. 18, the operation processes of the display panel may include the frame period TD which includes the first active pulse.

Within the frame period TD, the first clock signal CK changes alternately between the active level and the inactive level, so that the active levels of the gate driving signals Gout which are output by the stages of shift register units ASG can be sequentially shifted; after the last stage of shift register unit ASG outputs the active level of the gate driving signal Gout, the first clock signal CK may be maintained at the inactive level to reduce the power consumption due to the repeated jumping of the first clock signal CK, which is beneficial for the low power consumption of the display panel; after entering the next frame period TD, the first clock signal CK may again change alternately between the active level and the inactive level, so that the active levels of the gate driving signals Gout which are output by the stages of shift register units ASG within the frame period TD can be sequentially shifted. In this way, within the starting period of each frame period TD, there are the starting active pulses of the first clock signals CK, and at the starting moments T2 of the starting active pulses, the first clock signals CK jump from the inactive level to the active level, thereby causing that the signal output terminals OUT of the stages of shift register units ASG output noise.

In this embodiment, each frame period TD includes the first active pulse, that is, in each frame period TD, the restoration signal Vrest2 which is received by the second shift register units ASG02 includes the first active pulse, so that, in each frame period TD, before the starting moments T2 of the starting active pulses of the first clock signals CK, the signals of the first nodes PU and the signals of the signal output terminals OUT of the second shift register units ASG02 are pulled down to be consistent with the first level signal, thereby reducing the output noise of the stages of second shift register units ASG02 and improving the accuracy of the gate driving signals which are output by the stages of second shift register units ASG02.

Based on the above embodiment, optionally, referring to FIG. 17 and FIG. 18, the display panel may further include the start signal line 70 for transmitting the start control signal STV; the signal input terminals IN of the first stage of shift register unit ASG1 to the N-th stage of shift register unit ASGN are all electrically connected to the start signal line 70, so that the start control signal STV which is transmitted by the start signal line 70 can be provided to the signal input terminals IN of the first stage of shift register unit ASG1 to the N-th stage of shift register unit ASGN to control the input modules 110 in the first stage of shift register unit ASG1 to the N-th stage of shift register unit ASGN to charge the first nodes PU thereof, respectively, and the signals of the first nodes PU can control the output modules 120 thereof to transmit the first clock signals CK (CK1, . . . , and CKN) which are received thereby to the signal output terminals OUT thereof; since the active pulses of the first clock signals CK (CK1, . . . , and CKN) which are received by the first stage of shift register unit ASG1 to the N-th stage of shift register unit ASGN are sequentially shifted, the active levels of the gate driving signals Gout (Gout1, . . . , and GoutN) which are output by the signal output terminals of the first stage of shift register unit ASG1 to the N-th stage of shift register unit ASGN can be sequentially shifted.

It may be understood that since the active pulse of the start control signal STV may control the input modules of the first stage of shift register unit ASG1 to the N-th stage of shift register unit ASGN to charge the first nodes PU thereof, the active levels of the gate driving signals Gout (Gout1, . . . , and GoutN) which are output by the signal output terminals OUT of the first stage of shift register unit ASG1 to the N-th stage of shift register unit ASGN can be sequentially shifted; the (N+1)-th shift register unit ASGN+1 to the (N+N)-th shift register unit ASGN+N which are respectively electrically connected to the signal output terminals OUT of the first stage of shift register unit ASG1 to the N-th stage of shift register unit ASGN can sequentially charge the first nodes PU when receiving the active levels of the gate driving signals Gout (Gout1, . . . , and GoutN) which are output by the signal output terminals OUT of the first stage of shift register unit ASG1 to the N-th stage of shift register unit ASGN, and the (N+1)-th stage of shift register unit ASGN+1 to the (N+N)-th stage of shift register unit ASGN+N can sequentially output the active levels of the gate driving signals Gout; and similarly, the gate driving signals Gout (GoutN+1, . . . , and Gout N+N) which are output by the stages of shift register units ASG can be sequentially shifted, thereby carrying out progressive scanning on the rows of pixels. Therefore, at the beginning of each frame period, the active pulse of the activation signal may be provided to the start signal line 70, so that the active levels of the gate driving signals Gout can be sequentially output from the first stage of shift register unit ASG1 to the last stage of shift register unit.

Optionally, still referring to FIG. 17 and FIG. 18, the starting moment T4 of the active pulse of the start control signal STV is before the starting moment of the starting active pulse of the first clock signal CK1 which is received by the first stage of shift register unit ASG1, and the terminating moment T5 of the active pulse of the start control signal STV is before the terminating moment T6 of the starting active pulse of the first clock signal CK1 which is received by the first stage of shift register unit ASG1.

Specifically, the starting moment T4 of the active pulse of the start control signal STV is before the starting moment of the starting active pulse of the first clock signal CK1 which is received by the first stage of shift register unit ASG1, so that before the starting moment of the starting active pulse of the first clock signal CK1 which is received by the first stage of shift register unit ASG1, the active pulse of the start control signal STV may control the input modules 110 in the first stage of shift register unit ASG1 to the N-th stage of shift register unit ASGN to charge the first nodes PU thereof, respectively; when the first stage of shift register unit ASG1 receives the starting active pulse of the first clock signal CK1, the signals of the first nodes PU of the first stage of shift register unit ASG1 to the N-th stage of shift register unit ASGN can meet the ON requirements of the output modules 120 thereof, so that the first stage of shift register unit ASG1 to the N-th stage of shift register unit ASGN can accurately output the active levels of the gate driving signals Gout (Gout1, . . . , and GoutN).

In addition, the terminating moment T5 of the active pulse of the start control signal STV is before the terminating moment T6 of the starting active pulse of the first clock signal CK1 which is received by the first stage of shift register unit ASG1, so that before the terminating moment T6 of the starting active pulse of the first clock signal CK1 which is received by the first stage of shift register unit ASG1, the input modules 110 of the first stage of shift register unit ASG1 to the N-th stage of shift register unit ASGN are controlled to stop charging the first nodes PU thereof, and under a condition that no other signal is written in, the potential of the first nodes PU of the first stage of shift register unit ASG1 to the N-th stage of shift register unit ASGN may be maintained unchanged. In this way, the problem that the accuracy of the gate driving signal Gout1 which is output by the first stage of shift register unit ASG1 is affected by the too long duration of the active pulse of the start control signal STV can be prevented, thereby ensuring that the stages of shift register units ASG can accurately output the gate driving signals Gout.

It may be understood that since the signal output terminal OUT of the first stage of shift register unit ASG1 is electrically connected to the signal input terminal IN of the (N+1)-th stage of shift register unit ASGN+1; in order to ensure that the (N+1)-th stage of shift register unit ASGN+1 stably outputs the active level of the gate driving signal GoutN+1, the first clock signal CKN+1 which is received by the (N+1)-th stage of shift register unit ASGN+1 may be maintained at the inactive level when the signal output terminal OUT of the first stage of shift register unit ASG1 outputs the active level of the gate driving signal Gout1, that is, the starting moment of the starting active pulse of the first clock signal CKN+1 of the (N+1)-th stage of shift register unit ASGN+1 may be after the terminating moment of the starting active pulse of the first clock signal CK1 of the first stage of shift register unit ASG1 or may be the same moment as the terminating moment of the starting active pulse of the first clock signal CK1 of the first stage of shift register unit ASG1. In this way, the terminating moment T5 of the active pulse of the start control signal STV should be before the starting moment of the starting active pulse of the first clock signal CKN+1 of the (N+1)-th stage of shift register unit ASGN+1, so that it can be ensured that the (N+1)-th stage of shift register unit ASGN+1 accurately outputs the active level of the gate driving signal.

Optionally, still referring to FIG. 17 and FIG. 18, when the time length of the clock cycle of the first clock signal CK is 2*N*H, the time length of the active pulse of the first clock signal CK is N*H, and H is one clock unit time length; the time interval between the starting moment T4 of the active pulse of the start control signal STV and the starting moment T2 of the starting active pulse of the first clock signal CK which is received by the first stage of shift register unit ASG1 is greater than or equal to N*H.

When the signal input terminals IN of the first stage of shift register unit ASG1 to the N-th stage of shift register unit ASGN are all electrically connected to the start signal line 70, the start signal line 70 needs to provide the start control signal STV to the signal input terminals IN of the first stage of shift register unit ASG1 to the N-th stage of shift register unit ASGN, so that the start control signal STV which is transmitted by the start signal line 70 needs a certain current carrying capacity, and there is a certain voltage drop in the transmission process of the start control signal STV. Since the active pulses of the first clock signals CK which are received by the first stage of shift register unit ASG1 to the N-th stage of shift register unit ASGN are sequentially shifted, and the signal input terminals IN of the first stage of shift register unit ASG1 to the N-th stage of shift register unit ASGN receive the same start control signal STV, the durations for charging the first nodes PU of the first stage of shift register unit ASG1 to the N-th stage of shift register unit ASGN are sequentially reduced before the starting moments of the active pulses of the first clock signals CK of the stages of shift register units ASG1-N, and the duration for charging the first node PU of the first stage of shift register unit ASG1 is the least compared to the durations for charging the first nodes PU of the second stage of shift register unit ASG2 to the N-th stage of shift register unit ASGN; since from the (N+1)-th stage of shift register unit ASGN+1, the input signals which are received by the signal input terminals IN of the stages of shift register units ASG are sequentially shifted, and the first clock signals CK which are received by the first clock signal terminals CLK of the stages of shift register units ASG are sequentially shifted, from the (N+1)-th stage of shift register unit ASGN+1, the durations for charging the first nodes PU of the stages of shift register units are the same before the active pulses of the first clock signals CK thereof start, and the charging duration is N*H; in order to ensure the basic duration for charging the first node PU of the first stage of shift register unit ASG1 and ensure that the gate signal output performance of the first stage of shift register unit ASG1 is consistent with the performance of other stages of shift register units ASG, it is necessary to set the time interval between the starting moment T4 of the active pulse of the start control signal STV and the starting moment T2 of the starting active pulse of the first clock signal CK which is received by the first stage of shift register unit ASG1 to be greater than or equal to N*H, so that within at least the duration of N*H before the starting moment T2 of the starting active pulse of the first clock signals CK, the start signal line 70 can start transmitting the active level of the start control signal STV to control the input modules IN of the first stage of shift register unit ASG1 to the N-th stage of shift register unit ASGN to have sufficient durations for charging the first nodes PU thereof, and when the first clock signals CK (CK1, . . . , and CKN) of the first stage of shift register unit ASG1 to the N-th stage of shift register unit ASGN jump to the active pulses, the signals of the first nodes PU can accurately control the output modules 120 to be in the ON state, which can ensure the accuracy of the gate driving signals Gout (Gout1, . . . , and GoutN) which are output by the first stage of shift register unit ASG1 to the N-th stage of shift register unit ASGN.

It may be understood that under a condition that the time interval between the starting moment T4 of the active pulse of the start control signal STV and the starting moment T2 of the starting active pulse of the first clock signal CK which is received by the first stage of shift register unit ASG1 is greater than or equal to N*H, the greater the time interval between the starting moment T4 of the active pulse of the start control signal STV and the starting moment T2 of the starting active pulse of the first clock signal CK which is received by the first stage of shift register unit ASG1 is, the greater the durations for charging the first nodes PU of the first stage of shift register unit ASG1 to the N-th stage of shift register unit ASGN are, and the greater the capability of the output modules 120 of the first stage of shift register unit ASG1 to the N-th stage of shift register unit ASGN to transmit the first clock signals CK (CK1, . . . , and CKN) to signal output terminals OUT thereof is. Therefore, within the range of the driving capability of the display panel, the time interval between the starting moment T4 of the active pulse of the start control signal STV and the starting moment T2 of the starting active pulse of the first clock signal CK which is received by the first stage of shift register unit ASG1 may be controlled to be as long as possible, which may be specifically provided based on actual needs and is not particularly limited by the embodiments of the present application.

Based on the above embodiment, optionally, still referring to FIG. 17 and FIG. 18, the starting moment T1 of the first active pulse is the same moment as the starting moment T4 of the active pulse of the start control signal STV.

The starting moment T1 of the first active pulse is the same moment as the starting moment T4 of the active pulse of the start control signal STV may mean that the driver chip which is configured to drive the display panel to display starts providing the first active pulse and the active pulse of the start control signal STV at the same moment, or the start signal line 70 starts transmitting the active pulse of the start control signal STV while the restoration signal line 40 for transmitting the restoration signal Vrest2 receives the first active pulse. In this way, the starting moment T1 of the first active pulse is the same moment as the starting moment T4 of the active pulse of the start control signal STV, so that the driver chip can provide the first active pulse and the active pulse of the start control signal at the same time, and the restoration modules 130 in the second shift register units ASG01 can be controlled by the first active pulse to control the signals of the signal output terminals OUT thereof and the signals of the first nodes PU thereof to be maintained at the inactive level while the start control signal STV which is received by the first stage of shift register unit ASG1 to the N-th stage of shift register unit ASGN jumps from the inactive level to the active level, so as to reduce the effect of the start control signal STV on the accuracy of the gate driving signals Gout which are output by the signal output terminals OUT of the second shift register units, which is beneficial for improving the display effect of the display panel.

Optionally, still referring to FIG. 17 and FIG. 18, the terminating moment T3 of the first active pulse is the same moment as the terminating moment T5 of the active pulse of the start control signal STV.

The terminating moment T3 of the first active pulse is the same moment as the terminating moment T5 of the active pulse of the start control signal STV may mean that the driver chip which is configured to drive the display panel to display stops providing the first active pulse and the active pulse of the start control signal STV at the same time, or when the restoration signal signal Vrest2 which is received by the restoration signal line 40 of the second shift register units ASG02 starts changing from the active level to the inactive level, the start control signal STV which is transmitted by the start signal line 70 starts changing from the active level to the inactive level. By providing the terminating moment T3 of the first active pulse to be the same moment as the terminating moment T5 of the active pulse of the start control signal STV, when the start control signal STV stops controlling the input modules 110 in the first stage of shift register unit ASG1 to the N-th stage of shift register unit ASGN to charge the first nodes PU thereof and the first stage of shift register unit ASG1 to the N-th stage of shift register unit ASGN output the active levels of the gate driving signals Gout under the control of the stable signals of the first nodes PU, it is ensured that the input modules 110 of the second shift register units ASG02 can charge the first nodes PU thereof under the control of the input signals Vin which are received thereby, ensuring that the first nodes PU in the second shift register units ASG02 have a greater charging duration, increasing the accuracy of the signals of the first nodes PU in the second shift register units ASG02, and thus increasing the accuracy of the gate driving signals Gout which are output by the second shift register units ASG02.

It may be understood that the example in which the first stage of shift register units ASG1 to the N-th stage of shift register unit ASGN is given above only as an example to exemplarily illustrate the technical solution of the embodiments of the present application. In addition, when the duration of the first active pulse overlaps the starting active pulses of the first clock signals CK of at least a part of shift register units ASG in the first stage of shift register unit ASG1 to the N-th stage of shift register unit ASGN, the active levels of the gate driving signals Gout which are output by the part of shift register units ASG overlap the first active pulse; under a condition that the shift register units ASG which are electrically connected to the signal output terminals OUT of the part of shift register units ASG are the second shift register units ASG02, when the input modules 110 of the part of second shift register units ASG02 provide the active levels to the first nodes PU, the restoration modules 130 thereof provide the first level signal Vgl to the first nodes PU and cannot charge the first nodes PU, thereby affecting the accuracy of the gate driving signals Gout which are output by the part of second shift register units ASG02.

Figure 19:
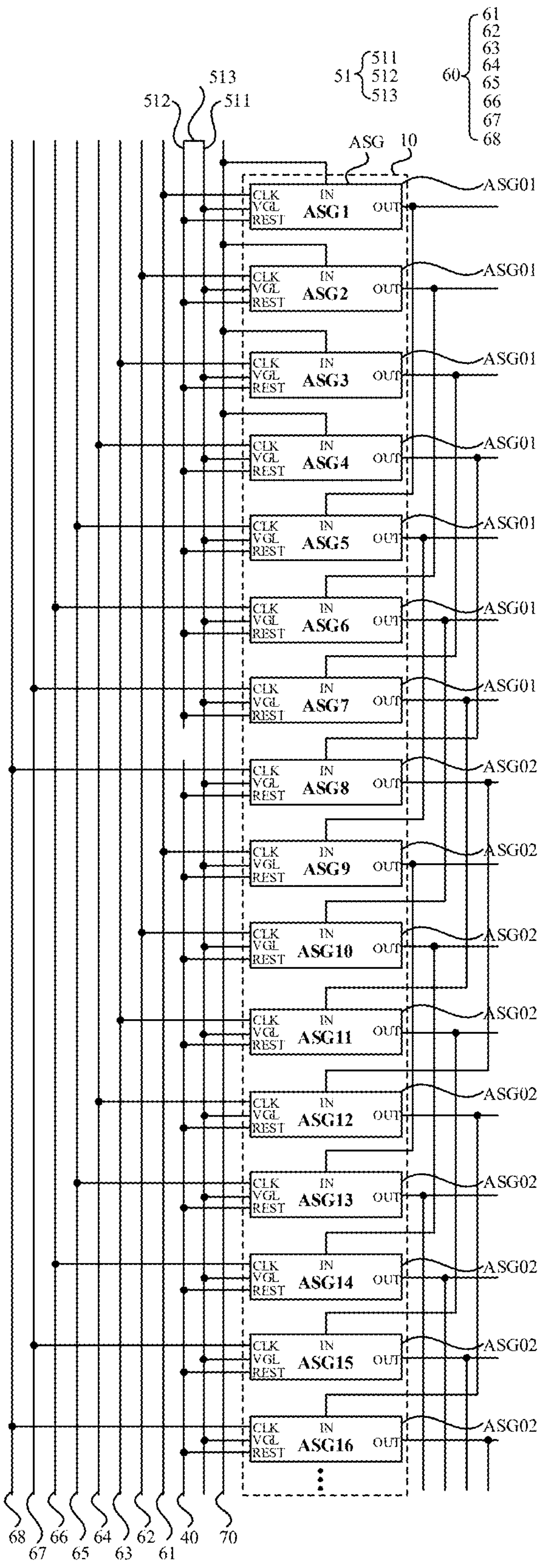
FIG. 19 is a partial schematic structural view of yet another display panel according to embodiments of the present application.

In an optional embodiment, FIG. 19 is a partial schematic structural view of yet another display panel according to embodiments of the present application; referring to FIG. 18 and FIG. 19, the duration of the first active pulse overlaps the durations of the active pulses of the first clock signals CK (CK1, . . . , and CKN) of the first stage of shift register unit ASG1 to the M-th stage of shift register unit ASGM, and the duration of the first active pulse does not overlap the duration of the active pulse of the first clock signal CKM+1 of the (M+1)-th stage of shift register unit ASGM+1; M≤N, and M is a positive integer; and under this condition, the first stage of shift register unit ASG1 to the (M+N)-th stage of shift register unit ASGM+N may be all the first shift register units ASG01.

In an example, taking for the example that the duration of the first active pulse overlaps the durations of the active pulses of the first clock signals CK (CK1, CK2, and CK3) of the first stage of shift register unit ASG1 to the third stage of shift register unit ASG3, within the time period during which the first stage of shift register unit ASG1 to the third stage of shift register unit ASG3 output the active levels of the gate driving signals Gout (Gout1, Gout2, and Gout3), the restoration signal Vrest2 of the second shift register units ASG02 is at the active level; under this condition, under a condition that the fifth stage of shift register unit ASG5 to the seventh stage of shift register unit ASG7 are the second shift register units ASG02, the duration for charging the first node PU in the fifth stage of shift register unit ASG5 maybe shortened to 1*H, the duration for charging the first node PU in the sixth stage of shift register unit ASG6 may be shortened to 2*H, the duration for charging the first node PU in the seventh stage of shift register unit ASG7 may be shortened to 3*H, and the duration for charging the first node PU in the eighth stage of shift register unit ASG8 may be 4*H; in this way, the durations for charging the first nodes PU in the fifth stage of shift register unit ASG5 to the seventh stage of shift register unit ASG7 are shorter than the duration for charging the first node PU in the eighth stage of shift register unit ASG8, so that the first nodes PU in the fifth stage of shift register unit ASG5 to the seventh stage of shift register unit ASG7 cannot be accurately charged.

In this embodiment, the first stage of shift register unit ASG1 to the (M+N)-th stage of shift register unit ASGM+N may be all the first shift register units ASG01, that is, the first stage of shift register unit ASG1 to the seventh stage of shift register unit ASG7 may be all the first shift register units ASG01, so that it can be ensured that the restoration signal Vrest1 which is received by the restoration signal terminals REST of the first stage of shift register unit ASG1 to the seventh stage of shift register unit ASG7 is at the inactive level, and thus within the duration that the first stage of shift register unit ASG1 outputs the active level of the gate driving signal Gout1, the input module 110 in the fifth stage of shift register unit ASG5 can continuously charge the first node PU thereof, within the duration that the second stage of shift register unit ASG2 outputs the active level of the gate driving signal Gout2, the input module 110 in the sixth stage of shift register unit ASG6 can continuously charge the first node PU thereof, and within the duration that the third stage of shift register unit ASG3 outputs the active level of the gate driving signal Gout3, the input module 110 in the seventh stage of shift register unit ASG7 can continuously charge the first node PU thereof, so as to ensure that the first nodes PU in the fifth stage of shift register unit ASG5 to the seventh stage of shift register unit ASG7 have a sufficiently long charging duration, thereby increasing the accuracy of the gate driving signals Gout (Gout5, Gout6, and Gout7) which are output by the fifth stage of shift register unit ASG5 to the seventh stage of shift register unit ASG7.

It may be understood that the example in which the terminating duration T3 of the first active pulse is the same as the terminating duration T5 of the active pulse of the start control signal STV is given above only as an example to exemplarily illustrate the distribution of the first shift register units ASG01 and the second shift register units ASG02 in the first-type shift register units. In other embodiments of the present application, the terminating duration T3 of the first active pulse may be after the terminating duration T5 of the active pulse of the start control signal STV.

Figure 20:
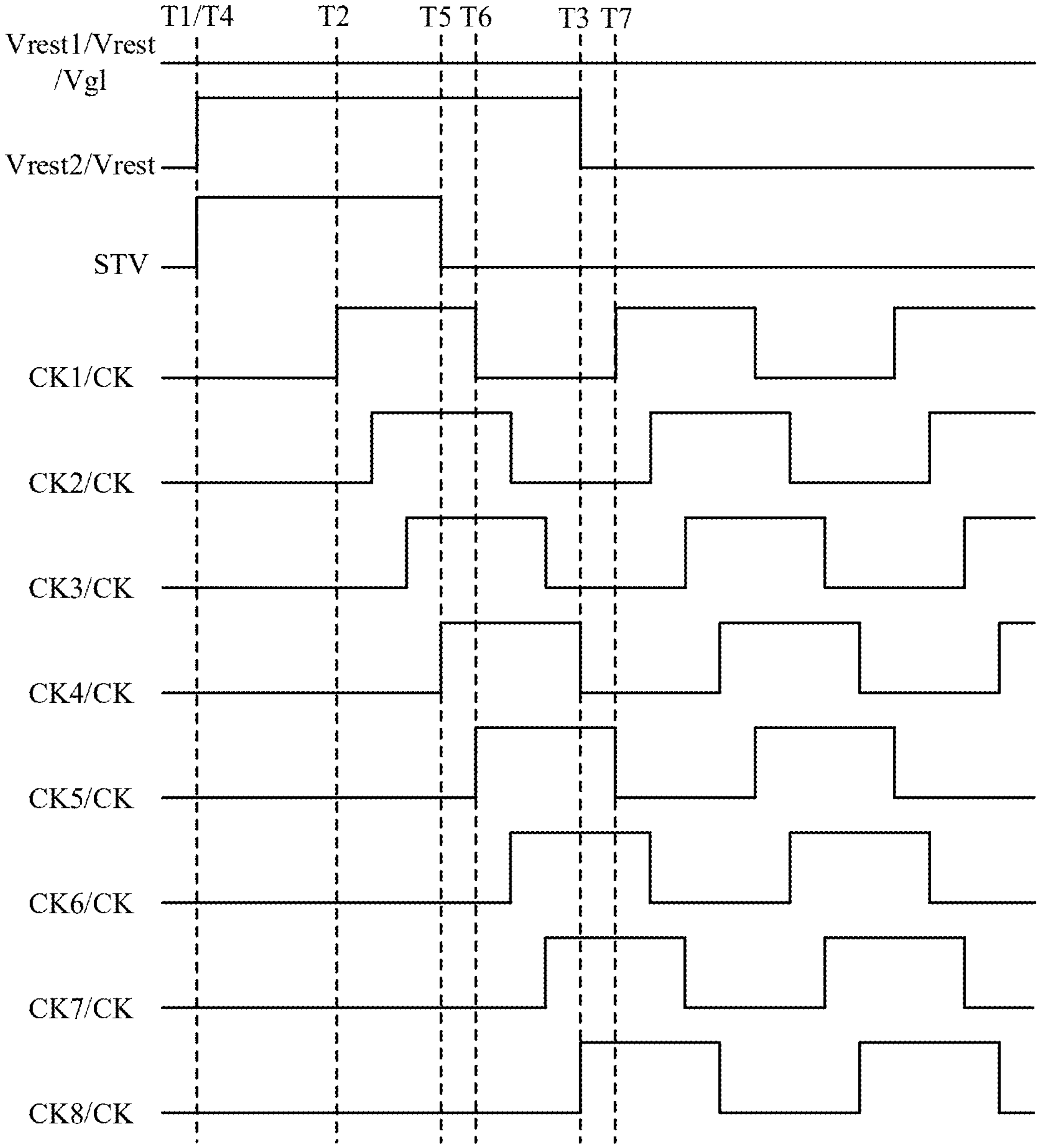
FIG. 20 is a driving time sequence chart of yet another display panel according to embodiments of the present application.

In an optional embodiment, referring to FIG. 19 and FIG. 20, the terminating duration T3 of the first active pulse is after the terminating duration T5 of the start control signal STV, that is, when the start control signal STV jumps from the active level to the inactive level, the restoration signal Vrest2 which is received by the restoration signal terminals REST of the second shift register units ASG02 may continue to be maintained at the active level, so that the first nodes PU and the signal output terminals OUT of the second shift register units ASG02 can continue to be maintained at the inactive level to prevent the signal output terminals OUT of the second shift register units ASG02 from outputting noise due to the effect of the jumping of the start control signal STV from the active level to the inactive level on the gate driving signals Gout which are output by the signal output terminals OUT of the second shift register units ASG02, thereby increasing the accuracy of the gate driving signals Gout which are output by the second shift register units ASG02.

Optionally, still referring to FIG. 19 and FIG. 20, the time period from the terminating moment T6 of the starting active pulse of the first clock signal CK1 which is received by the first stage of shift register unit ASG1 to the starting moment T7 of the next active pulse thereof is the first time period; and the terminating moment T3 of the first active pulse is within the first time period.

The next active pulse of the starting active pulse of the first clock signal CK1 may be understood as the time period during which the first clock signal CK1 changes to the active level for the second time within one frame period, that is, the second active pulse of the first clock signal CK1. The terminating moment T3 of the first active pulse is within the first time period may mean that the terminating moment T3 of the first active pulse may be the same moment as the terminating moment T6 of the starting active pulse of the first clock signal CK1 or the starting moment T7 of the second active pulse of the first clock signal CK1, or the terminating moment T3 of the first active pulse is between the terminating moment T6 of the starting active pulse of the first clock signal CK1 and the starting moment T7 of the second active pulse, which may be specifically provided based on actual needs and is not specifically limited by the embodiments of the present application.

In this embodiment, the terminating moment T3 of the first active pulse is within the first time period, so that when it is ensured that the gate driving signals Gout which are output by the signal output terminals OUT of the second shift register units ASG02 do not change accordingly when the first clock signals CK (CK1, CK2, CK3, and CK4) which are received by the first stage of shift register unit ASG1 to the N-th stage of shift register unit ASGN jump from the inactive level to the active level, the gate driving signals Gout which are output by the signal output terminals OUT of the second shift register units ASG02 do not change accordingly at least when the first clock signal CK1 of the first stage of shift register unit ASG1 jumps from the active level to the inactive level.

It may be understood that the relationship between the terminating moment T3 of the first active pulse and the starting moment and the terminating moment of the starting active pulse of the first clock signals CK which are received by the stages of shift register units ASG can determine the effect of the jumping of the starting active pulse of the first clock signals CK which are received by the stages of shift register units ASG on the output noise of the signal output terminals OUT of the second shift register units ASG02, which is not specifically limited by the embodiments of the present application under a condition that it can be ensured that the stages of shift register units ASG accurately output the gate driving signals Gout.

It may also be understood that when the terminating moment T3 of the first active pulse is within the first time period, the first active pulse may overlap the first clock signals CK whose starting moments are before the terminating moment T3 of the first active pulse, so that the active levels of the gate driving signals Gout which are output by the stages of shift register units ASG which receive the part of first clock signals CK also overlap the first active pulse, resulting in the insufficient duration for charging the first nodes PU of the shift register units ASG which are electrically connected to the signal output terminals of the part of shift register units ASG.

Figure 21:
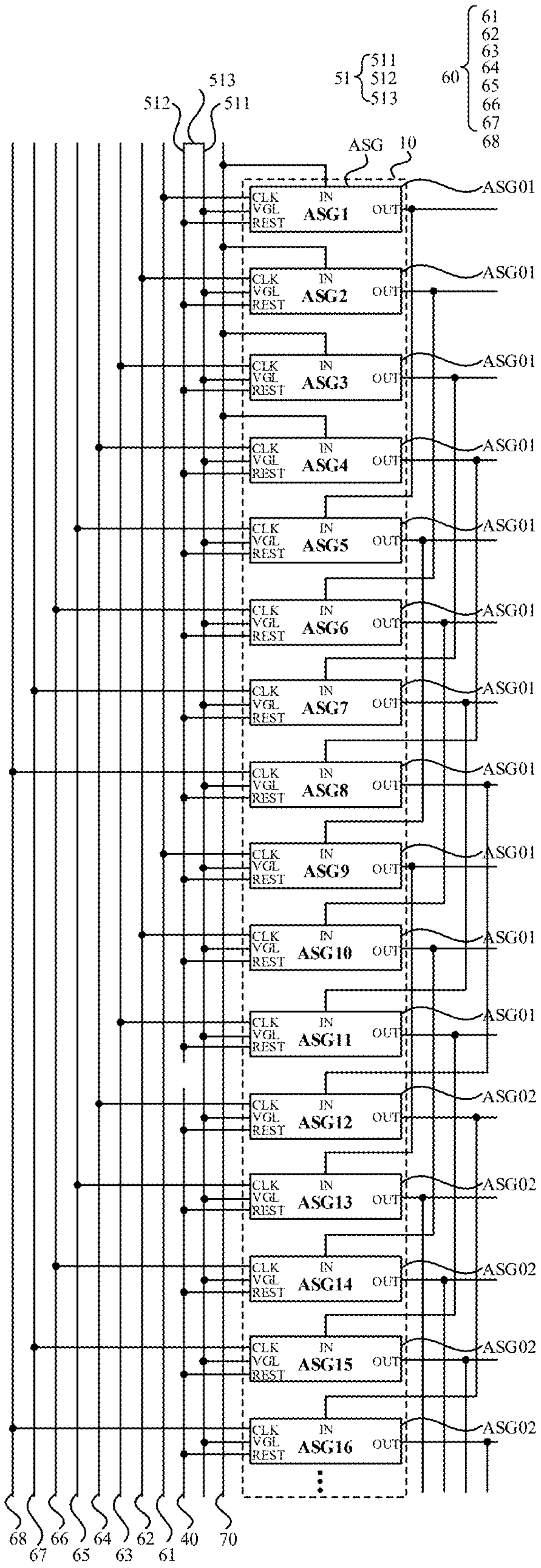
FIG. 21 is a partial schematic structural view of yet another display panel according to embodiments of the present application.

Based on the above embodiment, optionally, FIG. 21 is a partial schematic structural view of yet another display panel according to embodiments of the present application; referring to FIG. 20 and FIG. 21, the duration of the first active pulse overlaps the durations of the active pulses of the first clock signals CK (CK1, . . . , and CKP) of the first stage of shift register unit ASG1 to the P-th stage of shift register unit ASGP, and the duration of the first active pulse does not overlap the duration of the active pulse of the first clock signal CKP+1 of the (P+1)-th stage of shift register unit ASGP+1; N<P≤2N, and P is a positive integer; and under this condition, the first stage of shift register unit ASG1 to the (P+N)-th stage of shift register units ASGP+N are all the first shift register units ASG01.

In an example, taking for the example that the duration of the first active pulse overlaps the durations of the active pulses of the first clock signals CK (CK1, CK2, . . . , and CK7) of the first stage of shift register unit ASG1 to the seventh stage of shift register units ASG7, within the time period during which the first stage of shift register unit ASG1 to the seventh stage of shift register unit ASG7 output the active levels of the gate driving signals Gout (Gout1, Gout2, . . . , and Gout7), the restoration signal Vrest2 of the second shift register units ASG02 is at the active level; under this condition, under a condition that the ninth stage of shift register unit ASG9 to the eleventh stage of shift register unit ASG11 which are electrically connected to the signal output terminals OUT of the fifth stage of shift register unit ASG5 to the seventh stage of shift register unit ASG7 are the second shift register units ASG02, the durations for charging the first nodes PU in the ninth stage of shift register unit ASG9 to the eleventh stage of shift register unit ASG11 are shortened to 1*H, 2*H, and 3*H, respectively, and the duration for charging the first node PU in the twelfth stage of shift register unit ASG12 is 4*H; in this way, the first nodes PU in the ninth stage of shift register unit ASG9 to the eleventh stage of shift register unit ASG11 cannot be accurately charged.

In this embodiment, the first stage of shift register unit ASG1 to the (P+N)-th stage of shift register unit ASGP+N are all the first shift register units ASG01, that is, the first stage of shift register unit ASG1 to the eleventh stage of shift register unit ASG11 are all the first shift register units ASG01, so that it can be ensured that the restoration signal Vrest1 which is received by the restoration signal terminals REST of the first stage of shift register unit ASG1 to the eleventh stage of shift register unit ASG11 is at the inactive level, the first nodes PU in the fifth stage of shift register unit ASG5 to the eighth stage of shift register unit ASG8 can be accurately charged within the duration during which the first stage of shift register unit ASG1 to the fourth stage of shift register unit ASG4 output the active level of the gate driving signal Gout1, and the first nodes PU in the ninth stage of shift register unit ASG9 to the twelfth stage of shift register unit ASG12 can be accurately charged within the duration during which the fifth stage of shift register unit ASG5 to the eighth stage of shift register unit ASG8 output the active level of the gate driving signal Gout2; in this way, it can be ensured that the durations for charging the first nodes PU of the stages of shift register units ASG are all 4*H, thereby ensuring the consistency and accuracy for charging the first nodes PU of the stages of shift register units ASG, and increasing the accuracy of the gate driving signals Gout which are output by the stages of of shift register units ASG.

It should be noted that the distribution of the first shift register units in the driver circuit is illustrated above only as an example, and in the embodiments of the present application, the shift register units in the first-type shift register units of the driver circuit other than the first shift register units may be all the second shift register units, which may be specifically provided based on actual needs and is not specifically limited by the embodiments of the present application. For the convenience of description, and without any particular limitation, the example in which the first stage to the N-th stage of first-type shift register units are the first shift register units and other first-type shift register units are the second shift register units is given in the embodiments of the present application to exemplarily illustrate the technical solutions of the embodiments of the present application.

Figure 22:
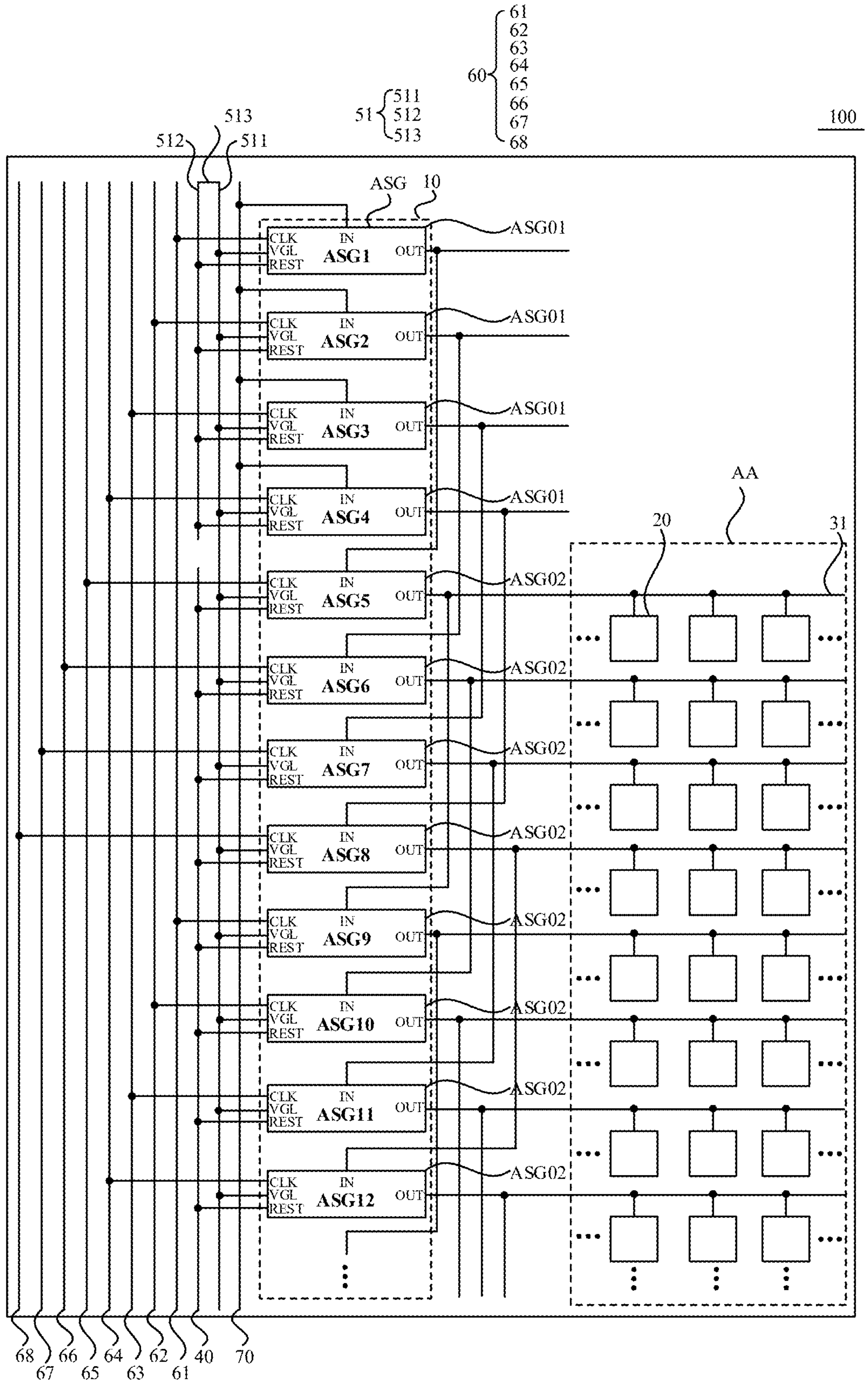
FIG. 22 is a schematic structural view of yet another display panel according to embodiments of the present application.

Optionally, FIG. 22 is a schematic structural view of yet another display panel according to embodiments of the present application; as shown in FIG. 22, when the display panel 100 further includes the plurality of pixels 20 which are arranged in an array, the plurality of gate signal lines 31, and the start signal line 70, and the gate signal lines 31 are electrically connected to the pixels 20, the signal input terminals IN of the first shift register units ASG01 may be electrically connected to the start signal line 70, and the first shift register units ASG01 are not arranged to provide the gate driving signals Gout to the gate signal lines 31. Under this condition, the second shift register units ASG02 may be electrically connected to the gate signal lines 31, respectively, so that the second shift register units ASG02 can provide the gate driving signals Gout to the gate signal lines 31, respectively.

The first shift register units ASG01 may output corresponding gate driving signals Gout under the control of the start control signal STV which is transmitted by the start signal line 70 and the first clock signals CK which are received thereby and use the gate driving signals Gout as the input signals Vin of the second shift register units ASG02 which are in a cascaded connection thereto, so that the second shift register units ASG02 can output corresponding gate driving signals Gout under the control of the input signals Vin, the first clock signals CK, the restoration signal Vrest2, and the first level signal Vgl which are received thereby.

In addition, since there is the difference between the signal which is received by the first shift register units ASG01 and the signal which is received by the second shift register units ASG02, there is the certain difference between the impedance of the first shift register units ASG01 and the impedance of the second shift register units ASG02, resulting in the certain difference between the gate driving signals Gout which are output by the first shift register units ASG01 and the second shift register units ASG02. The second shift register units ASG02 are electrically connected to the gate signal lines 31, respectively, and the first shift register units ASG01 are not electrically connected to the gate signal lines 31, so that it may be ensured that the gate driving signals Gout which are received by the pixels 20 in the display panel 100 are maintained to be consistent, thereby improving the display uniformity of the display panel 100.

Figure 23:
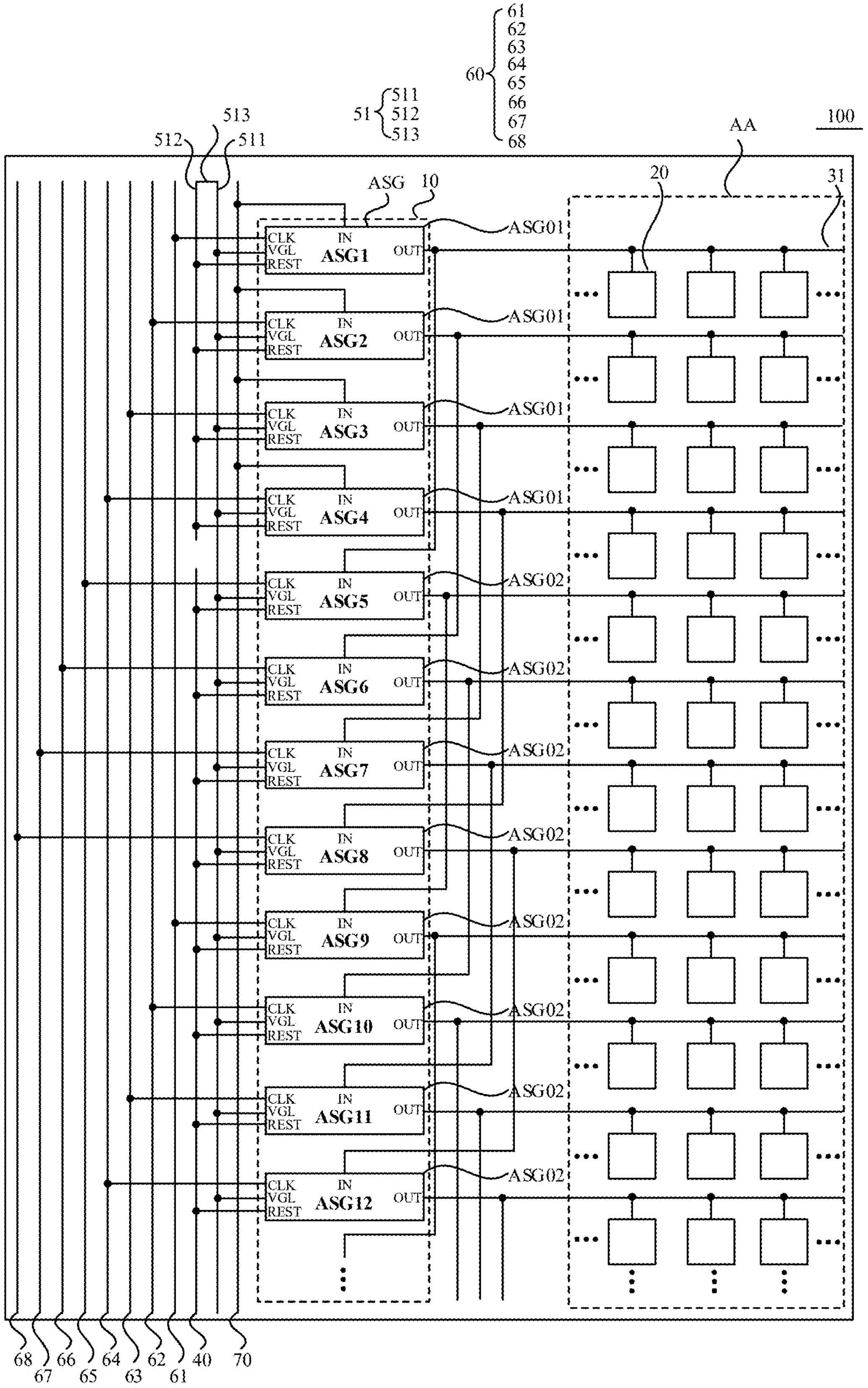
FIG. 23 is a schematic structural view of yet another display panel according to embodiments of the present application.

In other optional embodiments, FIG. 23 is a schematic structural view of yet another display panel according to embodiments of the present application; as shown in FIG. 23, when the display panel 100 includes the plurality of pixels 20 which are arranged in an array and the plurality of gate signal lines 31, and the gate signal lines 31 are electrically connected to the pixels 20, the first shift register units ASG01 provide the gate driving signals to the gate signal lines 31, so that the pixels 20 which are electrically connected to the first shift register units ASG01 by the gate signal lines 31 can write the display signals under the control of the gate driving signals which are output by the first shift register units ASG01; under this condition, the first shift register units ASG01 are not dummy shift register units, and the driver circuit 10 may not be provided with the dummy shift register units or may be provided with other additional dummy shift register units, which may be specifically provided based on actual needs and is specifically limited by the embodiments of the present application.

Figure 24:
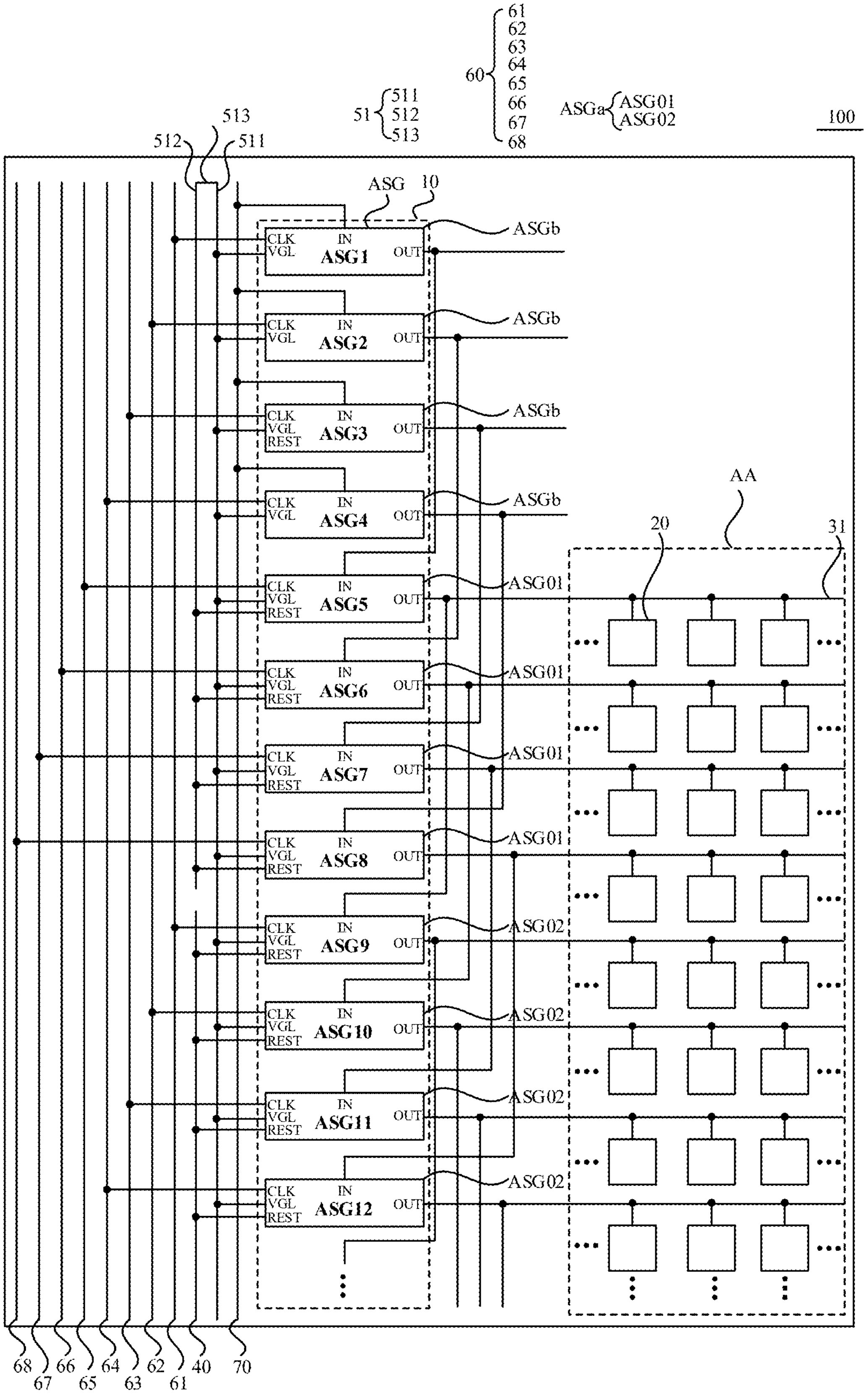
FIG. 24 is a schematic structural view of yet another display panel according to embodiments of the present application.
Figure 25:
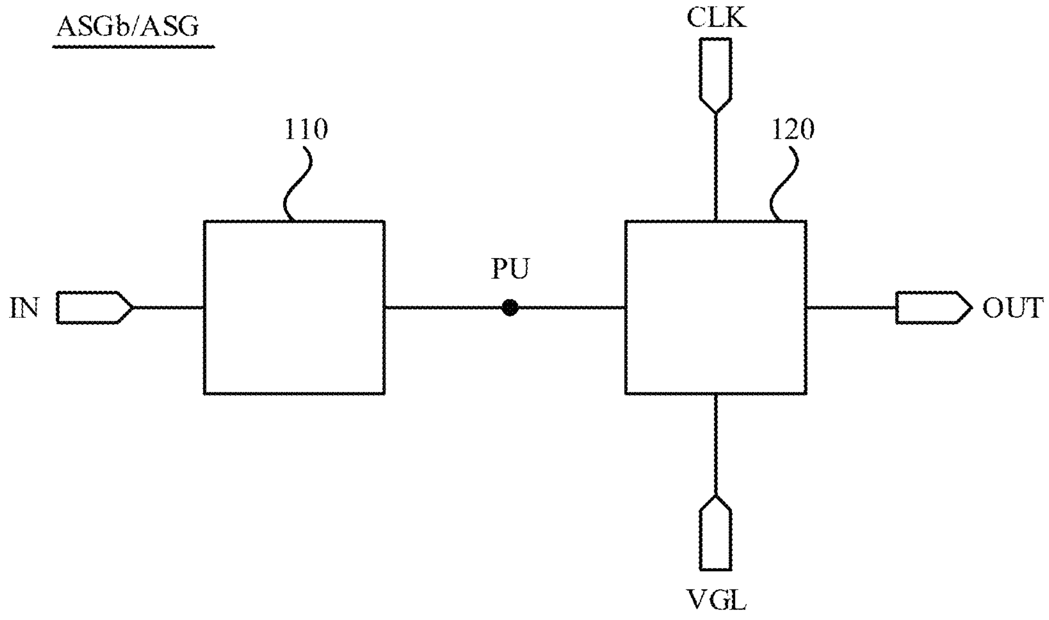
FIG. 25 is a schematic structural view of another shift register unit according to embodiments of the present application.

Based on the above embodiment, optionally, FIG. 24 is a schematic structural view of yet another display panel according to embodiments of the present application, and FIG. 25 is a schematic structural view of another shift register unit according to embodiments of the present application; referring to FIG. 24 and FIG. 25, the shift register units ASG further includes the second-type shift register units ASGb; the second-type shift register units ASGb are not provided with the restoration modules and the restoration signal terminals; further, when the display panel 100 further includes the start signal line 70, the signal input terminals IN of the second-type shift register units ASGb may be electrically connected to the start signal line 70.

Specifically, since the second-type shift register units ASGb are not provided with the restoration modules and the restoration signal terminals, there is no need to provide the restoration signal Vrest to the second-type shift register units ASGb, and the second-type shift register units ASGb have a less complicated structure compared to the first-type shift register units ASGa, so that the second-type shift register units ASGb have a smaller dimension, which can simplify the structure of the driver circuit 10 and is beneficial for the narrow bezel of the display panel. In addition, since the signal input terminals IN of the second-type shift register units ASGb are electrically connected to the start signal line 70, the input modules 110 in the second-type shift register units ASGb can charge the first nodes PU thereof under the control of the start control signal STV which is transmitted by the start signal line 70, so that the signals of the first nodes PU thereof may control the output modules 120 thereof to transmit the first clock signals CK to the signal output terminals OUT thereof, and the second-type shift register units ASGb may output corresponding gate driving signals Gout.

In addition, the signal output terminals OUT of the second-type shift register units ASGb may further be electrically connected to the signal input terminals IN of a part of first-type shift register units ASGa, respectively, so that the part of first-type shift register units ASGa can output corresponding gate driving signals under the control of the gate driving signals Gout which are output by the second-type shift register units ASGb which are in a cascaded connection thereto.

Since the second-type shift register units ASGb are not provided with the restoration modules, there may be the difference between the gate driving signals Gout which are output by the second-type shift register units ASGb and the first-type shift register units ASGa; therefore, the second-type shift register units ASGb may not be electrically connected to the gate signal lines 31, and the gate signal lines 31 may be electrically connected to the first-type shift register units ASGa, respectively, so that the consistency of the gate driving signals Gout which are transmitted by the gate signal lines 31 can be increased, and the display uniformity of the display panel 100 is improved; and under this condition, the second-type shift register units ASGb may exist in the driver circuit 10 as the dummy shift register units.

It should be noted that the arrangement of the dummy shift register units in the driver circuit is illustrated above only as an example, which is not specifically limited by the embodiments of the present application under a condition that the core inventive point of the embodiments of the present application can be achieved. For the convenience of description, and without any particular limitation, the example in which the driver circuit is not provided with additional dummy shift register units is given in the embodiments of the present application to exemplarily illustrate the technical solutions of the embodiments of the present application.

It may be understood that in the embodiments of the present application, the i-th stage of shift register unit ASGi and the (i+N)-th stage of shift register unit ASGi+N are in a cascaded connection, and N may be any positive integer, that is, N may be equal to 1 or greater than 1; and when N is greater than 1, the first stage of shift register unit ASG1 to the N-th stage of shift register unit ASGN may be all electrically connected to the same start signal line or different start signal lines, which may be provided based on actual needs.

Figure 26:
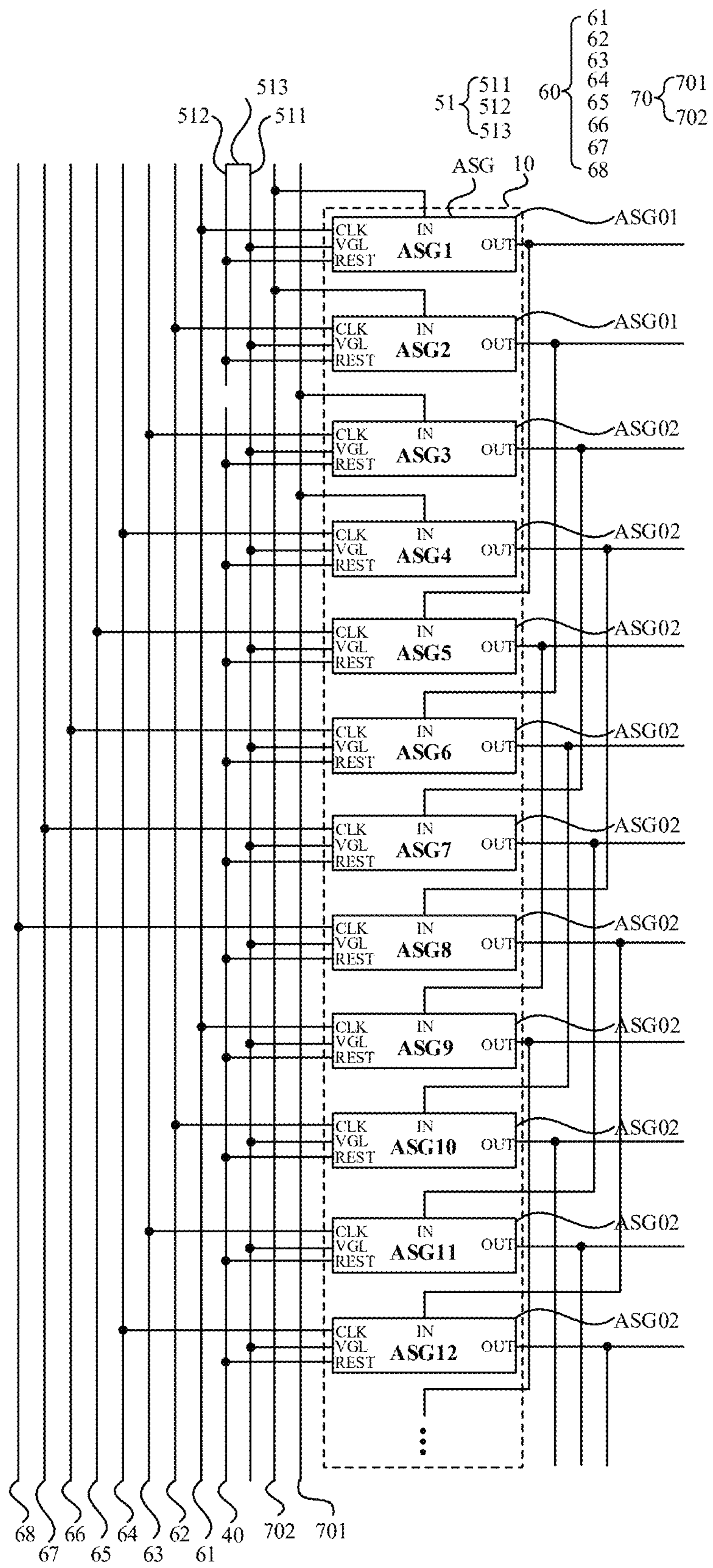
FIG. 26 is a partial schematic structural view of yet another display panel according to embodiments of the present application.
Figure 27:
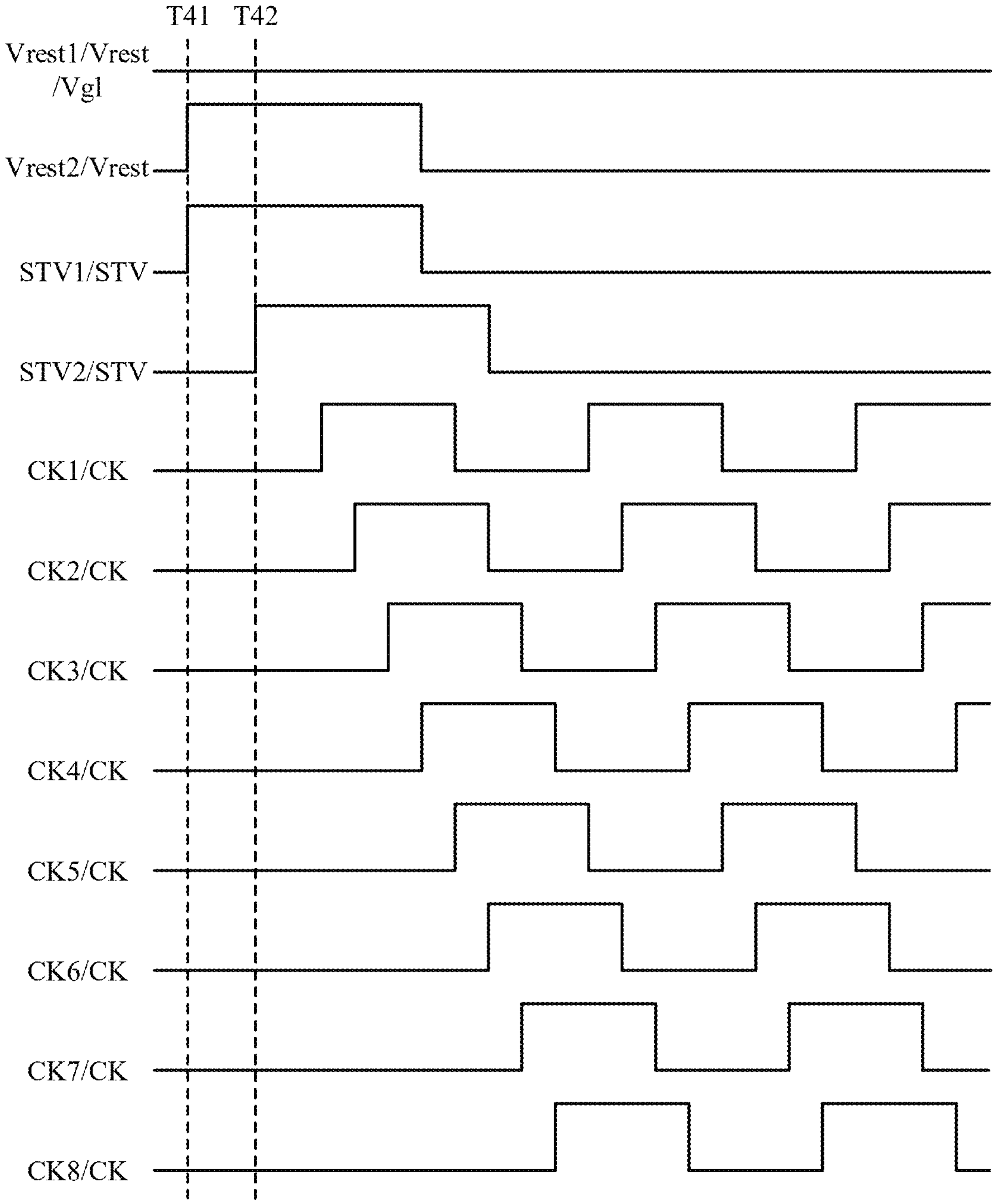
FIG. 27 is a driving time sequence chart of yet another display panel according to embodiments of the present application.

Optionally, FIG. 26 is a partial schematic structural view of yet another display panel according to embodiments of the present application, and FIG. 27 is a driving time sequence chart of yet another display panel according to embodiments of the present application; referring to FIG. 26 and FIG. 27, the display panel further includes M start signal lines 70 for transmitting the start control signals STV; the starting moments of the active pulses of the start control signals STV which are transmitted by the start signal lines 70 are sequentially shifted; $2 \leq M \leq N$, and M is a positive integer; and the shift register units ASG in the first stage of shift register unit ASG1 to the N-th stage of shift register unit ASGN are electrically connected to the start signal lines 70, and each of the start signal lines 70 is electrically connected to at least one stage of shift register unit ASG.

When M is greater than 1 and less than or equal to N, M may be any positive integer from 2 to N, which may be provided based on actual needs and is not specifically limited by the embodiments of the present application.

In an example, taking for the example that the display panel includes two start signal lines 70 and N is equal to 4, that is, the two start signal lines 70 are the first start signal line 701 and the second start signal line 702, the signal input terminals IN of the first stage of shift register unit ASG1 and the second stage of shift register unit ASG2 may be electrically connected to the first start signal line 701, and the signal input terminals IN of the third stage of shift register unit ASG3 and the fourth stage of shift register unit ASG4 may be electrically connected to the second start signal line 702; under this condition, the input modules 110 of the first stage of shift register unit ASG1 and the second stage of shift register unit ASG2 may charge the first nodes PU thereof under the control of the first start control signal STV1 which is transmitted by the first start signal line 701, and the input modules 110 of the third stage of shift register unit ASG3 and the fourth stage of shift register unit ASG4 may charge the first nodes PU thereof under the control of the second start control signal STV2 which is transmitted by the second start signal line 702; in this way, each of the start signal lines 70 is electrically connected to only two stages of the shift register units ASG, which is beneficial for reducing the load amount on each of the start signal lines 70 and increasing the accuracy of the start control signals which are received by the stages of shift register units ASG. In addition, the starting moment T41 of the active pulse of the first start control signal STV1 which is transmitted by the first start signal line 701 and the starting moment T42 of the active pulse of the second start control signal STV2 which is transmitted by the second start signal line 702 are sequentially shifted, so that under a condition that it is ensured that the gate driving signals Gout which are output by the stages of shift register units ASG are sequentially shifted, the duration during which the first start control signal STV1 controls the first stage of shift register unit ASG1 and the second stage of shift register unit ASG2 to charge can be maintained consistent with the duration during which the second start control signal STV2 controls the third stage of shift register unit ASG3 and the fourth stage of shift register unit ASG4 to charge, which is beneficial for increasing the accuracy of the gate driving signals Gout which are output by the stages of shift register units ASG.

Optionally, still referring to FIG. 26 and FIG. 27, the M start signal lines 70 include at least one first start signal line 70; the starting moment T41 of the active pulse of the start control signal STV1 which is transmitted by the first start signal line 701 is before the starting moment T42 of the active pulse of the start control signal STV2 which is transmitted by other start signal line (such as the second start signal line 702); and the stages of shift register units ASG which are electrically connected to at least the first start signal line 701 are the first shift register units ASG01.

In an example, taking for the example that N is equal to 4 and the display panel includes the first start signal line 701 and the second start signal line 702, when the first stage of shift register unit ASG1 and the second stage of shift register unit ASG2 which are electrically connected to the first start signal line 701 are provided as the first shift register units ASG01, and the third stage of shift register unit ASG3 and the fourth stage of shift register unit ASG4 which are electrically connected to the second start signal line 702 are provided as the second shift register units ASG02, the restoration signal terminals REST of the first stage of shift register unit ASG1 and the second stage of shift register unit ASG2 receive the inactive level of the restoration signal Vrest1, so that under the control of the inactive level of the restoration signal Vrest1, the restoration modules 130 in the first stage of shift register unit ASG1 and the second stage of shift register unit ASG2 do not affect the charging of the first nodes PU thereof by the input modules 110 thereof, ensuring that the first stage of shift register unit ASG1 and the second stage of shift register unit ASG2 can accurately output the gate driving signals Gout (Gout1 and Gout2); and before the starting moments of the starting active pulses of the first clock signals CK (CK1 and CK2) which are received by the first stage of shift register unit ASG1 and the second stage of shift register unit ASG2, the first active pulse of the restoration signal Vrest2 which is received by the restoration signal terminals REST of the third stage of shift register unit ASG3 and the fourth stage of shift register unit ASG4 can at least control the gate driving signals Gout (Gout3 and Gout4)) which are output by the signal output terminals OUT of the third stage of shift register unit ASG3 and the fourth stage of shift register unit ASG4 to be maintained at the inactive level to reduce the problem that the signal output terminals OUT of the third stage of shift register unit ASG3 and the fourth stage of shift register unit ASG4 output noise due to the jumping of the first clock signals CK (CK1, CK2) which are received by the first stage of shift register unit ASG1 and the second stage of shift register unit ASG2 for the first time, which is beneficial for increasing the accuracy of the gate driving signals which are output by the stages of shift register units ASG.

It should be noted that the structure, the connection relationship, and the operation processes of the stages of shift register units are illustrated above only as an example; and under a condition that the core inventive point of the embodiments of the present application can be achieved, the structure, the connection relationship, and the operation processes of the stages of shift register units are not limited herein and may be provided based on actual needs. The typical structure of the shift register units will be exemplarily illustrated below.

Figure 28:
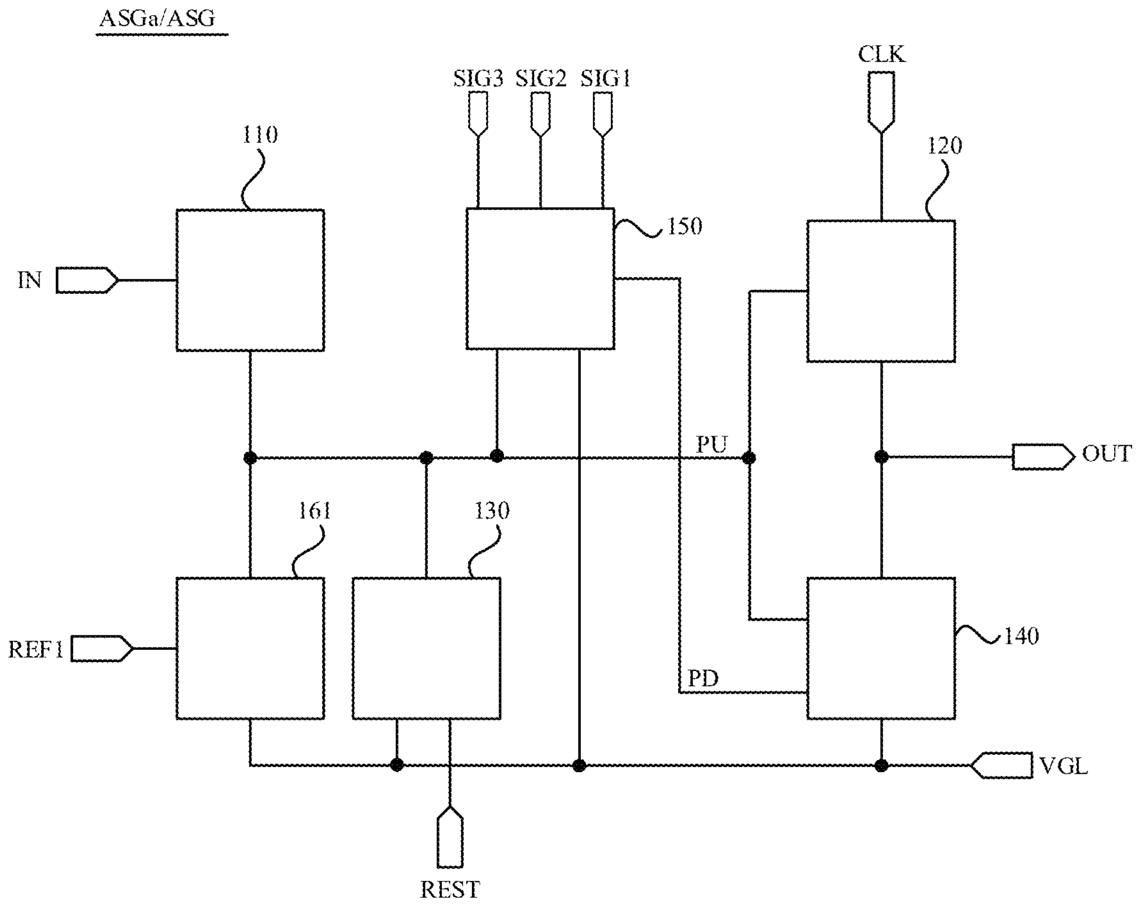
FIG. 28 is a schematic structural view of another shift register unit according to embodiments of the present application.

Based on the above embodiment, optionally, FIG. 28 is a schematic structural view of another shift register unit according to embodiments of the present application; as shown in FIG. 28, the shift register unit ASG may further include the pull-down module 140 and the pull-down control module 150; in the same shift register unit ASG, the pull-down control module 150 is at least electrically connected to the first node PU, the second node PD, and the first level terminal VGL; and the pull-down module 140 is electrically connected to the first level terminal VGL, the second node PD, the first node PU, and the signal output terminal OUT.

The pull-down control module 150 may at least control the signal of the second node PD based on the signal of the first node PU and the first level signal Vgl of the first level terminal VGL; for example, when the signal of the first node PU is at the active level, the pull-down control module 150 may control the signal of the second node PD to be at the inactive level which is consistent with the first level signal Vgl; and when the signal of the first node PU is at the inactive level, the pull-down control module 150 may control the signal of the second node PD to be at the active level.

The pull-down module 140 may at least control the signal of the first node PU and the gate driving signal Gout which is output by the signal output terminal OUT based on the signal of the second node PD and the first level signal Vgl of the first level terminal VGL; for example, when the signal of the second node PD is at the active level, the pull-down module 140 may control the first level signal Vgl of the first level terminal VGL to be transmitted to the first node PU and the signal output terminal OUT to pull down the signal of the first node PU and the gate driving signal Gout which is output by the signal output terminal OUT, so that the signal of the first node PU and the gate driving signal Gout which is output by the signal output terminal OUT are both at the inactive level; when the signal of the second node PD is at the inactive level, the pull-down module 140 no longer pulls down the signal of the first node PU and the gate driving signal Gout of the signal output terminal OUT; and under this condition, the signal of the first node PU may be controlled by the signal which is provided by the input module 110, and the gate driving signal Gout of the signal output terminal OUT is controlled by the signal which is provided by the output module 120.

In this embodiment, by providing the shift register unit ASG with the pull-down control module 150 and the pull-down module 140 and controlling the signal of the second node PD by using the pull-down control module 150, the pull-down module 140 can pull down the signal of the first node PU and the signal of the signal output terminal OUT under the control of the signal of the second node PD, thereby achieving the control over the duration during which the signal of the first node PU is at the inactive level and the duration during which the signal output terminal OUT outputs the inactive level of the gate driving signal Gout to ensure the accuracy of the gate driving signal Gout which is output by the shift register unit ASG.

Optionally, still referring to FIG. 28, the shift register unit may further include the first signal terminal SIG1, the second signal terminal SIG2, and the third signal terminal SIG3, and the pull-down control module 150 is further electrically connected to the first signal terminal SIG1, the second signal terminal SIG2, and the third signal terminal SIG3. Under this condition, the pull-down control module 150 can control the signal of the second node PD based on the signal of the first node PU, the first signal Vsig1 of the first signal terminal SIG1, the second signal Vsig2 of the second signal terminal SIG2, the third signal Vsig3 of the third signal terminal SIG3, and the first level signal Vgl of the first level terminal VGL; for example, when the first signal Vsig1, the second signal Vsig2, and the third signal Vsig3 are at the active level, the pull-down control module 150 may transmit the third signal Vsig3 to the second node PD under the control of the first signal Vsig1 and the second signal Vsig2, so that the signal of the second node PD is at the active level, and under this condition, the signal of the first node PU may be at the inactive level; conversely, when the first node PU is at the active level, the pull-down control module 150 may transmit the first level signal Vgl to the second node PD, so that the signal of the second node PD is at the inactive level; in this way, by providing the shift register unit ASG with the pull-down control module 150, the signal of the first node PU may be phase-inverted with the signal of the second node PD.

Figure 29:
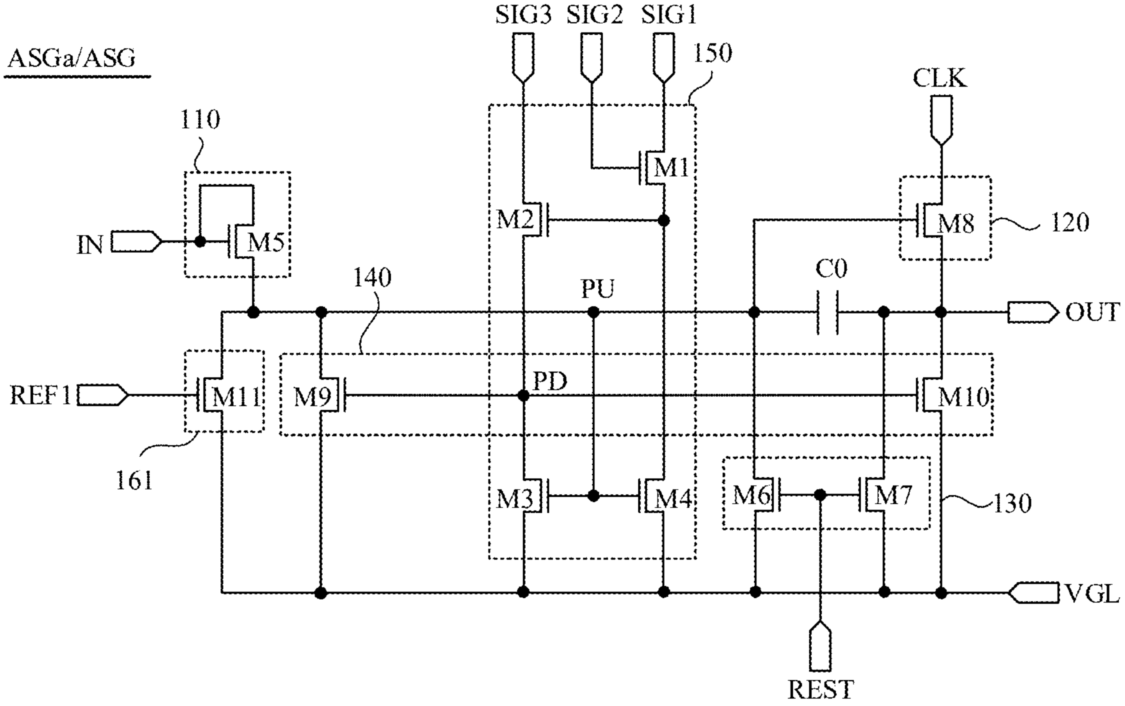
FIG. 29 is a schematic structural view of yet another shift register unit according to embodiments of the present application.

As a feasible embodiment, FIG. 29 is a schematic structural view of yet another shift register unit according to embodiments of the present application; as shown in FIG. 29, the pull-down control module includes the first transistor M1, the second transistor M2, the third transistor M3, and the fourth transistor M4; the first electrode of the first transistor M1 is connected to the first signal terminal SIG1, the second electrode of the first transistor M1 is connected to the gate of the second transistor M2, and the gate of the first transistor M1 is connected to the second signal terminal SIG2; the first electrode of the second transistor M1 is connected to the third signal terminal SIG3, and the second electrode of the second transistor M2 is connected to the second node PD; the gates of the third transistor M3 and the fourth transistor M4 are both electrically connected to the first node PU; the first electrode of the third transistor M3 and the first electrode of the fourth transistor M4 are both electrically connected to the first level terminal VGL; and the second electrode of the third transistor M3 is electrically connected to the second node PD, and the second electrode of the fourth transistor M4 is electrically connected to the gate of the second transistor M2.

The first transistor M1 may be turned on or turned off under the control of the second signal Vsig2 of the second signal terminal SIG2, and when the first transistor M1 is turned on, the first signal Vsig1 of the first signal terminal SIG1 may be transmitted to the gate of the second transistor M2 to control the second transistor M2 to be turned on or turned off; and the third transistor M3 and the fourth transistor M4 may be turned on or turned off under the control of the signal of the first node PU.

In an example, when the signal of the first node PU is at the inactive level, and the first signal Vsig1, the second signal Vsig2, and the third signal Vsig3 are at the active level, the third transistor M3 and the fourth transistor M4 are all in the OFF state, and the first transistor M1 may be turned on under the control of the second signal Vsig2 to provide the first signal Vsig1 to the gate of the second transistor M2, so that the second transistor M2 is turned on and may transmit the third signal Vsig3 of the third signal terminal SIG3 to the second node PD, and the signal of the second node PD may be maintained consistent with the third signal Vsig3, that is, the signal of the second node PD is at the active level; when the signal of the first node PU is at the active level, the signal of the first node PU may control the third transistor M3 and the fourth transistor M4 to be turned on, so that the fourth transistor M4 may transmit the first level signal Vgl of the first level terminal VGL to the gate of the second transistor M2; under this condition, whether the first transistor M1 transmits the first signal Vsig1 to the second transistor M2 or not, the voltage difference between the gate of the second transistor M2 and the first electrode thereof cannot satisfy the ON condition, so that the second transistor M2 is in the OFF state; in addition, the third transistor M3 may transmit the first level signal Vgl of the first level terminal VGL to the second node PD, so that the signal of the second node PD is at the inactive level. In this way, by providing the shift register unit ASG with the pull-down control module 150, the signal of the first node PU may be phase-inverted with the signal of the second node PD.

It may be understood that the first transistor M1, the second transistor M2, the third transistor M3, and the fourth transistor M4 may be the P-type transistors or the N-type transistors, which may be specifically provided based on actual needs. When the transistor is the N-type transistor, the signal which is received by the gate thereof is at the high level, or when the voltage difference between the gate signal thereof and the first electrode signal thereof is greater than or equal to the threshold voltage thereof, the transistor may be in the OFF state, that is, the active level which controls the transistor to be turned on is the high level, and the active level which controls the transistor to be turned off is the low level; when the transistor is the P-type transistor, the signal which is received by the gate thereof is at the low level, or when the voltage difference between the gate signal thereof and the first electrode signal thereof is less than or equal to the threshold voltage thereof, the transistor may be in the ON state, that is, the active level which controls the transistor to be turned on is the low level, and the active level which controls the transistor to be turned off is the high level. Therefore, the shift register units are provided with the corresponding signals based on the type of the transistors, so that the shift register units can achieve corresponding operation processes. For the convenience of description, and without any particular limitation, the example in which the transistors in the shift register units are the N-type transistors is given in the embodiments of the present application to exemplarily illustrate the technical solutions of the embodiments of the present application.

It should be noted that the first signal Vsig1, the second signal Vsig2, and the third signal Vsig3 are illustrated above only as an example, and in the embodiments of the present application, the first signal Vsig1, the second signal Vsig2, and the third signal Vsig3 may be the same or different, which may be provided based on actual needs and is not specifically limited by the embodiments of the present application.

Figure 30:
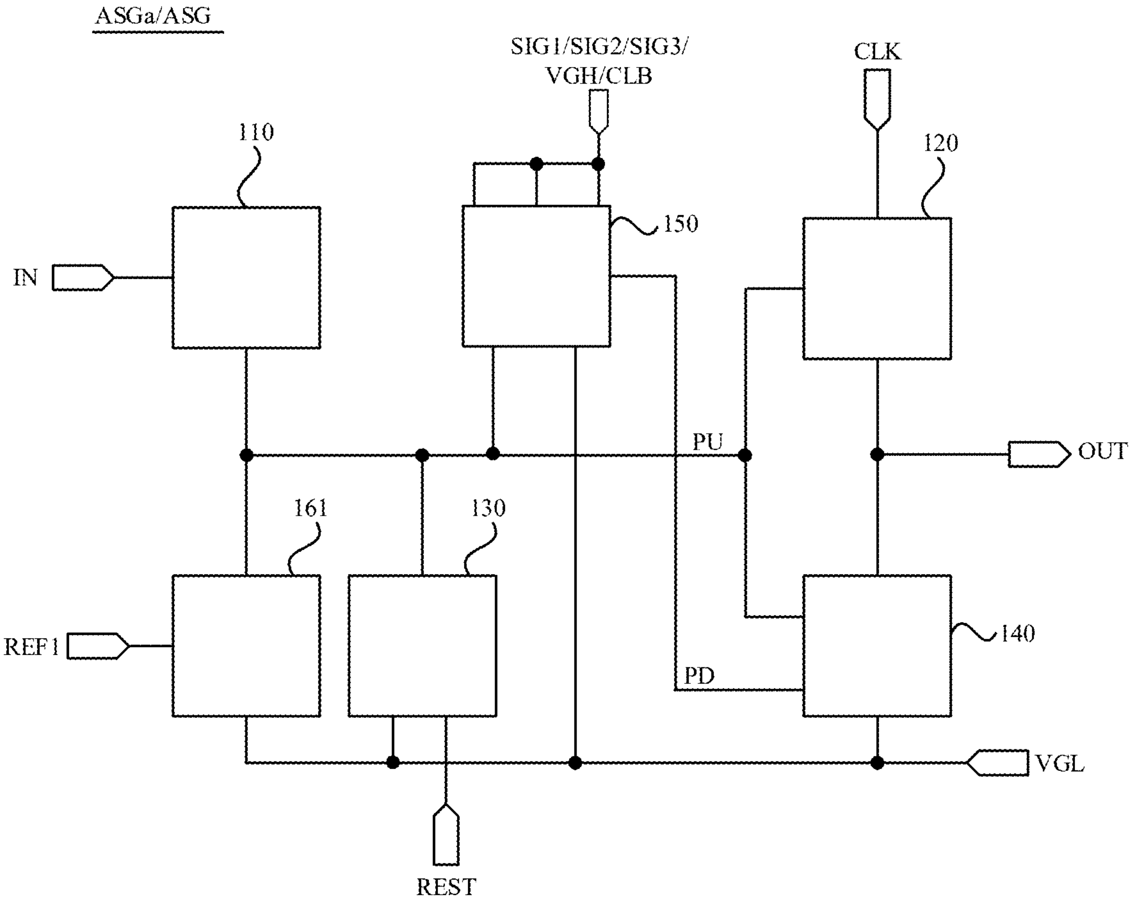
FIG. 30 is a schematic structural view of yet another shift register unit according to embodiments of the present application.

In an optional embodiment, FIG. 30 is a schematic structural view of yet another shift register unit according to embodiments of the present application; as shown in FIG. 30, the shift register unit ASG further includes the second level terminal VGH which is configured to receive the second level signal Vgh; in the same shift register unit ASG, the pull-down control module 150 is further electrically connected to the second level terminal VGH, so that the pull-down control module 150 can control the signal of the second node PD based on the signal of the first node PU, the first level signal Vgl of the first level terminal VGL, and the second level signal Vgh of the second level terminal VGH. For example, when the signal of the first node PU is at the inactive level, the pull-down control module 150 may transmit the second level signal Vgh of the second level terminal VGH to the second node PD, so that the signal of the second node PD is at the active level; and when the signal of the first node PU is at the active level, the pull-down control module 150 may transmit the first level signal Vgl of the first level terminal VGL to the second node PD, so that the signal of the second node PD is at the inactive level. In this way, by providing the shift register unit ASG with the pull-down control module 150, the signal of the first node PU may be phase-inverted with the signal of the second node PD.

The second level signal Vgh of the second level terminal VGH and the first level signal Vgl of the first level terminal VGL may have opposite polarities, that is, when the first level signal Vgl is at the low level, the second level signal Vgh may be at the high level, or when the first level signal Vgl is at the high level, the second level signal Vgh may be at the low level, which may be specifically provided based on actual needs and is not limited by the embodiments of the present application. For the convenience of description, and without any particular limitation, the example in which the first level signal Vgl is at the low level and the second level signal Vgh is at the high level is given in the embodiments of the present application to exemplarily illustrate the embodiments of the present application.

It may be understood that when the shift register unit includes the first signal terminal SIG, the second signal terminal SIG2, and the third signal terminal SIG3, and the first signal Vsig1 of the first signal terminal SIG, the second signal Vsig2 of the second signal terminal SIG2, and the third signal Vsig3 of the third signal terminal SIG3 are the same signal, the first signal terminal SIG, the second signal terminal SIG2, and the third signal terminal SIG3 may be all electrically connected to the second level terminal VGH; and under this condition, the first signal Vsig1, the second signal Vsig2, and the third signal Vsig3 are all the second level signal VGH.

Figure 31:
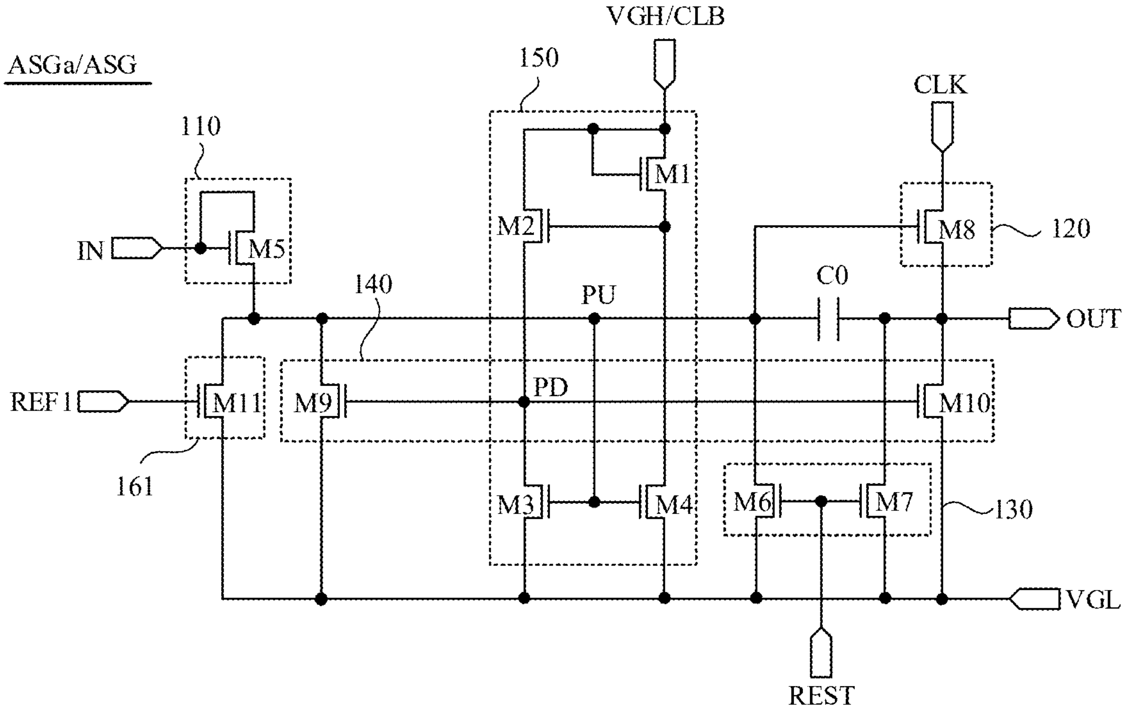
FIG. 31 is a schematic structural view of yet another shift register unit according to embodiments of the present application.

In an exemplary embodiment, as shown in FIG. 31, the shift register unit ASG further includes the second level terminal VGH which is configured to receive the second level signal Vgh, and the first signal terminal SIG1, the second signal terminal SIG2, and the third signal terminal SIG3 may be all electrically connected to the second level terminal VGH, that is, the first electrode of the first transistor M1, the gate of the first transistor M1, and the first electrode of the second transistor M2 are all electrically connected to the second level terminal VGH; under this condition, the first transistor M1 may be continuously in the ON state under the control of the second level signal Vgh, and when the signal of the first node PU is at the inactive level, the second transistor M2 may be in the ON state under the control of the second level signal Vgh which is transmitted by the first transistor M1 to the gate of the second transistor M2, so that the second level signal Vgh may be transmitted to the second node PD, and the signal of the second node PD is at the active level; when the signal of the first node PU is at the active level, the fourth transistor M4 transmits the first level signal Vgl to the gate of the second transistor M2, so that the gate signal of the second transistor M2 is pulled down to be less than the second level signal Vgh, the voltage difference between the gate signal of the second transistor M2 and the first electrode signal thereof is less than the threshold voltage of the second transistor M2, and the second transistor M2 is in the OFF state; and the third transistor M3 may transmit the first level signal Vgl to the second node PD, so that the signal of the second node PD is at the inactive level.

In this embodiment, the first signal terminal SIG, the second signal terminal SIG2, and the third signal terminal SIG3 are electrically connected to the second level terminal VGH, so that the first signal terminal SIG, the second signal terminal SIG2, and the third signal terminal SIG3 receive the same signal, which is beneficial for reducing the number of the signals which are provided to the shift register unit and the number of the signal lines for transmitting the signals, simplifying the structure of the display panel, and beneficial for the narrow bezel of the display panel when the shift register units are provided in the non-display area of the display panel.

Figure 32:
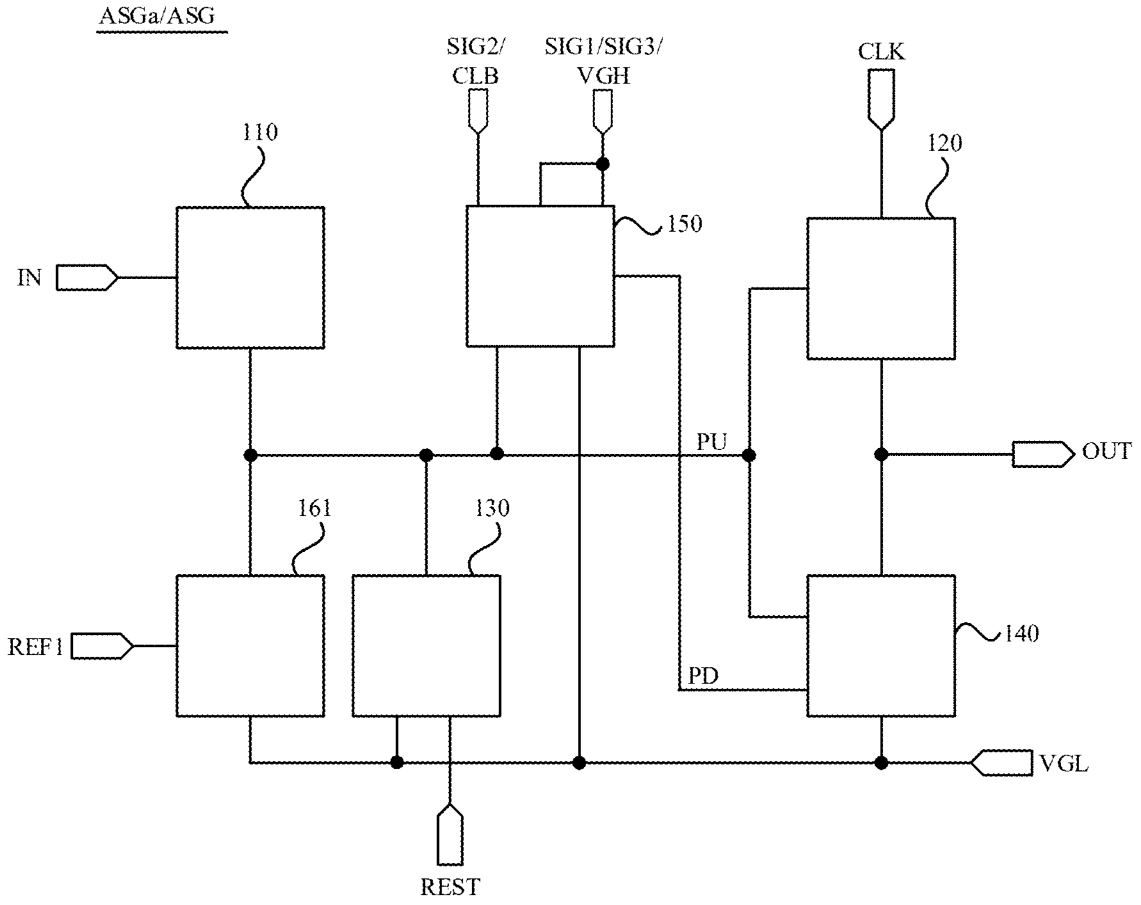
FIG. 32 is a schematic structural view of yet another shift register unit according to embodiments of the present application.

In another optional embodiment, FIG. 32 is a schematic structural view of yet another shift register unit according to embodiments of the present application; as shown in FIG. 32, the shift register unit ASG may further include the second clock terminal CLB which is configured to receive the second clock signal CKB; in the same shift register unit ASG, the pull-down control module 150 is further electrically connected to the second clock terminal CLB, so that the pull-down control module 150 can control the signal of the second node PD based on the signal of the first node PU, the first level signal Vgl of the first level terminal VGL, the second level signal Vgh of the second level terminal VGH, and the second clock signal CKB of the second clock terminal CLB. For example, when the signal of the first node PU is at the inactive level, and the second clock signal CKB is at the active level, the pull-down control module 150 may transmit the second level signal Vgh of the second level terminal VGH to the second node PD, so that the signal of the second node PD is at the active level; and when the signal of the first node PU is at the active level, the pull-down control module 150 may transmit the first level signal Vgl of the first level terminal VGL to the second node PD, so that the signal of the second node PD is at the inactive level. In this way, by providing the shift register unit ASG with the pull-down control module 150, the signal of the first node PU may be phase-inverted with the signal of the second node PD.

The second clock signal CKB of the second clock terminal CLB may be the same as or different from the first clock signal CK of the first clock terminal CLK, which may be specifically provided based on actual needs. In an optional embodiment, the second clock signal CKB of the second clock terminal CLB may be the same as the first clock signal CK of the first clock terminal CLK; and under this condition, the first clock terminal CLK may be electrically connected to the second clock terminal CLB, so that the first clock terminal CLK and the second clock terminal CLB receive the same clock signal, which is beneficial for reducing the number of the signals which are provided to the shift register unit ASG and the number of the clock signal lines for transmitting the clock signals, simplifying the structure of the display panel, and beneficial for the narrow bezel of the display panel. In other optional embodiments, the second clock signal CKB of the second clock terminal CLB may be different from the first clock signal CK of the first clock terminal CLK, that is, the first clock signal CK of the first clock terminal CLK is phase-inverted with the second clock signal CKB of the second clock terminal CLB, that is, the second clock signal CK is at the inactive level when the first clock signal CK is at the active level, and the second clock signal CK is at the active level when the first clock signal CK is at the inactive level. The first clock signal CK and the second clock signal CKB are not specifically limited by the embodiments of the present application under a condition that the pull-down control module 150 can control the signals of the first node PU and the second node PD to be phase-inverted.

Figure 33:
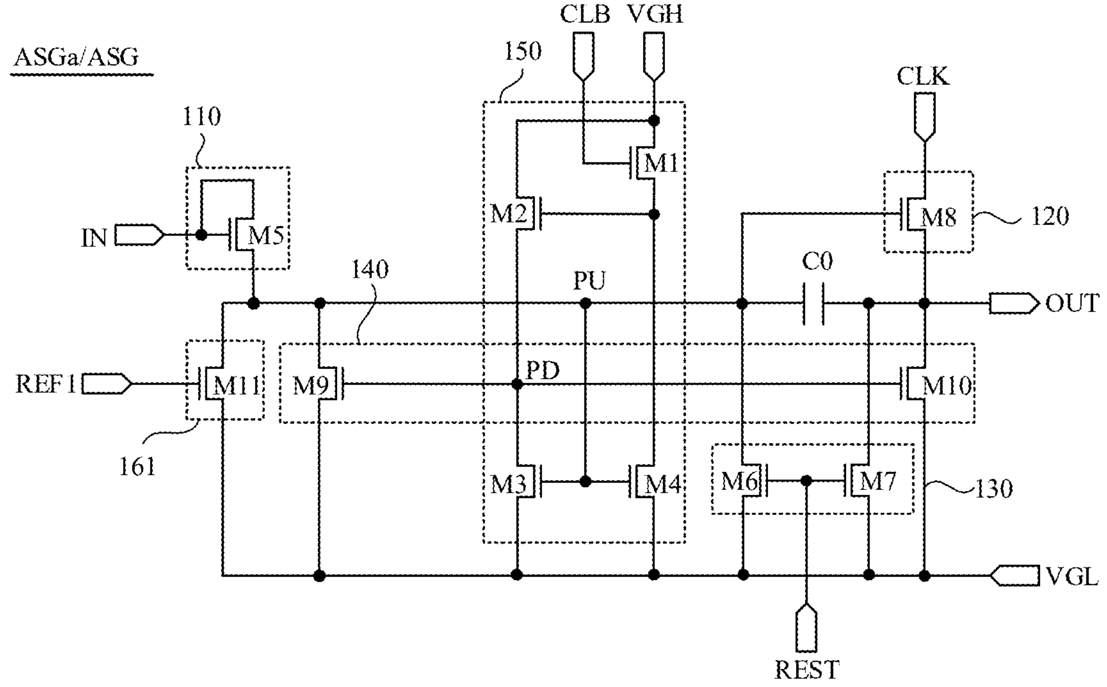
FIG. 33 is a schematic structural view of yet another shift register unit according to embodiments of the present application.

In an exemplary embodiment, as shown in FIG. 33, when the shift register unit ASG includes both the second level terminal VGH and the second clock terminal CLB, the second level terminal VGH is configured to receive the second level signal, and the second clock terminal CLB is configured to receive the second clock signal CKB, the second signal terminal SIG2 may be electrically connected to the second clock terminal CLB, and the first signal terminal SIG1 and the third signal terminal SIG3 may be both electrically connected to the second level terminal VGH, that is, the gate of the first transistor M1 may be electrically connected to the second clock terminal CLB, and the first electrode of the first transistor M1 and the first electrode of the second transistor M2 may be both electrically connected to the second level terminal VGH; under this condition, the first transistor M1 may be turned on or turned off under the control of the second clock signal CKB, and when the second clock signal CKB is at the active level and the signal of the first node PU is at the inactive level, the first transistor M1 may transmit the second level signal Vgh to the gate of the second transistor M2 to control the second transistor M2 to be turned on, so that the second level signal Vgh may be transmitted to the second node PD, and the signal of the second node PD is at the active level; when the signal of the first node PU is at the active level, the fourth transistor M4 transmits the first level signal Vgl to the gate of the second transistor M2, so that the gate signal of the second transistor M2 is pulled down to be less than the second level signal Vgh, the voltage difference between the gate signal of the second transistor M2 and the first electrode signal thereof is less than the threshold voltage of the second transistor M2, and the second transistor M2 is in the OFF state; and at the same time, the third transistor M3 may transmit the first level signal Vgl to the second node PD, so that the signal of the second node PD is at the inactive level.

It may be understood that, since the second clock signal CLB changes alternately between the active level and the inactive level by a certain period, that is, the signal which is received by the gate of the first transistor M1 is not a constant signal, and when the second clock signal CLB is at the active level, the first transistor M1 is in the ON state, and when the second clock signal CLB is at the inactive level, the first transistor M1 is in the OFF state; in this way, the case in which the characteristic curve of the first transistor M1 is affected by the hysteresis phenomenon of the first transistor M1 due to the first transistor M1 being turned on for a long duration may be prevented. When the characteristic curve of the first transistor M1 changes, the threshold drift of the first transistor M1 occurs, so that the first transistor M1 cannot accurately transmit the first signal Vsig1 of the first signal terminal SIG1 to the gate of the second transistor M2, and thus cannot accurately control the second transistor M2 be to be turned on or turned off, thereby affecting the accuracy of the signal of the second node PD. In this embodiment, the gate of the first transistor M1 is electrically connected to the second clock terminal CLB, and the hysteresis phenomenon of the first transistor M1 is reduced, so that it is ensured that the second transistor M2 can be accurately turned on or turned off to ensure that the second transistor M2 can accurately provide the third signal Vsig3 of the third signal terminal SIG3 to the second node PD, and thus the signal of the second node PD can accurately control the pull-down module 140 to be turned on or turned off to accurately control the signal of the first node PU and the gate driving signal Gout which is output by the signal output terminal OUT, which is beneficial for increasing the accuracy of the signals which are output by the shift register unit ASG.

It should be noted that the connection of the first transistor M1 and the second transistor M2 of the shift register unit ASG to the second clock terminal CLB and the second level terminal VGH is illustrated above only as an example, and the connection of the first transistor M1 and the second transistor M2 is not limited by the embodiments of the present application; under a condition that the shift register unit ASG includes the second clock terminal CLB, and the second signal terminal SIG2 is electrically connected to the second clock terminal CLB to reduce the threshold shift of the first transistor M1, the connection relationship of the first signal terminal SIG1 and the third signal terminal SIG3 may be provided based on actual needs, which is not specifically limited by the embodiments of the present application.

In an optional embodiment, still referring to FIG. 30, when the shift register unit ASG includes the second clock terminal CLB, and the second clock terminal CLB is configured to receive the second clock signal CKB, the pull-down control module 150 is further electrically connected to the second clock terminal CKB in the same shift register unit ASG. Under this condition, the pull-down control module 150 may control the signal of the second node PD based on the second clock signal CKB of the second clock terminal CLB, the signal of the first node PU, and the first level signal Vgl of the first level terminal VGL; for example, when the second clock signal CKB of the second clock terminal CLB is at the active level, and the signal of the first node PU is at the inactive level, the pull-down control module 150 may control the signal of the second node PD to be at the same active level as that of the second clock terminal CKB; conversely, when the signal of the first node PU is at the active level, the pull-down control module 150 may control the signal of the second node PD to be consistent with the first level signal Vgl, that is, the signal of the second node PD is at the inactive level.

When the pull-down control module 150 is electrically connected to the second clock terminal CLB, the first level terminal VGL, the first node PU, and the second node PD, the pull-down control module 150 does not need to be electrically connected to the second level terminal VGH, and can also achieve the control over the signal of the second node PD; under this condition, the shift register unit ASG may not be provided with the second level terminal VGH, which is beneficial for simplifying the structure of the shift register unit ASG and reducing the number of the signals which are provided to the shift register unit ASG, and reducing the driving cost of the driver circuit.

In an exemplary embodiment, referring to FIG. 30 and FIG. 31, the first signal terminal SIG1, the second signal terminal SIG2, and the third signal terminal SIG3 are all electrically connected to the second clock terminal CLB.

Since the signal of the second clock terminal CLB changes alternately between the active level and the inactive level, the first transistor M1 can be controlled to be changed alternately between the ON state and the OFF state, so that the hysteresis phenomenon caused by the first transistor M1 being turned on for a long duration can be prevented; in addition, when the first signal terminal SIG1, the second signal terminal SIG2, and the third signal terminal SIG3 are all electrically connected to the second clock terminal CLB, the first transistor M1 can be turned on only when the second clock signal CKB is at the active level, the signal which is transmitted to the gate of the second transistor M2 is also at the active level of the second clock signal CKB, and the active level of the second clock signal CKB can control the second transistor M2 to be turned on, so that the second transistor M2 can transmit the active level of the second clock signal CKB to the second node PD, and the signal of the second node PD is at the active level; and when the second clock signal CKB of the second clock terminal CLB is at the inactive level, neither the first transistor M1 nor the second transistor M2 cannot be turned on, so that the second node PD can maintain the signal which is written in the previous phase to ensure the accuracy of the signal of the second node PD. In this way, the first signal terminal SIG1, the second signal terminal SIG2, and the third signal terminal SIG3 are electrically connected to the second clock terminal CLB, so that the accuracy of the signal of the second node PD can be ensured under a condition that the structure of the shift register unit ASG can be simplified and the hysteresis phenomenon of the first transistor M1 can be reduced, which is beneficial for increasing the accuracy of the gate driving signal Gout which is output by the shift register unit ASG.

Based on the above embodiment, optionally, referring to any one of FIG. 14, FIG. 16, and FIG. 18, the pull-down module 140 may include the ninth transistor M9 and the tenth transistor M10, the gate of the ninth transistor M9 and the gate of the tenth transistor M10 are both electrically connected to the second node PD, the first electrode of the ninth transistor M9 and the first electrode of the tenth transistor M10 are both electrically connected to the first level terminal VGL, the second electrode of the ninth transistor M9 is electrically connected to the first node PU, and the second electrode of the tenth transistor M10 is electrically connected to the signal output terminal OUT. In this way, the signal of the second node PD may control the ninth transistor M9 and the tenth transistor M10 to be turned on or turned off; when the signal of the second node PD controls the ninth transistor M9 and the tenth transistor M10 to be turned on, the ninth transistor M9 can transmit the first level signal Vgl of the first level terminal VGL to the first node PU, so that the signal of the first node PU is consistent with the first level signal Vgl, that is, the signal of the first node PU is at the inactive level; at the same time, the tenth transistor M10 can transmit the first level signal Vgl of the first level terminal VGL to the signal output terminal OUT, so that the gate driving signal Gout which is output by the signal output terminal OUT can be consistent with the first level signal Vgl, that is, the signal output terminal OUT outputs the inactive level of the gate driving signal Gout.

Based on the above embodiment, optionally, referring to any one of FIG. 14, FIG. 16, and FIG. 18, the input module 110 includes the fifth transistor M5, the first electrode and the gate of the fifth transistor M5 are electrically connected to the signal input terminal IN and the second level terminal VGH, respectively, and the second electrode of the fifth transistor M5 is electrically connected to the first node PU, so that the fifth transistor M5 may be turned on or turned off under the control of the input signal Vin which is received by the signal input terminal IN; and when the input signal Vin of the signal input terminal IN is at the active level, the fifth transistor M5 can transmit the active level of the input signal Vin to the first node PU to control the signal of the first node PU to be at the active level.

Figure 34:
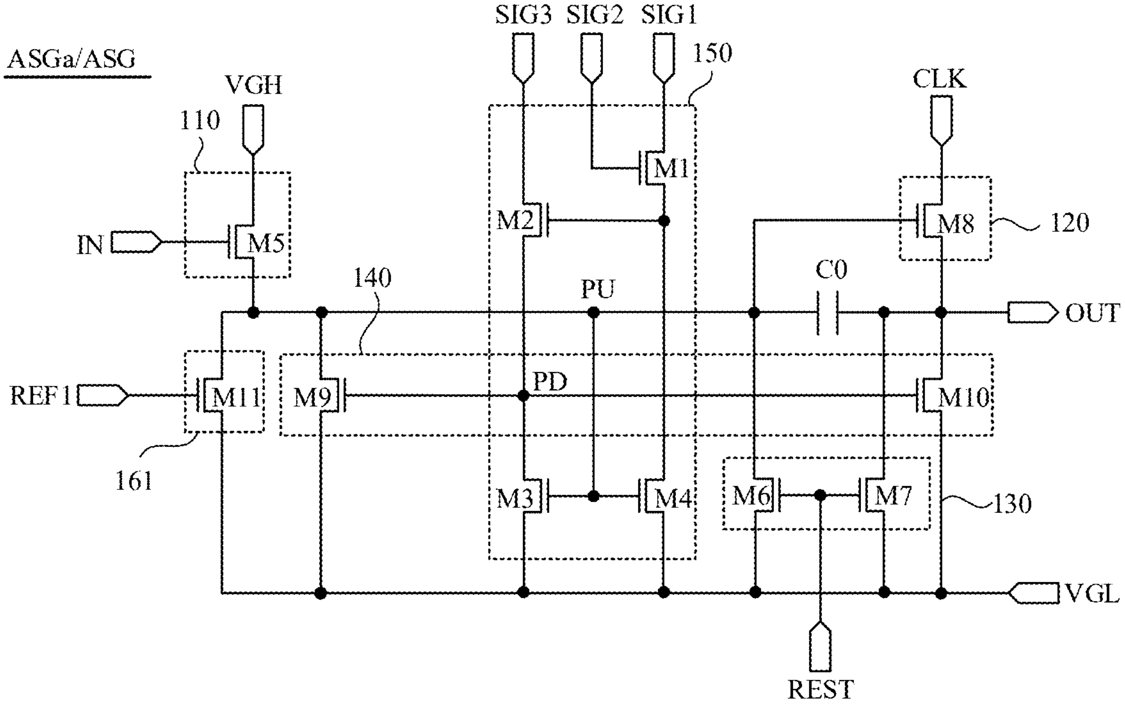
FIG. 34 is a schematic structural view of yet another shift register unit according to embodiments of the present application.

In other optional embodiments, FIG. 34 is a schematic structural view of yet another shift register unit according to embodiments of the present application; as shown in FIG. 34, when the shift register unit ASG further includes the second level terminal VGH, and the second level terminal VGH is configured to provide the second level signal Vgh, the input module 110 includes the fifth transistor M5; under this condition, the first electrode of the fifth transistor M5 is electrically connected to the second level terminal VGH, the second electrode of the fifth transistor M5 is electrically connected to the first node PU, and the gate of the fifth transistor M5 is electrically connected to the signal input terminal IN. Under this condition, when the input signal Vin of the signal input terminal IN controls the fifth transistor M5 to be turned on, the fifth transistor M5 may transmit the second level signal Vgh to the first node PU, so that the signal of the first node PU can be maintained consistent with the second level signal Vgh, that is, the signal of the first node PU may be at the active level.

It should be noted that the case in which the first electrode of the fifth transistor M5 is electrically connected to the signal input terminal IN and the second level terminal VGH is illustrated above only as an example, and the specific connection of the fifth transistor M5 may be provided based on actual needs, which is not specifically limited by the embodiments of the present application. For the convenience of description, and without any particular limitation, the example in which the gate and the first electrode of the fifth transistor M5 are electrically connected to the signal input terminal IN, and the gate of the first transistor M1, the first electrode of the first transistor M1 and the first electrode of the second transistor M2 are electrically connected to the second clock terminal CLB is given in the embodiments of the present application to exemplarily illustrate the technical solutions of the embodiments of the present application.

Figure 35:
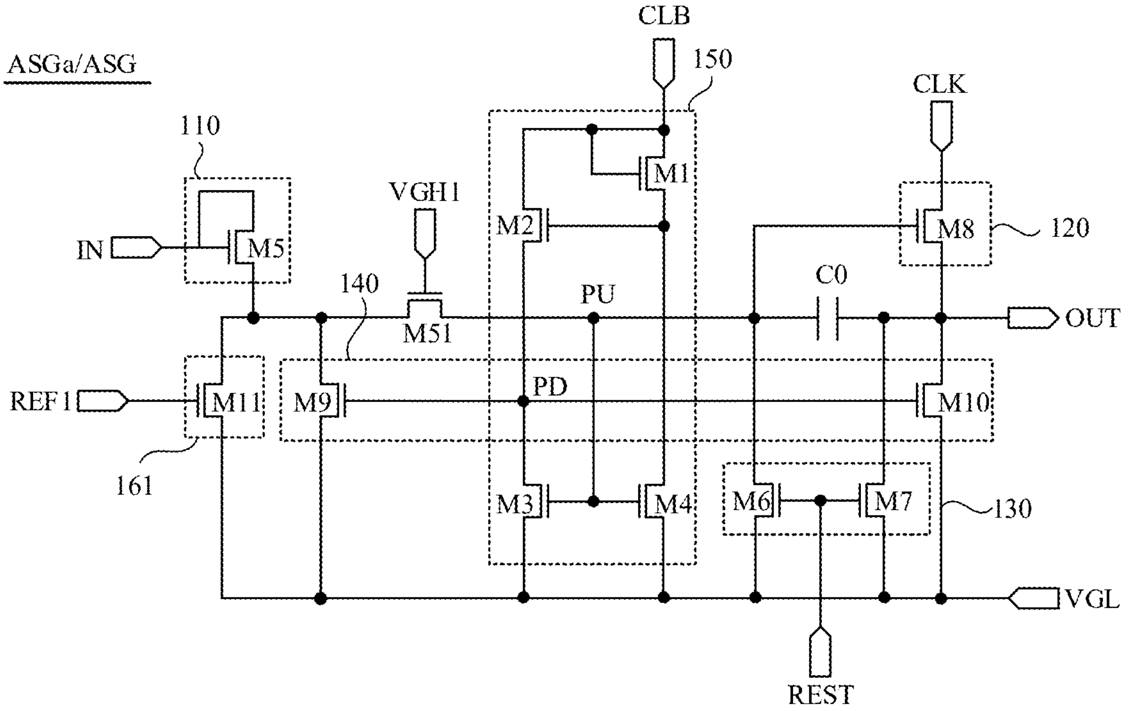
FIG. 35 is a schematic structural view of yet another shift register unit according to embodiments of the present application.

Optionally, based on the above embodiment, FIG. 35 is a schematic structural view of yet another shift register unit according to embodiments of the present application; as shown in FIG. 35, the shift register unit ASG may further include the voltage stabilizing transistor M51 and the voltage stabilizing control terminal VGH1, and the voltage stabilizing transistor M51 may be electrically connected between the input module 110 and the first node PU, that is, when the input module 110 includes the fifth transistor M5, the first electrode of the voltage stabilizing transistor M51 may be electrically connected to the second electrode of the fifth transistor M5, the second electrode of the voltage stabilizing transistor M51 may be electrically connected to the first node PU, and the gate of the voltage stabilizing transistor M51 may be electrically connected to the voltage stabilizing control terminal VGH1.

The voltage stabilizing transistor M51 can stabilize the signals of the second electrode of the fifth transistor M5 and the first node PU. When the signals of the second electrode of the fifth transistor M5 and the first node PU are both within a predetermined range, the voltage stabilizing transistor M51 may be in the ON state, and the signal of the second electrode of the fifth transistor M5 can be transmitted to the first node PU by the voltage stabilizing transistor M51. Under this condition, the output module 120 may be electrically connected to the second electrode of the fifth transistor M5 by the voltage stabilizing transistor M51, so that the output module 120 may receive the signal of the first node PU which is the same as the signal of the second electrode of the fifth transistor M5; when the voltage of the signal of the second electrode of the fifth transistor M5 and/or the voltage of the signal of the first node PU is too high or too low, the voltage stabilizing transistor M51 may be in the OFF state to prevent the signal of the first node PU from affecting the signal of the second electrode of the fifth transistor M5 or the signal of the second electrode of the fifth transistor M5 from affecting the signal of the first node PU. In this way, by providing the shift register unit ASG with the voltage stabilizing transistor M51, the second electrode of the fifth transistor M5 can be isolated from the first node PU, the signals of the second electrode of the fifth transistor M5 and the first node PU can be ensured to be relatively stable, and the accuracy of the gate driving signal Gout which is output by the shift register unit ASG can be prevented from being affected by the fluctuation of the signal of the second electrode of the fifth transistor M5 and/or the fluctuation of the signal of the first node PU, which is beneficial for increasing the operation stability of the shift register unit ASG and further improving the display effect of the display panel.

In an optional embodiment, when the shift register unit ASG includes the second level terminal VGH, the voltage stabilizing control terminal VGH1 may reuse the second level terminal VGH to reduce the number of signal terminals in the shift register unit ASG, simplify the structure of the shift register unit ASG, reduce the number of the signals which are provided to the shift register unit ASG, and reduce the control cost of the shift register unit ASG.

Based on the above embodiment, optionally, still referring to FIG. 35, the restoration module 130 includes the sixth transistor M6 and/or the seventh transistor M7, the first electrode of the sixth transistor M6 is electrically connected to the first level terminal VGL, the second electrode of the sixth transistor M6 is electrically connected to the first node PU, and the gate of the sixth transistor M6 is electrically connected to the restoration signal terminal REST; the first electrode of the seventh transistor M7 is electrically connected to the first level terminal VGL, the second electrode of the seventh transistor M7 is electrically connected to the signal output terminal OUT, and the gate of the seventh transistor M7 is electrically connected to the restoration signal terminal REST. In this way, the restoration signal Vrest of the restoration signal terminal REST may control the sixth transistor M6 and the seventh transistor M7 to be turned on or turned off; when the restoration signal Vrest controls the sixth transistor M6 and the seventh transistor M7 to be turned on, the sixth transistor M6 may transmit the first level signal Vgl to the first node PU, and the seventh transistor M7 may transmit the first level signal Vgl to the signal output terminal OUT, so that the first node PU is at the inactive level, and the signal output terminal OUT continuously outputs the inactive level of the gate driving signal Gout; when the restoration signal Vrest controls the sixth transistor M6 and the seventh transistor M7 to be turned off, the sixth transistor M6 cannot transmit the first level signal Vgl to the first node PU, and the seventh transistor M7 cannot transmit the first level signal Vgl to the signal output terminal OUT, so that the signal of the first node PU may be controlled by the signal which is provided by the input module 110, and the gate driving signal Gout which is output by the signal output terminal OUT may be controlled by the signal which is provided by the output module 120.

It may be understood that, in the embodiments of the present application, the restoration module 130 of the shift register unit ASG may include only the sixth transistor M6, or the restoration module 130 may include only the seventh transistor M7, or the restoration module 130 may include both the sixth transistor M6 and the seventh transistor M7, which may be specifically provided based on actual needs and is not specifically limited by the embodiments of the present application.

Optionally, the output module 120 may include the eighth transistor M8, the gate of the eighth transistor M8 may be electrically connected to the first node PU, the first electrode of the eighth transistor M8 may be electrically connected to the first clock terminal CLK, and the second electrode of the eighth transistor M8 may be electrically connected to the signal output terminal OUT, so that the eighth transistor M8 may be turned on or turned off under the control of the signal of the first node PU; when the eighth transistor M8 is turned on, the eighth transistor M8 may transmit the first clock signal CK of the first clock terminal CLK to the signal output terminal OUT, so that the gate driving signal Gout which is output by the signal output terminal OUT can be maintained consistent with the first clock signal CK.

Based on the above embodiment, optionally, the shift register unit ASG may further include the bootstrap capacitor C0, and when the signal of the gate driving signal Gout changes, the bootstrap capacitor C0 is configured to drive the signal of the first node PU to change.

In an example, the bootstrap capacitor C0 is electrically connected between the first node PU and the signal output terminal OUT; when the first node PU is at the active level, the output module 120 is turned on, and the first clock signal CK may be transmitted to the signal output terminal OUT; when the first clock signal CK changes from the inactive level to the active level, the gate driving signal Gout which is output by the signal output terminal OUT changes from the inactive level to the active level, so that the signal at one end of the bootstrap capacitor C0 is elevated, and the signal at the other end of the bootstrap capacitor C0 is elevated accordingly due to the coupling effect of the bootstrap capacitor C0, that is, the signal of the first node PU is elevated, and the voltage of the first node PU is higher than the voltages of the first clock terminal CLK and the signal output terminal OUT, which is beneficial for the complete turning-on of the output module 120; in this way, the turning-on degree of the output module 120 may be increased, improving the output capacity of the output module 120.

Based on the above embodiment, optionally, still referring to FIG. 35, the shift register unit ASG further includes the first reset module 161 and the first reset signal terminal REF1; in the same shift register unit ASG, the first reset module 161 is electrically connected to the first reset signal terminal REF1, the first level terminal VGL and the first node PU; the first reset signal terminal REF1 is configured to receive the first reset signal Vref1; at least part of the duration of the active pulse of the gate driving signal Gout which is output by the signal output terminal OUT does not overlap the duration of the active pulse of the first reset signal Vref1.

Specifically, the first reset module 161 may control the signal of the first node PU based on the first reset signal Vref1 of the first reset signal terminal REF1 and the first level signal Vgl of the first level terminal VGL; for example, when the first reset signal Vref1 is at the active level, the first reset module 161 may transmit the first level signal Vgl to the first node PU, so that the signal of the first node PU is consistent with the first level signal Vgl, and when the first reset signal Vref1 is at the inactive level, the first reset module 161 cannot transmit the first level signal Vgl to the first node PU, so that the signal of the first node PU may be controlled by the signal which is provided by the input module 110 or the restoration module 130. In addition, since the output module 120 may be controlled to provide the first clock signal CK to the signal output terminal OUT when the signal of the first node PU is at the active level, the signal output terminal OUT may output the active pulse of the gate driving signal Gout; therefore, by providing that the at least part of the duration of the active pulse of the gate driving signal Gout which is output by the signal output terminal OUT does not overlap the duration of the active pulse of the first reset signal Vref1, within the at least part of the duration of the active pulse of the gate driving signal Gout which is output by the signal output terminal OUT, it may be ensured that the first reset module 161 does not transmit the first level signal Vgl to the first node PU, avoiding the case in which the output module 120 cannot accurately transmit the first clock signal CK to the signal output terminal OUT due to the effect of the signal change of the first node PU on the ON state of the output module 120, which can ensure the accuracy of the gate driving signal Gout which is output by the signal output terminal OUT.

In an optional embodiment, the first reset module 161 may include the eleventh transistor M11, the gate of the eleventh transistor M11 is electrically connected to the first reset signal terminal REF1, the first electrode of the eleventh transistor M11 is electrically connected to the first level terminal VGL, and the second electrode of the eleventh transistor M11 is electrically connected to the first node PU, so that the first reset signal Vref1 of the first reset signal terminal REF1 can control the eleventh transistor M11 to be turned on or turned off; when the first reset signal Vref1 controls the eleventh transistor M11 to be turned on or turned off, the eleventh transistor M11 may transmit the first level signal Vgl to the first node PU to reset the first node PU.

It may be understood that the at least part of the duration of the active pulse of the gate driving signal Gout which is output by the signal output terminal OUT does not overlap the duration of the active pulse of the first reset signal Vref1, that is, the active pulse of the gate driving signal Gout which is output by the signal output terminal OUT does not overlap the duration of the active pulse of the first reset signal Vref1, or part of the duration of the active pulse of the gate driving signal Gout which is output by the signal output terminal OUT does not overlap the duration of the active pulse of the first reset signal Vref1, which may be specifically provided based on actual needs and is not specifically limited by the embodiments of the present application; for the convenience of description, and without any particular limitation, the example in which the duration of the active pulse of the gate driving signal Gout of the shift register unit ASG does not overlap the duration of the active pulse of the first reset signal Vref1 of the shift register unit ASG is given in the embodiments of the present application to exemplarily illustrate the operation processes of the shift register units of the embodiments of the present application.

Figure 36:
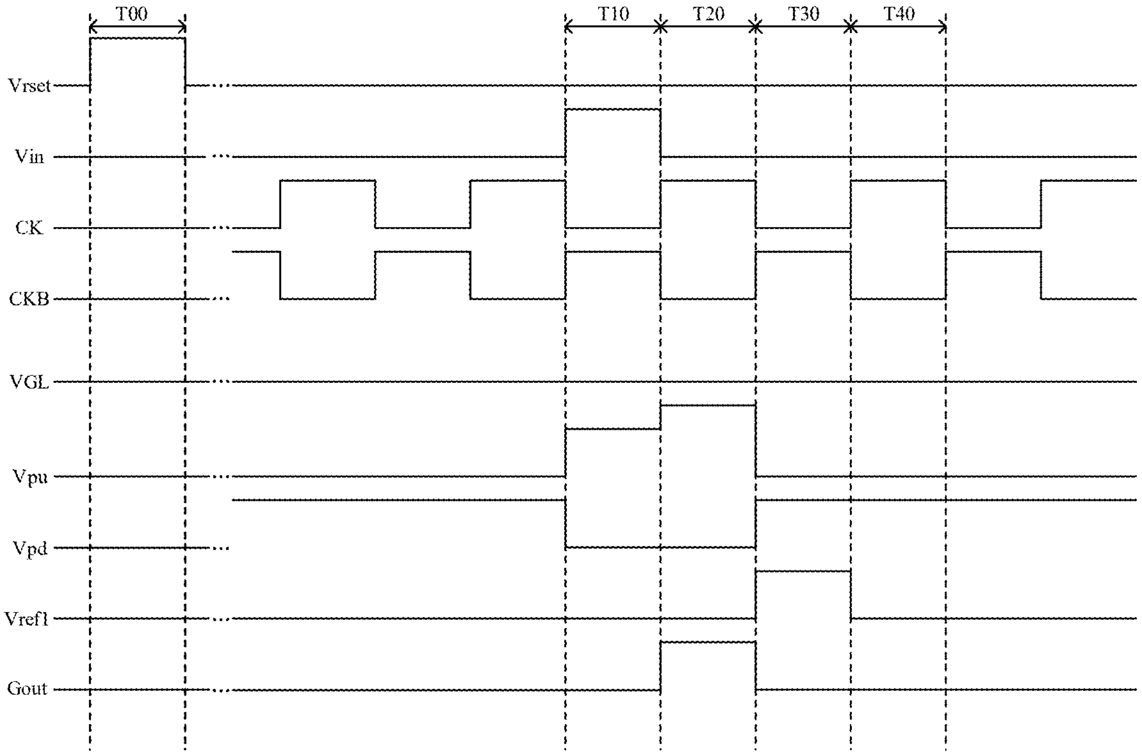
FIG. 36 is a driving time sequence chart of a shift register unit according to embodiments of the present application.

In an exemplary embodiment, taking the operation processes of the second shift register units in the first-type shift register units as an example, referring to FIG. 35 and FIG. 36, in the phase T00, the first active pulse of the restoration signal Vrest of the restoration signal terminal REST may control the sixth transistor M6 and the seventh transistor M7 to be in the ON state, so that the first level signal Vgl of the first level terminal VGL may be transmitted to the first node PU and the signal output terminal OUT, and the signal of the first node PU and the gate driving signal Gout which is output by the signal output terminal OUT are maintained at the inactive level, preventing the signal of the first node PU of the shift register unit ASG and the gate driving signal Gout which is output by the signal output terminal OUT from being affected by the jumping of the starting active pulse of the first clock signal which is received by the first shift register unit. Under this condition, since the first node PU is at the inactive level, the eighth transistor M8 is in the OFF state, and the first clock signal CK cannot be transmitted to the signal output terminal OUT, so that the signal output terminal OUT outputs the inactive level of the gate driving signal Gout.

After the phase T00 and before the phase T10, when the second clock signal CKB changes to the active level, the first transistor M1 and the second transistor M2 may be controlled to be in the ON state, so that the active level of the second clock signal CKB may be transmitted to the second node PD, and the signal of the second node PD changes to the active level; the active level of the second node PD controls the ninth transistor M9 and the tenth transistor M10 to be in the ON state, so that the first level signal Vgl is transmitted to the first node PU and the signal output terminal OUT by the ninth transistor M9 and the tenth transistor M10 to control that the first node PU is maintained at the inactive level and the signal output terminal OUT outputs the inactive level of the gate driving signal Gout.

In the phase T10, the first clock signal CK is at the inactive level, the second clock signal CKB is at the active level, the input signal Vin is at the active level, the fifth transistor M5 is in the ON state, the input signal Vin is transmitted to the first node PU, and the first node PU changes to the active level, under this condition, the third transistor M3, the fourth transistor M4, and the eighth transistor M8 are all in the ON state, and the fourth transistor M4 transmits the first level signal Vgl to the gate of the second transistor M2, so that the difference between the voltage of the gate of the second transistor M2 and the active level of the first clock signal CKB of the first stage thereof can not satisfy the ON condition of the second transistor M2, the second transistor M2 is in the OFF state, and the second transistor M2 no longer provides the active level of the second clock signal CKB to the second node PD; the third transistor M3 transmits the first level signal Vgl to the second node PD, so that the signal of the second node PD changes to the inactive level; under the control of the inactive level of the second node PD, the ninth transistor M9 and the tenth transistor M10 are in the OFF state, and the first level signal Vgl cannot be transmitted to the first node PU and the signal output terminal OUT; the eighth transistor M8 may transmit the first clock signal CK to the signal output terminal OUT, so that the gate driving signal Gout which is output by the signal output terminal OUT is consistent with the first clock signal CK, and since the first clock signal CK is at the inactive level in this phase, the gate driving signal Gout which is output by the signal output terminal OUT continues to be maintained at the inactive level.

In the phase T20, the input signal changes to the inactive level, and the input transistor M5 is in the OFF state; the first clock signal CK is at the active level, and the second clock signal CKB is at the ineffective level; under a condition that no new signal is written to the gates of the transistors in the shift register unit ASG, the signal of the second node PD may be maintained at the ineffective level, and the signal of the first node PU may also be maintained at the active level; the eighth transistor M8 continues to be maintained at the ON state, and the eighth transistor M8 transmits the active level of the first clock signal CK to the signal output terminal OUT, so that the signal output terminal OUT outputs the active level of the gate driving signal Gout; an addition, when the gate driving signal Gout which is output by the signal output terminal OUT jumps from the inactive level to the active level, the signal of the first node PU changes accordingly due to the coupling effect of the bootstrap capacitor C0, so that the first node PU has a higher level, and the signal of the first node PU may enable the eighth transistor M8 to have a higher ON degree, thus the eighth transistor M8 can accurately transmit the first clock signal CK to the signal output terminal OUT.

In the phase T30, the input signal Vin continues to be maintained at the inactive level, and the fifth transistor M05 continues to be maintained in the OFF state; the second clock signal CKB and the first reset signal Vref1 both change to the active level; the eleventh transistor M11 is turned on under the control of the first reset signal Vref1, and the first transistor M1 is turned on under the control of the second clock signal CKB, so that the eleventh transistor M11 can reset the signal of the first node PU to the inactive level, the third transistor M3, the fourth transistor M4, and the eighth transistor M8 are all in the OFF state, the gate signal of the second transistor M2 is controlled by the second clock signal CKB which is transmitted by the first transistor M1, and the second transistor M2 is in the ON state; under this condition, the second clock signal CKB may be transmitted to the second node PD by the second transistor M2, so that the signal of the second node PD changes to the active level, and the ninth transistor M9 and the tenth transistor M10 are turned on under the control of the active level of the second node PD, so that the signal of the first node PU and the gate driving signal Gout both change to the inactive level.

In the phase T40, the input signal Vin continues to be maintained at the inactive level, the second clock signal CKB changes to the inactive level, and the first clock signal CK is at the active level; under a condition that no new signal is written in, the signal of the second node PD may be maintained at the active level, the signal of the first node PU is maintained at the inactive level, the eighth transistor M8 is turned off, the ninth transistor M9 and the tenth transistor M10 are continuously in the OFF state, and the gate driving signal Gout is maintained at the inactive level.

After the phase T40, since the signal of the first node PU is continuously maintained at the inactive level, the eighth transistor M8 is in the OFF state, the signal output terminal OUT continuously outputs the inactive level of the gate driving signal Gout until the next frame period.

Figure 37:
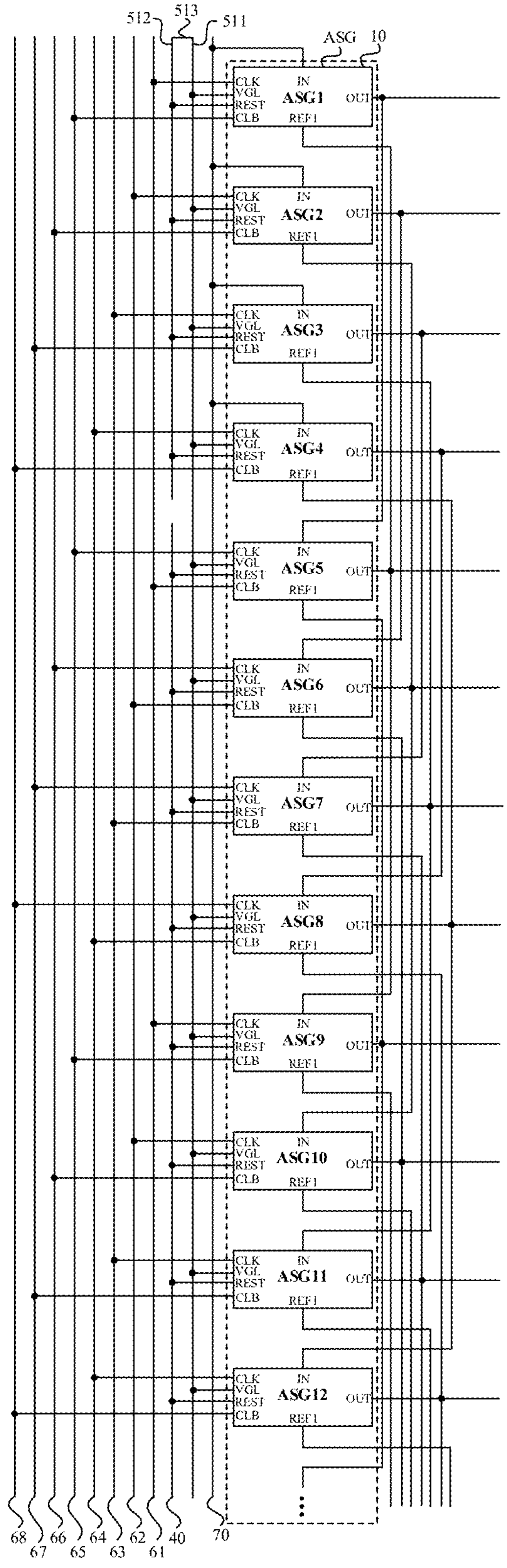
FIG. 37 is a partial schematic structural view of yet another display panel according to embodiments of the present application.

In an optional embodiment, FIG. 37 is a partial schematic structural view of yet another display panel according to embodiments of the present application; as shown in FIG. 37, when the first clock signal CK and the second clock signal CKB which are received by the same shift register unit ASG are phase-inverted, the second clock terminal CLB of the i-th stage of shift register unit ASGi and the first clock terminal CLK of the (i+N)-th stage of shift register unit ASGi+N may be electrically connected to the same clock signal line; for example, when N is equal to 4, the second clock terminal CLB of the fifth stage of shift register unit ASG5 and the first clock terminal CLK of the eighth stage of shift register unit ASG8 may be both electrically connected to the fifth clock signal line 65, in this way, there is no need to separately provide a clock signal line for transmitting the second clock signal CKB, which is beneficial for reducing the number of the signal lines which are provided in the display panel, simplifying the structure of the display panel, and beneficial for the narrow bezel of the display panel.

It may be understood that in the same shift register unit ASG, the first reset signal Vref1 of the first reset signal terminal REF1 may control the first reset module 161 to reset the first node PU, and after the first node PU is reset, the output module 120 cannot output the first clock signal CK to the signal output terminal OUT; therefore, in order to ensure that the active pulse of the first clock signal CK is completely transmitted to the signal output terminal OUT and the duration during which the shift register unit ASG outputs the active level of the gate driving signal Gout is long enough, the active pulse of the first reset signal Vref1 may be provided after the active level of the gate driving signal Gout.

In an optional embodiment, referring to FIG. 35 and FIG. 37, the first reset signal terminal REF1 of the i-th stage of shift register unit ASGi is electrically connected to the signal output terminal OUT of the j-th stage of shift register unit ASGj; J>i, and i and j are both positive integers; and j=i+N.

It may be understood that when the gate driving signals Gout which are output by the stages of shift register units ASG in the driver circuit 10 are sequentially shifted, and the gate driving signal Gout which is output by the i-th stage of shift register unit ASGi is used as the input signal *Vini*+N of the (i+N)-th stage of shift register unit ASGi+N, the duration of the active level of the gate driving signal Gouti+N which is output by the signal output terminal OUT of the (i+N)-th stage of shift register unit ASGi+N is after the input signal Vin which is received thereby, that is, the duration of the active level of the gate driving signal Gouti+N which is output by the signal output terminal OUT of the (i+N)-th stage of shift register unit ASGi+N is after the duration of the active level of the gate driving signal Gout which is output by the i-th stage of shift register unit ASGi. In this way, j=i+N, and the gate driving signal Gouti+N which is output by the signal output terminal OUT of the (i+N)-th stage of shift register unit ASGi+N may be used as the first reset signal Vref1*i* of the first reset signal terminal REF1 of the i-th stage of shift register unit ASGi, so that after the i-th stage of shift register unit ASGi outputs the active level of the gate driving signal Gout, the active level of the gate driving signal Gouti+N which is output by the (i+N)-th stage of shift register unit ASGi+N is used for controlling the first reset module 161 in the i-th stage of shift register unit ASGi to reset the first node PU thereof, and the first node PU thereof changes to the inactive level to control the output module 120 thereof to stop transmitting the first clock signal CK to the signal output terminal OUT thereof, and thus the signal output terminal OUT of the i-th stage of shift register unit ASGi can continuously output the inactive level of the gate driving signal Gout. In this way, under a condition that the accuracy of the gate driving signals which are output by the shift register units ASG can be ensured, there is no need to provide additional first reset signals Vref1 to the stages of shift register units in order to reset the first nodes PU in the stages of shift register units ASG, which is beneficial for reducing the number of the signals which are provided to the driver circuit 10 and reducing the control cost of the driver circuit 10.

Figure 38:
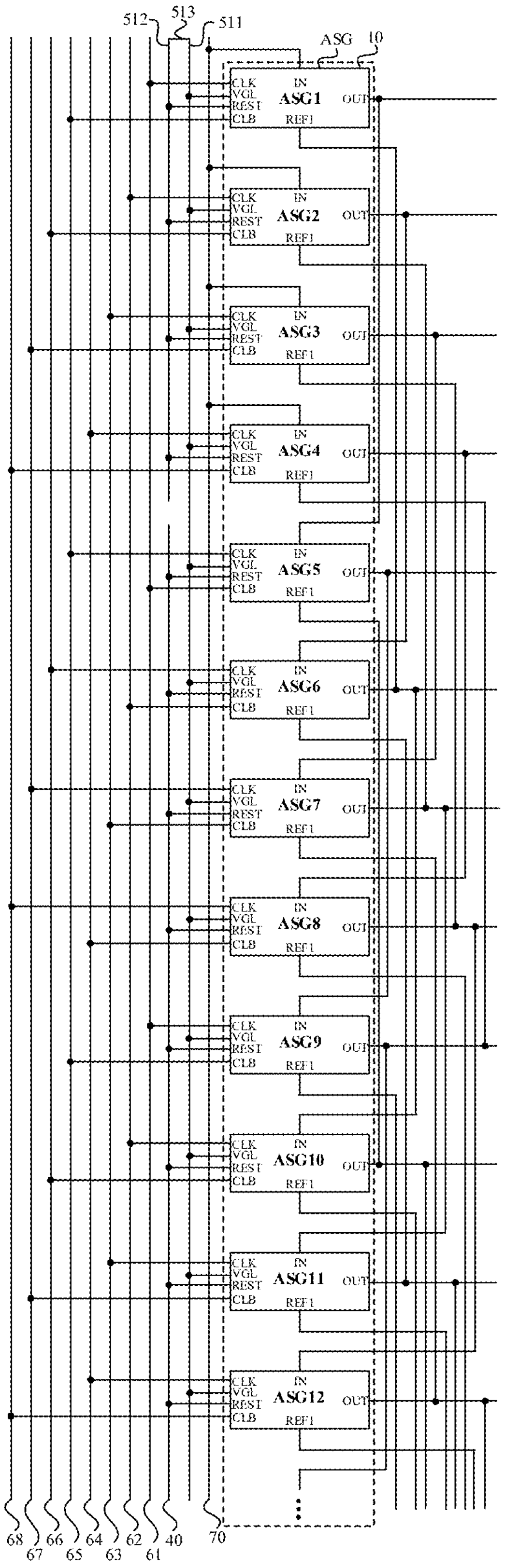
FIG. 38 is a partial schematic structural view of yet another display panel according to embodiments of the present application.

In other optional embodiments, FIG. 38 is a partial schematic structural view of yet another display panel according to embodiments of the present application; referring to FIG. 35 and FIG. 38, when the first reset signal terminal REF1 of the i-th stage of shift register unit ASGi is electrically connected to the signal output terminal OUT of the j-th stage of shift register unit ASGj, the value of j may further be i+N+1, that is, the gate driving signal Gouti+N+1 which is output by the signal output terminal of the (i+N+1)-th stage of shift register unit ASGi+N+1 can control the first reset module 161 in the i-th stage of shift register unit ASGi to reset the first node PU of the i-th stage of shift register unit ASGi; compared to using the (i+N)-th stage of shift register unit ASGi+N to provide the signal to the first reset signal terminal REF1 of the i-th stage of shift register unit ASGi, using the (i+N+1)-th stage of shift register unit ASGi+N+1 to provide the signal to the first reset signal terminal REF1 of the i-th stage of shift register unit ASGi can increase the duty ratio and is friendly to charge the first node PU of the i-th stage of shift register unit ASGi.

It should be noted that the example in which j=i+N or j=i+N+1 is given above only as an example to illustrate the technical solutions of the embodiments of the present application, which is in the same shift register unit not specifically limited by the embodiments of the present application under a condition that the active level of the first reset signal Vref1 which is received by the first reset signal terminal REF1 is after the active level of the gate driving signal Gout which is output by the signal output terminal OUT thereof.

Figure 39:
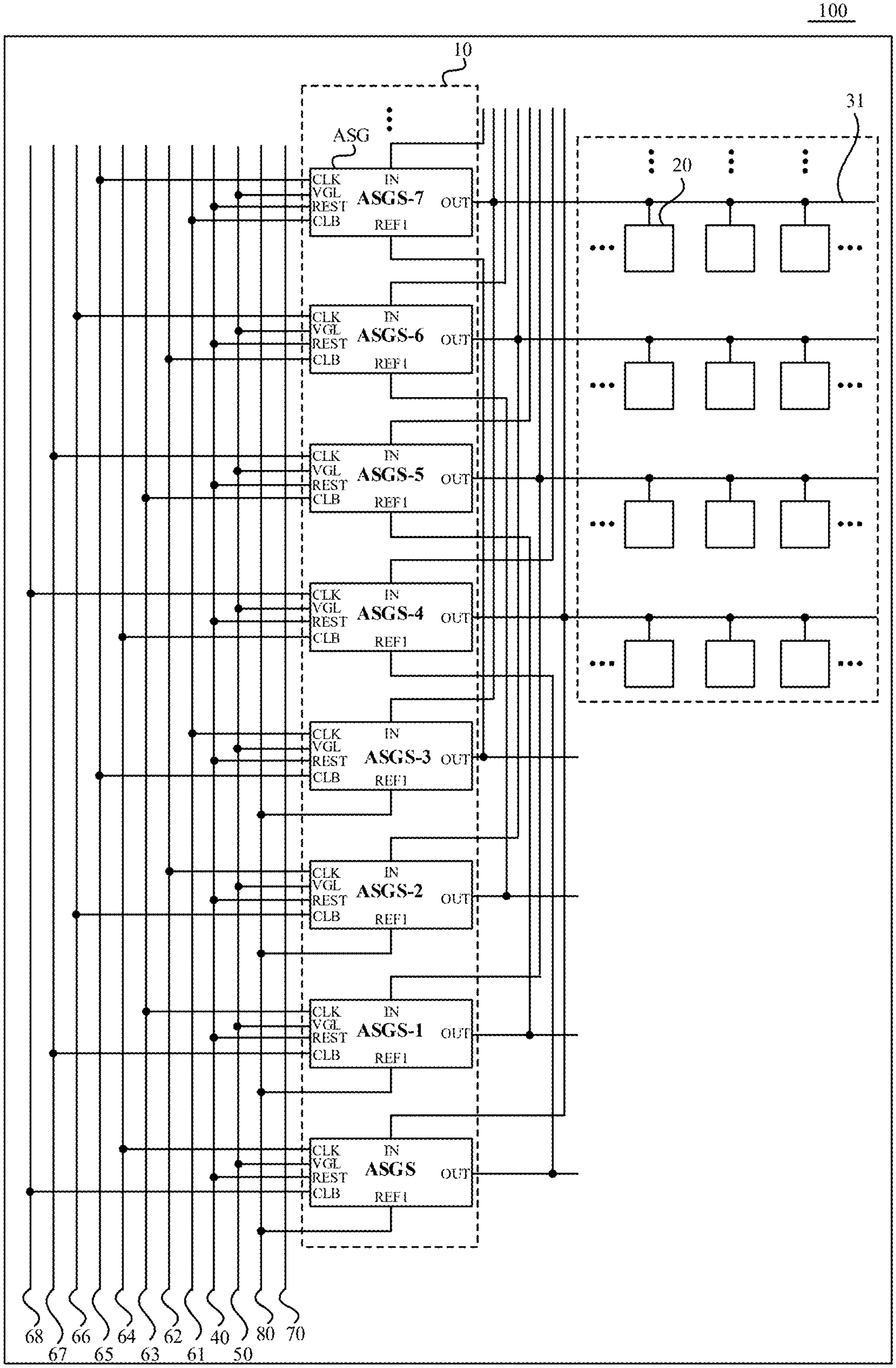
FIG. 39 is a partial schematic structural view of yet another display panel according to embodiments of the present application.

Based on the above embodiment, optionally, FIG. 39 is a partial schematic structural view of yet another display panel according to embodiments of the present application; referring to FIG. 35 and FIG. 39, when the display panel 100 further includes the plurality of gate signal lines 31, the plurality of pixels 20, and the first reset signal line 80, and the gate signal lines 31 are electrically connected to the pixels 20, the second shift register units include the driving shift register units and the dummy shift register units, the driving shift register units provide the gate driving signals Gout to the gate signal lines 31, and the dummy shift register units do not provide the gate driving signals Gout to the gate signal lines 31; under a condition that the driving shift register units and the dummy shift register units further include the first reset modules 161 and the first reset signal terminals REF1, and in the same shift register unit the first reset module 161 is electrically connected to the first reset signal terminal REF1, the first level terminal VGL, and the first node PU, when the i-th stage of shift register unit is the driving shift register unit, and the p-th stage of shift register unit is the dummy shift register unit, the first reset signal terminal REF1 of the i-th stage of shift register unit ASGi may be electrically connected to the signal output terminal OUT of the j-th stage of shift register unit ASGj, and the first reset signal terminal REF1 of the p-th stage of shift register unit ASGp is electrically connected to the first reset signal line 80; i, j and p are all positive integers, i+N≤j<i+2N; and the first reset signal line 80 provides the reset active pulse which is the same as the first active pulse.

Figure 40:
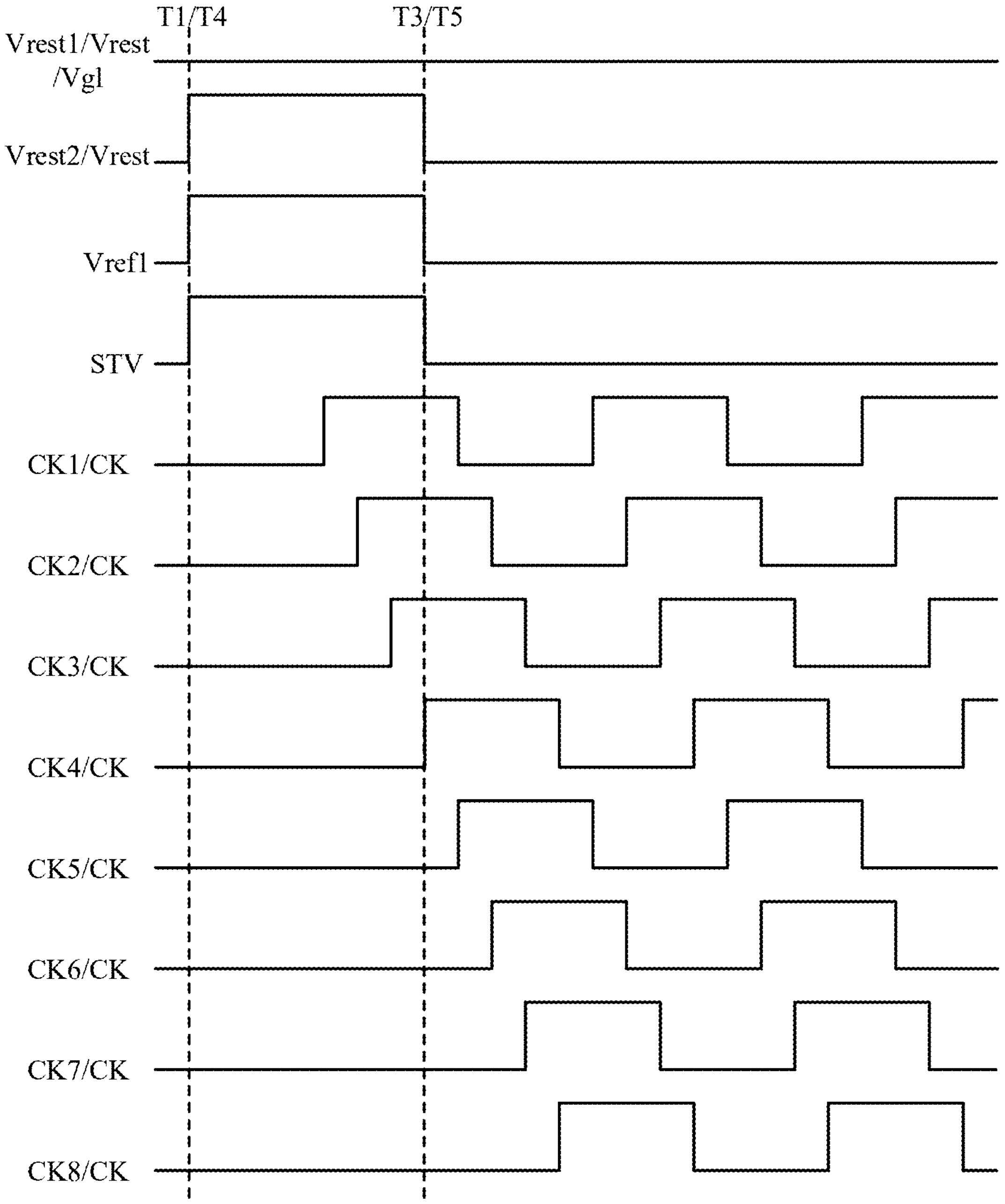
FIG. 40 is a driving time sequence chart of yet another display panel according to embodiments of the present application.

In an example, FIG. 40 is a driving time sequence chart of yet another display panel according to embodiments of the present application; referring to FIG. 35, FIG. 39, and FIG. 40, taking for the example that j=i+N and the driver circuit circuit 10 includes S stages of shift register units, the (S−7)-th stage of shift register unit ASGS−7 to the (S−4)-th stage of shift register unit ASGS−4 are all the driving shift register units in the second shift register units, and the (S−3)-th stage of shift register unit ASGS−3 to the S-th stage of shift register unit ASGS are all the dummy shift register units in the second shift register units; under this condition, the signal output terminals OUT of the shift register units ASG in the (S−7)-th stage of shift register unit ASGS−7 to the (S−4)-th stage of shift register unit ASGS−4 may be connected to the gate signal lines 31, respectively, to provide the gate driving signals Gout to the gate signal lines 31; and the signal output terminals OUT of the stages of shift register units ASG in the (S−3)-th stage of shift register unit ASGS−3 to the S-th stage of shift register unit ASGS are not electrically connected to the gate signal lines 31, so that the stages of shift register units ASG in the (S−3)-th stage of shift register unit ASGS−3 to the S-th stage of shift register unit ASGS do not need to provide the gate driving signals Gout to the gate signal lines 31.

In addition, since the first reset signal terminal REF1 of the i-th stage of shift register unit ASGi may be electrically connected to the signal output terminal OUT of the j-th stage of shift register unit ASGj, that is, the signal output terminal OUT of the (S−3)-th stage of shift register unit ASGS−3 is electrically connected to the first reset signal terminal REF1 of the (S−7)-th stage of shift register unit ASGS−7, the gate driving signal GoutS−3 which is output by the (S−3)-th stage of shift register unit ASGS−3 can be used as the first reset signal Vref1 of the (S−7)-th stage of shift register unit ASGS−7 to control the first reset module 161 of the (S−7)-th stage of shift register unit ASGS−7 to reset the first node PU thereof, and the other shift register units in the (S−7)-th stage of shift register unit ASGS−7 to the S-th stage of shift register unit ASGS all have the similar connection relationship. In this way, using the gate driving signals which are output by the dummy shift register units to control the first reset modules in the driving shift register units to reset the first nodes thereof can ensure that the last N stages of the driving shift register units are accurately reset and accurately output the gate driving signals, thereby increasing the accuracy of the gate driving signals which are output by the stages of shift register units.

Further, the first reset signal terminals REF1 of the (S−3)-th stage of shift register unit ASGS−3 to the S-th stage of shift register unit ASGS are electrically connected to the first reset signal line 80, so that the stages of shift register units in the (S−3)-th stage of shift register unit ASGS−3 to the S-th stage of shift register unit ASGS can reset the first nodes PU thereof under the control of the reset pulse signal which is transmitted by the first reset signal line 80; in addition, since the reset pulse signal which is transmitted by the first reset signal line 80 is the same as the first active pulse, that is, the starting moment of the active level of the reset pulse signal is the same moment as the starting moment T1 of the first active pulse, and the terminating moment of the active pulse of the reset pulse signal is the same moment as the terminating moment T3 of the first active pulse, the restoration modules 130 can restore the signals of the first nodes PU and the signals of the signal output terminals OUT while the first reset modules 161 reset the first nodes PU, so that the signals of the first nodes PU and the gate driving signals Gout which are output by the signal output terminals OUT are all maintained at the inactive level, ensuring that the stages of shift register units can accurately output the gate driving signals.

Figure 41:
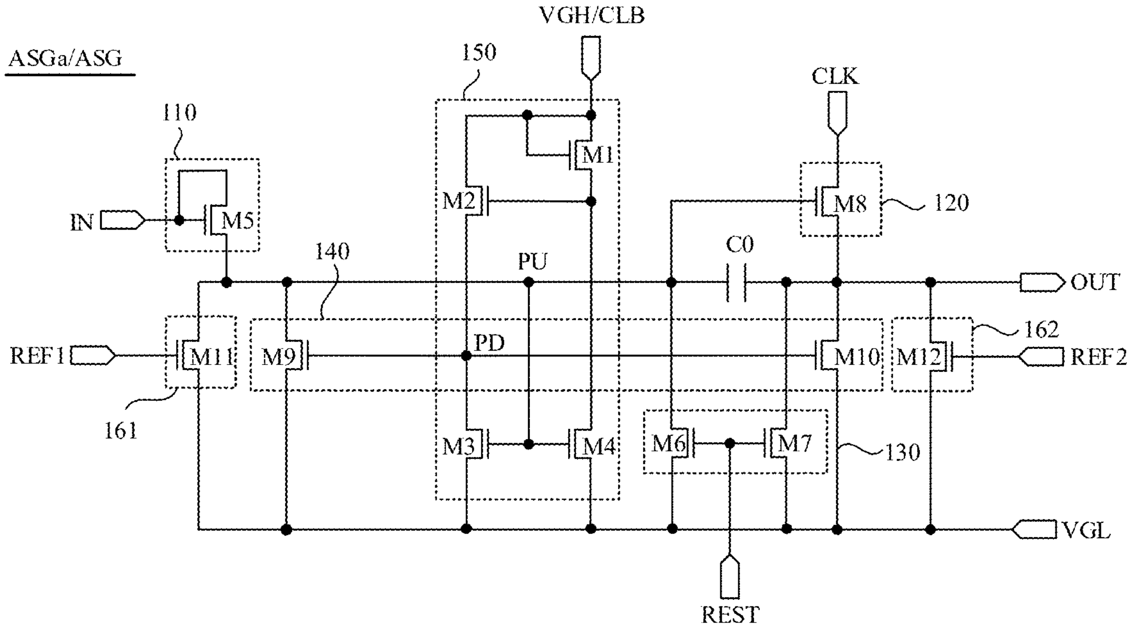
FIG. 41 is a schematic structural view of yet another shift register unit according to embodiments of the present application.

Optionally, based on the above embodiment, FIG. 41 is a schematic structural view of yet another shift register unit according to embodiments of the present application; as shown in FIG. 41, the shift register unit ASG further includes the second reset module 162 and the second reset signal terminal REF2; in the same shift register unit ASG, the second reset module 162 is electrically connected to the second reset signal terminal REF2, the first level terminal VGL, and the signal output terminal OUT; the second reset signal terminal REF2 is configured to receive the second reset signal Vref2; at least part of the duration of the active pulse of the gate driving signal which is output by the signal output terminal OUT does not overlap the duration of the active pulse of the second reset signal REF2.

Specifically, the second reset module 162 may control the gate driving signal Gout which is output by the signal output terminal OUT based on the second reset signal Vref2 of the second reset signal terminal REF2 and the first level signal Vgl of the first level terminal VGL; for example, when the second reset signal Vref2 is at the active level, the second reset module 162 may transmit the first level signal Vgl to the signal output terminal OUT, so that the gate driving signal Gout which is output by the signal output terminal OUT is consistent with the first level signal Vgl, and when the second reset signal Vref2 is at the inactive level, the second reset module 162 cannot transmit the first level signal Vgl to the signal output terminal OUT, so that the signal of the signal output terminal OUT may be controlled by the signal which is provided by the output module 120 or the restoration module 130.

In addition, since the gate driving signal Gout is at the inactive level when the gate driving signal Gout is consistent with the first level signal Vgl, in order to prevent the accuracy of the gate driving signal Gout which is output by the signal output terminal OUT from being affected due to the transmission of the first level signal Vgl to the signal output terminal OUT by the second reset module 162 within the duration of the active level of the gate driving signal Gout which is output by the signal output terminal OUT, it may be provided that the at least part of the duration of the active pulse of the gate driving signal Gout which is output by the signal output terminal OUT does not overlap the duration of the active pulse of the second reset signal Vref2, so that the accuracy of the gate driving signal Gout which is output by the signal output terminal OUT can be ensured.

In an optional embodiment, still referring to FIG. 41, the second reset module 162 may include the twelfth transistor M12, the gate of the twelfth transistor M12 is electrically connected to the second reset signal terminal REF2, the first electrode of the twelfth transistor M12 is electrically connected to the first level terminal VGL, and the second electrode of the twelfth transistor M12 is electrically connected to the signal output terminal OUT, so that the second reset signal Vref2 of the second reset signal terminal REF2 can control the twelfth transistor M12 to be turned on or turned off; when the second reset signal Vref2 controls the twelfth transistor M12 to be turned on, the eleventh transistor M11 may transmit the first level signal Vgl to the signal output terminal OUT to reset the signal output terminal OUT.

It may be understood that the at least part of the duration of the active pulse of the gate driving signal Gout which is output by the signal output terminal OUT does not overlap the duration of the active pulse of the second reset signal Vref2, that is, the active pulse of the gate driving signal Gout which is output by the signal output terminal OUT does not overlap the duration of the active pulse of the second reset signal Vref2, or part of the duration of the active pulse of the gate driving signal Gout which is output by the signal output terminal OUT does not overlap the duration of the active pulse of the second reset signal Vref2, which may be specifically provided based on actual needs and is not specifically limited by the embodiments of the present application.

In an optional embodiment, still referring to FIG. 41, the first reset signal terminal REF1 is reused as the second reset signal terminal REF2, and the first reset signal terminal REF1 and the second reset signal terminal REF2 may be electrically connected to the same reset signal line; under this condition, the first reset module 161 and the second reset module 162 receive the same reset signal Vref, so that the second reset module 162 resets the signal output terminal OUT while the first reset module 161 resets the first node PU. In this way, there is no need to provide additional second reset signal terminals REF2 and additional second reset signals Vref2, which is beneficial for simplifying the structure of the shift register unit ASG, reducing the number of the signals which are provided to the shift register unit ASG, and reducing the control cost of the shift register unit ASG.

Figure 42:
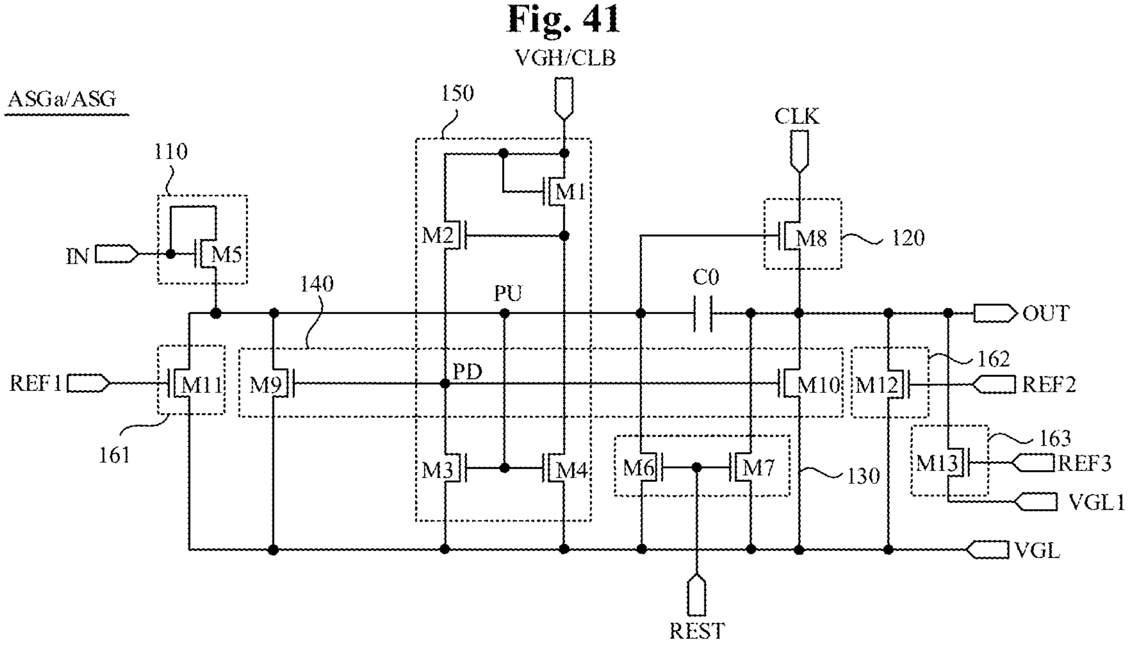
FIG. 42 is a schematic structural view of yet another shift register unit according to embodiments of the present application.
Figure 43:
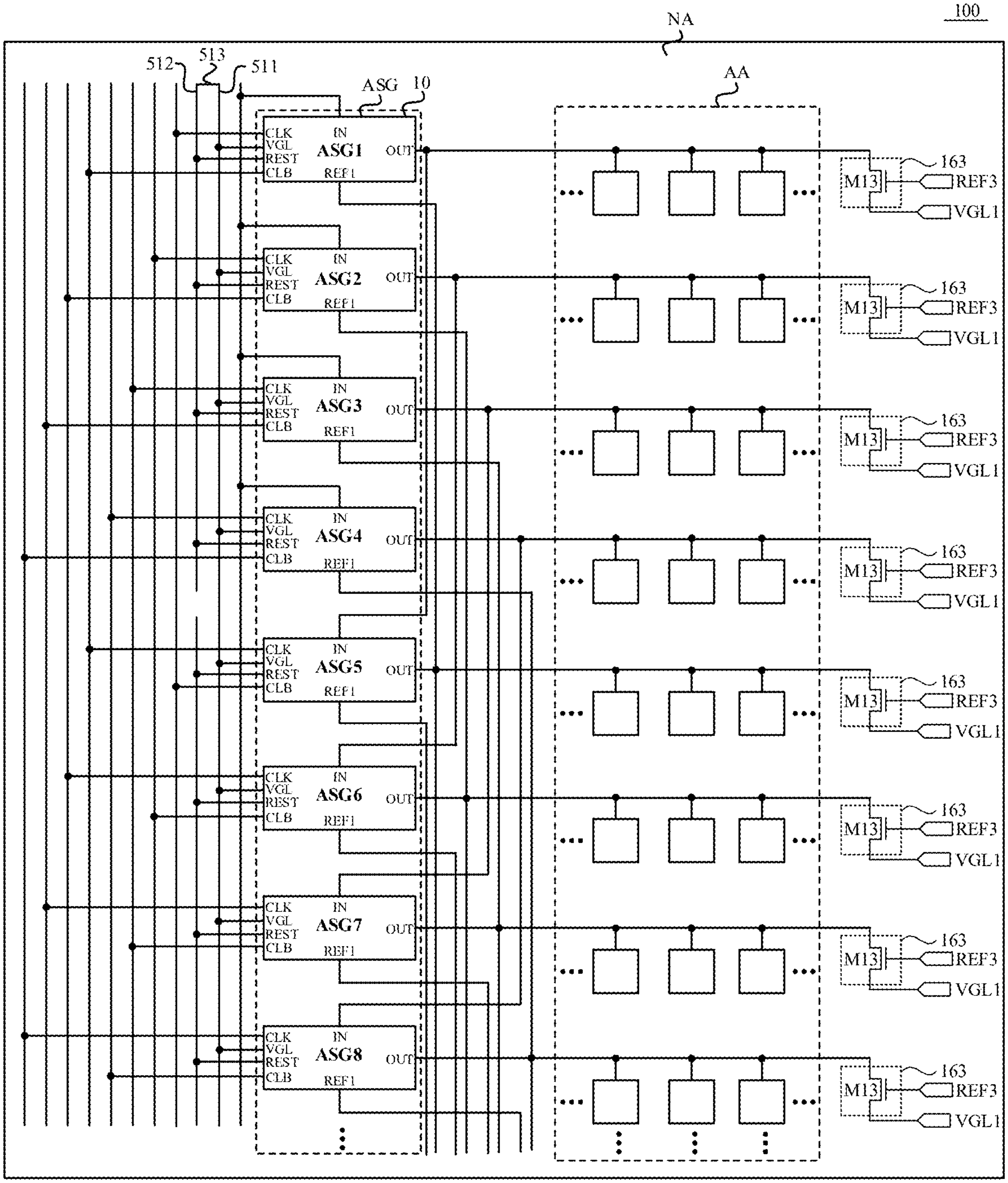
FIG. 43 is a schematic structural view of yet another display panel according to embodiments of the present application.

Based on the above embodiment, optionally, FIG. 42 is a schematic structural view of yet another shift register unit according to embodiments of the present application, and FIG. 43 is a schematic structural view of yet another display panel according to embodiments of the present application; referring to FIG. 42 and FIG. 43, the shift register unit ASG further includes the third reset module 163 and the third reset signal terminal REF3, the third reset module 163 is electrically connected to the third reset signal terminal REF3, the third level terminal VGL1, and the second side signal output terminal, and the signal output terminal OUT of the shift register unit ASG is the first side signal output terminal.

The third reset module 163 may control the signal of the second side signal output terminal based on the third reset signal Vref3 of the third reset signal terminal REF3 and the third level signal Vgl1 of the third level terminal VGL1; for example, when the third reset signal Vref3 is at the active level, the third reset module 163 may transmit the third level signal Vgl1 to the second side signal output terminal to reset the second side signal output terminal; conversely, when the third reset signal Vref3 is at the inactive level, the third reset module 163 stops resetting the second side signal output.

In an exemplary embodiment, the third reset module 163 may include the thirteenth transistor M13, the gate of the thirteenth transistor M13 may be electrically connected to the third reset signal terminal REF3, the first electrode of the thirteenth transistor M13 may be electrically connected to the third level terminal VGL1, and the second electrode of the thirteenth transistor M13 may be electrically connected to the second side signal output terminal, so that the third reset signal Vref3 of the third reset signal terminal REF3 may control the thirteenth transistor M13 to be turned on or turned off, and when the thirteenth transistor M13 is turned on, the third level signal Vgl1 of the third level terminal VgL1 may be transmitted to the second side signal output terminal to reset the second side signal output terminal.

Still referring to FIG. 42 and FIG. 43, the display panel 100 further includes the plurality of gate signal lines 31 and the plurality of pixels 20, the gate signal lines 31 are electrically connected to the pixels 20, and the gate signal lines 31 are electrically connected to the first side signal output terminals OUT and the second side signal output terminals; and along the extending direction of the gate signal lines 31, the output modules 120 of the shift register units ASG and the third reset modules 163 are located at two opposite sides of the gate signal lines 31, respectively.

Since the gate signal line 31 is electrically connected to the first side signal output terminal OUT and the second side signal output terminal, that is, the first side signal output terminal OUT is electrically connected to the second side signal output terminal by the gate signal line 31, the signal of the first side signal output terminal OUT is maintained consistent with the signal of the second side signal output terminal to ensure that the gate signal line 31 can stably transmit the corresponding gate driving signal. The output module 120 may transmit the first clock signal CK to the first side signal output terminal OUT under the control of the signal of the first node PU, so that the gate driving signal Gout which is output by the first side signal output terminal OUT can be consistent with the first clock signal CK; and the third reset module 163 can transmit the third level signal Vgl1 to the second side signal output terminal under the control of the third reset signal Vref3 to reset the second side signal output terminal. In this way, when the output module 120 transmits the inactive level of the first clock signal CK, the third reset signal Vref3 can control the third reset module 163 to transmit the third level signal Vgl1 to the second side signal output terminal to reset the second side signal output terminal, so that the first side signal output terminal OUT and the second side signal output terminal at two ends of the gate signal line 31 can receive the inactive level of the gate driving signal Gout at the same time to achieve the quick reset of the gate driving signal Gout which is transmitted by the gate signal line 31, and the gate driving signal Gout which are transmitted by the gate signal line 31 can quickly change to the inactive level.

Further, when the shift register unit ASG further includes the second reset module 162 and the second reset signal terminal REF2, the signal output terminal OUT of the (i+N)-th stage of shift register unit ASGi+N may be electrically connected to the second reset signal terminal REF2 of the i-th stage of shift register unit ASGi, so that the gate driving signal Gouti+N which is output by the (i+N)-th stage of shift register unit ASGi+N may be used as the second reset signal Vref2 of the i-th stage of shift register unit ASGi to control the second reset module 162 in the i-th stage of shift register unit ASGi to reset the first side signal output terminal OUT thereof, that is, to reset the gate driving signal Gout which is transmitted by the gate signal line 31; under this condition, the second side signal output terminal of the shift register unit ASG is provided with the third reset module 163, and the third reset module 163 is configured to reset the gate driving signal Gout which is transmitted by the gate signal line 31 from the gate signal line 31 away from the first side signal output terminal OUT, which can be beneficial for reducing the load amount on the clock signal line which is electrically connected to the (i+N)-th stage of shift register unit ASGi+N.

It may be understood that when transmitting the third level signal Vgl1 of the third level terminal VGL1 to the second side signal output terminal, the third reset module 163 can reset the second side signal output terminal, and the third level signal Vgl1 may be maintained consistent with the inactive level of the gate driving signal Gout which is transmitted by the gate signal line 31. The third level signal Vgl1 of the third level terminal VGL1 may be the same as or different from the first level signal Vgl of the first level terminal VGL, which may be specifically provided based on actual needs and is not specifically limited by the embodiments of the present application.

It should be noted that the example in which the driver circuit 10 is located in the non-display area NA at a side of the display area AA is given above only as an example; in the embodiments of the present application, the specific arrangement of the driver circuit 10 may be designed based on actual needs, for example, the driver circuit 10 may also be located in the display area AA, and under this condition, the narrow bezel of the display panel may be achieved; in other optional embodiments, the driver circuit may also be distributed in the non-display area NA on two opposite sides of the display area AA, so that the non-display area NA on two opposite sides of the display area AA have the approximately same dimension, which is beneficial for the appearance of the display panel 100.

Figure 44:
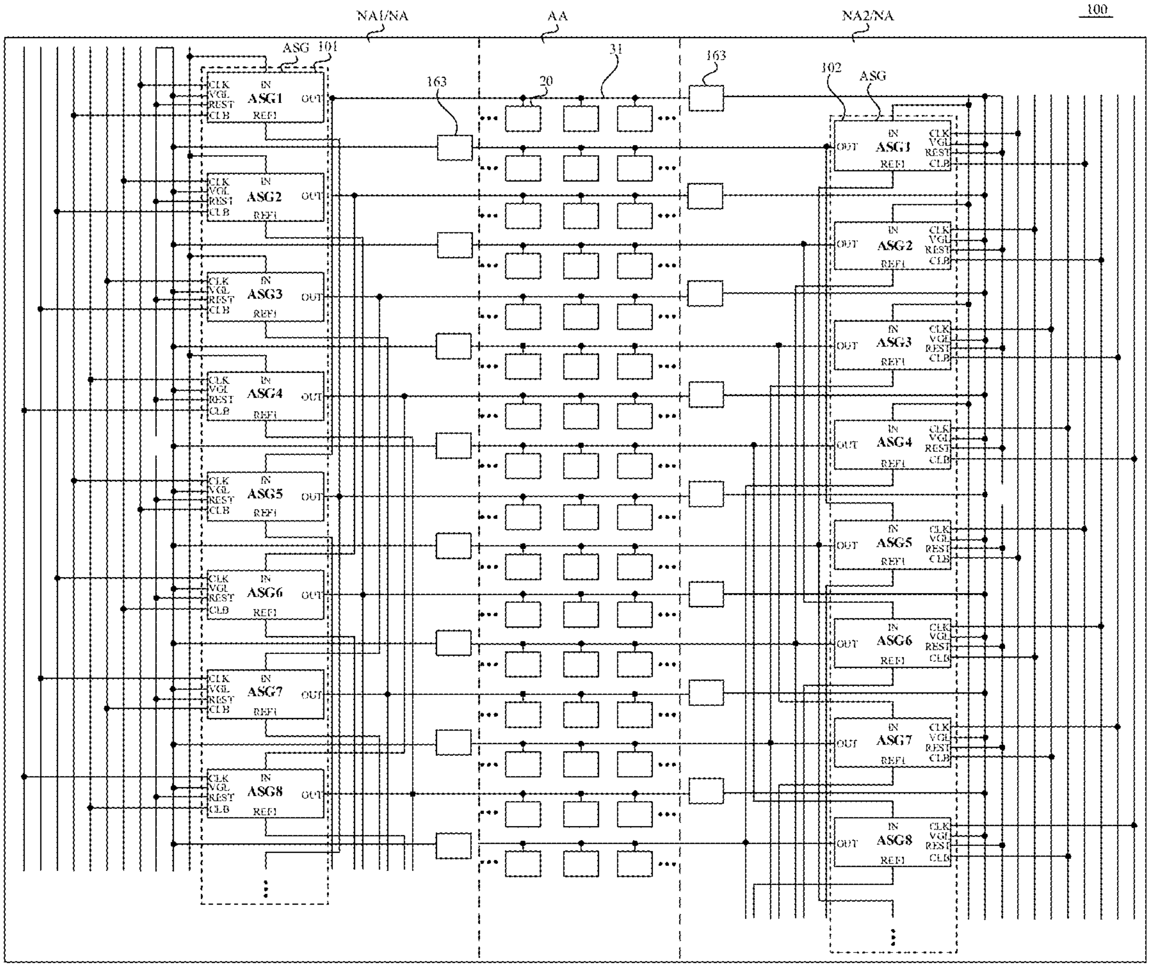
FIG. 44 is a schematic structural view of yet another display panel according to embodiments of the present application.

In an example, FIG. 44 is a schematic structural view of yet another display panel according to embodiments of the present application; as shown in FIG. 44, the driver circuit may include the first driver circuit 101 and the second driver circuit 102, and the first driver circuit 101 and the second driver circuit 102 are located in the non-display area NA on two opposite sides of the display area AA, respectively, that is, the first driver circuit 101 is located in the first non-display area NA1, and the second driver circuit 102 is located in the second non-display area NA2; in this way, by providing the first driver circuit 101 in the first non-display area NA1 and providing the second driver circuit 102 in the second non-display area NA2, the dimension of the first non-display area NA1 may be the same as the dimension of the second non-display area NA2, that is, the dimensions of the bezels on two opposite sides of the display area AA of the display panel 100 are the same, which is beneficial for improving the display uniformity of the display panel 100.

Further, when the shift register units ASG include the third reset modules 163, the third reset modules 163 of the shift register units ASG in the first driver circuit 101 may be located in the second non-display area NA2, and the third reset modules 163 of the shift register units ASG in the second driver circuit 102 may be located in the first non-display area NA1; under this condition, the third level signal terminals VGL1 of the shift register units ASG in the first driver circuit 101 and the first level signal terminals VGL of the shift register units ASG in the second driver circuit 102 may be electrically connected to the same first level signal line, and the third level signal terminals VGL1 of the shift register units ASG in the second driver circuit 102 and the first level signal terminals VGL of the shift register units ASG in the first driver circuit 101 may be electrically connected to the same first level signal line; in this way, the number of the signal lines which are provided in the non-display area NA may be reduced, which is beneficial for reducing the dimension of the non-display area NA while reducing the number of the signals which are provided to the driver circuits, and reducing the control cost of the driver circuit.

Figure 45:
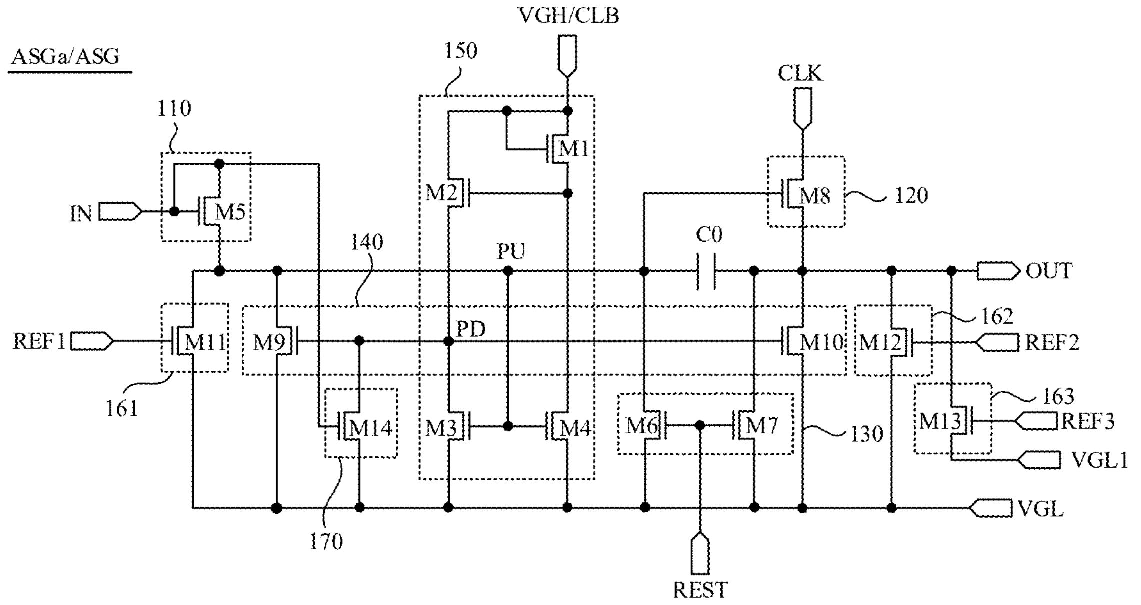
FIG. 45 is a schematic structural view of yet another shift register unit according to embodiments of the present application.

Based on the above embodiment, optionally, FIG. 45 is a schematic structural view of yet another shift register unit according to embodiments of the present application; as shown in FIG. 45, the shift register unit ASG further includes the noise reduction module 170; in the same shift register unit ASG, the noise reduction module 170 is electrically connected to the signal input terminal IN, the first level terminal VGL, and the second node PD.

The noise reduction module 170 may control the signal of the second node PD based on the input signal Vin of the signal input terminal IN and the first level signal Vgl of the first level terminal VGL; for example, when the input signal Vin of the signal input terminal IN is at the active level, the noise reduction module 170 may control the first level signal Vgl to be transmitted to the second node PD to control the signal of the second node PD to be at the inactive level; conversely, when the input signal Vin of the signal input IN is at the inactive level, the noise reduction module 170 may stop transmitting the first level signal Vgl to the second node PD, so that the signal of the second node PD may be controlled by the pull-down control module 150. In this way, by providing the noise reduction module 170, the second node PD can be controlled to be at the inactive level when the input signal Vin is at the active level, that is, the pull-down module 140 is controlled to stop operating, so that the signal of the first node PU is not easily affected by the signal of the second node PD, increasing the competitiveness of the first node PU.

In an exemplary embodiment, still referring to FIG. 45, the noise reduction module 170 may include the fourteenth transistor M14, the gate of the fourteenth transistor M14 may be electrically connected to the signal input terminal IN, the first electrode of the fourteenth transistor M14 may be electrically connected to the first level terminal VGL, and the second electrode of the fourteenth transistor M14 may be electrically connected to the second node PD; in this way, the input signal Vin of the signal input terminal IN may control the fourteenth transistor M14 to be turned on or turned off, and when the fourteenth transistor M14 is turned on, the first level signal Vgl may be transmitted to the second node PD to ensure that the second node PD is maintained at the inactive level in the time period during which the first node PU is at the active level.

Figure 46:
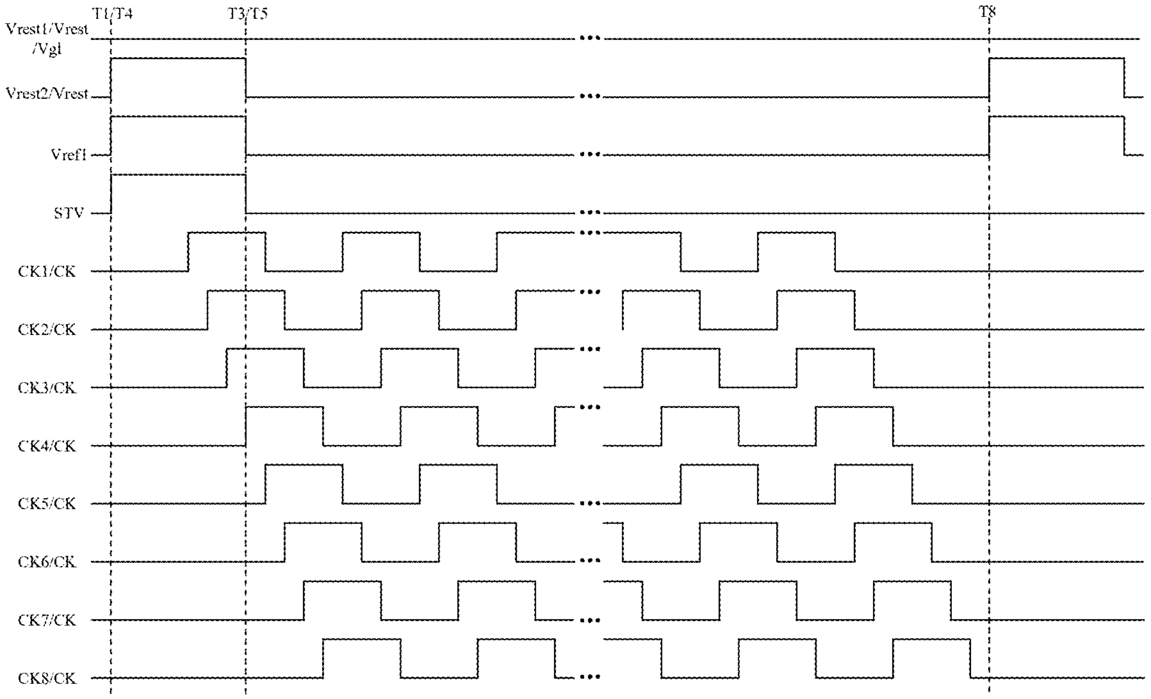
FIG. 46 is a driving time sequence chart of yet another display panel according to embodiments of the present application.

Based on the above embodiment, optionally, FIG. 46 is a driving time sequence chart of yet another display panel according to embodiments of the present application; referring to FIG. 44 to FIG. 46, the restoration signal Vrest2 which is received by the second shift register units further includes the second active pulse; the operation processes of the display panel 100 include the frame period which includes the first active pulse and the second active pulse; and the starting moment T8 of the second active pulse is after the terminating moments of the active pulses of the gate driving signals Gout which are output by the stages of shift register units ASG.

The restoration modules 130 of the second shift register units transmit the first level signal Vgl to the first nodes PU and the signal output terminals OUT under the control of the first active pulse of the restoration signal Vrest2 which is received thereby, so that the output noise of the signal output terminals OUT of the second shift register units may be reduced; after the gate driving signals Gout which are output by the stages of shift register units ASG, the restoration modules 130 of the second shift register units again transmit the first level signal Vgl to the first nodes PU and the signal output terminals OUT under the control of the second active pulse of the restoration signal Vrest2 which is received thereby, so that the first nodes PU and the signal output terminals OUT may be maintained at the inactive level to prepare for the next frame period.

The time length of the first active pulse may be the same as or different from the time length of the second active pulse, which may be provided based on actual needs and is not specifically limited by the embodiments of the present application. In an optional embodiment, still referring to FIG. 44 to FIG. 46, the time length of the first active pulse may be greater than or equal to the time length of the second active pulse, in this way, it may be ensured that the first active pulse may have a sufficiently long duration to control the restoration modules 130 to transmit the first level Vgl to the first nodes PU and the signal outputs OUT, and the second active pulse may have a relatively small duration to reduce the occupation duration of the second active pulse, ensuring the display effect of the display panel 100.

Optionally, when the second shift register units include the dummy shift registers, the starting moment of the second active pulse may be after the terminating moments of the active pulses of the gate driving signals Gout which are output by the dummy shift registers to ensure that the dummy shift register units can accurately output the active level of the gate driving signals Gout, so that the active level of the gate driving signals Gout which are output by the dummy shift register units can accurately control the first reset modules 161 in the driving shift register units to accurately reset the first nodes PU thereof, which is beneficial for increasing the accuracy of the gate driving signals Gout which are output by the stages of shift register units ASG.

Based on the same inventive concept, the embodiments of the present application further provide a method for driving a display panel, and the method for driving a display panel is used for driving the display panel according to the embodiments of the present application; and the display panel may include the driver circuit, the driver circuit includes the plurality of stages of shift register units and receives the start control signal, the restoration signal, and the clock signal; and the operation processes of the display panel include the frame period. The method includes: in the frame period, the start control signal includes the start control pulse, the restoration signal includes the first active pulse, and the clock signal includes the starting active pulse; the first active pulse is the same as the start control pulse; and the starting moment of the starting active pulse is later than the starting moment of the start control pulse.

The start control pulse of the start control signal which is received by the driver circuit is the same as the first active pulse of the restoration signal, so that the first active pulse of the restoration signal can be provided to the driver circuit while the start control pulse of the start control signal is provided to the driver circuit; and the output noise of the signal output terminals of the stages of shift register units in the driver circuit can be reduced by the first active pulse of the restoration signal, so that the accuracy of the gate driving signals which are output by the stages of shift register units is increased, which is beneficial for improving the display effect of the display panel.

It may be understood that the method for driving a display panel according to the embodiments of the present application is used for driving the display panel according to the embodiments of the present application, therefore, the method for driving a display panel has the relevant steps for controlling the display of the display panel according to the embodiments of the present application and can achieve the same technical principles as those of the display panel according to the embodiments of the present application, and for common features, reference may be made to the above description, which is not repeated here.

Based on the same inventive concept, the embodiments of the present application further provide a display apparatus which includes the display panel according to the embodiments of the present application. Therefore, the display apparatus has the technical features of the display panel according to the embodiments of the present application and can achieve beneficial effects of the display panel according to the embodiments of the present application, and for common features, reference may be made to the above description of the display panel according to the embodiments of the present application, which is not be repeated here.

Figure 47:
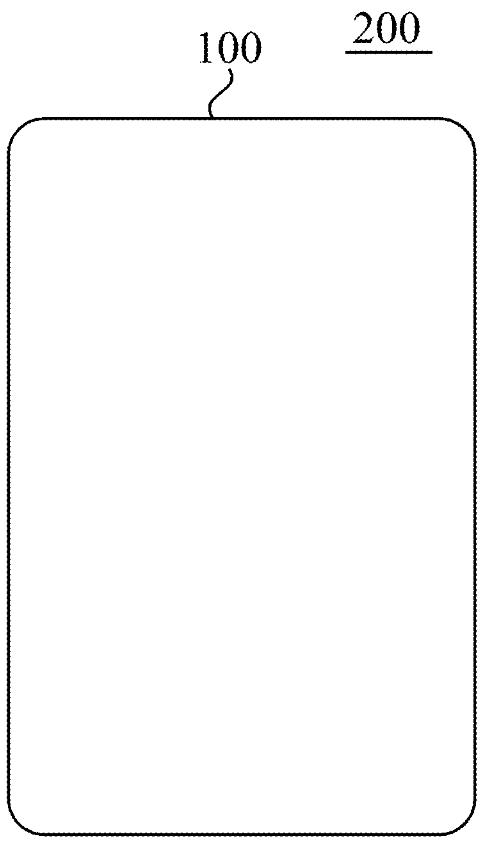
FIG. 47 is a schematic structural view of a display apparatus according to embodiments of the present application.

In an example, FIG. 47 is a schematic structural view of a display apparatus according to embodiments of the present application; as shown in FIG. 47, the display apparatus 200 includes the display panel 100. The display apparatus according to the embodiments of the present application may be any electronic product with the display function, including, but not limited to, the following categories: mobile phones, televisions, notebook computers, desktop displays, tablet computers, digital cameras, smart bracelets, smart glasses, vehicle-mounted displays, medical equipment, industrial control equipment, touch interactive terminals, and the like, which are not specifically limited in the embodiments of the present application.

It is noted that the above is only preferred embodiments of the present application and the technical principles applied. Those skilled in the art will understand the present application is not limited to the particular embodiments described herein, and that various obvious changes, rearrangements and substitutions may be made by those skilled in the art without departing from the scope of the present application. Therefore, although the present application has been described in considerable detail with reference to the above embodiments, the present application is not merely limited to the above disclosed embodiments and, without departing from the concept of the present application, further includes more other equivalent embodiments. Further, the scope of the present application is defined by the appended claims.

What is claimed is:

1. A display panel comprising:

a driver circuit, the driver circuit comprising a plurality of stages of shift register units which each comprise an input module, an output module, a signal input terminal, a first clock terminal, a first level terminal, and a signal output terminal;

in each of the shift register units, the input module being electrically connected to the signal input terminal and the output module, and the input module and the output module being electrically connected to a first node; the output module being electrically connected to the first node, the first clock terminal, and the signal output terminal; the first clock terminal being configured to receive a first clock signal; and the first level terminal being configured to receive a first level signal;

at least a part of the shift register units being first-type shift register units which each further comprise a restoration module and a restoration signal terminal; in each of the first-type shift register units, the restoration module being electrically connected to the restoration signal terminal and the first level terminal, and the restoration module being further electrically connected to the first node and/or the signal output terminal; and the restoration signal terminal being configured to receive a restoration signal;

the signal output terminal of the i-th stage of the shift register units being electrically connected to the signal input terminal of the (i+N)-th stage of the shift register units, where i and N are both positive integers;

a plurality of stages of the first-type shift register units comprising at least one stage of first shift register unit and at least one stage of second shift register unit;

the restoration signal of the second shift register unit comprising a first active pulse, and at least within a time period in which the first active pulse of the restoration signal of the second shift register unit is, the restoration signal of the first shift register unit being at an inactive level; and a starting moment of the first active pulse being before a starting moment of a starting active pulse of the first clock signal of the at least one stage of first shift register unit; and wherein a first level signal line and a restoration signal line which are insulated from each other; the first level terminal of the at least one stage of first shift register unit and the first level terminal of the at least one stage of second shift register unit being both electrically connected to the first level signal line; the restoration signal terminal of the at least one stage of first shift register unit being electrically connected to the first level signal line; and the restoration signal terminal of the at least one stage of second shift register unit being electrically connected to the restoration signal line.

2. The display panel according to claim 1, wherein the first active pulse overlaps the starting active pulse of the first clock signal of the at least one stage of first shift register unit.

3. The display panel according to claim 1, wherein the first stage of the first-type shift register units to the L-th stage of the first-type shift register units are the first shift register units, and L is a positive integer; and the starting moment of the first active pulse is before a starting moment of the starting active pulse of the first clock signal which is received by the first stage of the first-type shift register units.

4. The display panel according to claim 1, further comprising: a start signal line for transmitting a start control signal; and the signal input terminals of the first stage of the shift register units to the N-th stage of the shift register units being all electrically connected to the start signal line.

5. The display panel according to claim 4, wherein a starting moment of an active pulse of the start control signal is before a starting moment of a starting active pulse of the first clock signal which is received by the first stage of the shift register units, and a terminating moment of the active pulse of the start control signal is before a terminating moment of the starting active pulse of the first clock signal which is received by the first stage of the shift register units.

6. The display panel according to claim 4, wherein a time length of a clock cycle of the first clock signal is 2*N*H, and a time length of an active pulse of the first clock signal is N*H, where H is one clock unit time length; and a time interval between the starting moment of the active pulse of the start control signal and the starting moment of the starting active pulse of the first clock signal which is received by the first stage of the shift register units is greater than or equal to N*H.

7. The display panel according to claim 4, wherein the starting moment of the first active pulse and the starting moment of the active pulse of the start control signal are the same moment.

8. The display panel according to claim 1, wherein a duration of the first active pulse overlaps durations of the active pulses of the first clock signals of the first stage of the shift register units to the M-th stage of the shift register units, and the duration of the first active pulse does not overlap a duration of an active pulse of the first clock signal of the (M+1)-th stage of the shift register units, where $M \leq N$, and M is a positive integer; and the first stage of the shift register units to the (M+N)-th stage of the shift register units are all the first shift register units.

9. The display panel according to claim 1, wherein a duration of the first active pulse overlaps durations of the active pulses of the first clock signals of the first stage of the shift register units to the P-th stage of the shift register units, and the duration of the first active pulse does not overlap a duration of an active pulse of the first clock signal of the (P+1)-th stage of the shift register units, where N<P≤2N, ≤ and P is a positive integer; and the first stage of the shift register units to the (P+N)-th stage of the shift register units are all the first shift register units.

10. The display panel according to claim 1, wherein the shift register units each further comprise a pull-down module and a pull-down control module; in a same one of the shift register units, the pull-down control module is electrically connected to at least the first node, a second node, and the first level terminal; and the pull-down module is electrically connected to the first level terminal, the second node, the first node, and the signal output terminal; the pull-down control module comprises a first transistor, a second transistor, a third transistor, and a fourth transistor; a first electrode of the first transistor is connected to a first signal terminal, a second electrode of the first transistor is connected to a gate of the second transistor, and a gate of the first transistor is connected to a second signal terminal; a first electrode of the second transistor is connected to a third signal terminal, and a second electrode of the second transistor is connected to the second node; gates of the third transistor and the fourth transistor are both electrically connected to the first node; a first electrode of the third transistor and a first electrode of the fourth transistor are both electrically connected to the first level terminal; a second electrode of the third transistor is electrically connected to the second node, and a second electrode of the fourth transistor is electrically connected to the gate of the second transistor; the shift register units each further comprise a second clock terminal which is electrically connected to the second clock terminal and is configured to receive a second clock signal; and the first signal terminal and the third signal terminal are both electrically connected to the second clock terminal; or the shift register units each further comprise a second level terminal which is configured to receive a second level signal, and the first signal terminal and the third signal terminal are both electrically connected to the second level terminal; or the shift register units each further comprise a second level terminal which is configured to receive a second level signal, and the first signal terminal, the second signal terminal, and the third signal terminal are all electrically connected to the second level terminal.

11. The display panel according to claim 1, wherein the restoration module comprises: a sixth transistor, a first electrode of the sixth transistor being electrically connected to the first level terminal, a second electrode of the sixth transistor being electrically connected to the first node, and a gate of the sixth transistor being electrically connected to the restoration signal terminal; and/or, a seventh transistor, a first electrode of the seventh transistor being electrically connected to the first level terminal, a second electrode of the seventh transistor being electrically connected to the signal output terminal, and a gate of the seventh transistor being electrically connected to the restoration signal terminal.

12. The display panel according to claim 1, wherein the shift register units each further comprise a first reset module and a first reset signal terminal; in a same one of the shift register units, the first reset module is electrically connected to the first reset signal terminal, the first level terminal, and the first node; the first reset signal terminal is configured to receive a first reset signal; at least part of a duration of an active pulse of a gate driving signal which is output by the signal output terminal does not overlap a duration of an active pulse of the first reset signal; the first reset signal terminal of the i-th stage of the shift register units is electrically connected to the signal output terminal of the j-th stage of the shift register units, where j>i, and i and j are both positive integers; and j=i+orj=i+1.

13. The display panel according to claim 1, wherein the shift register units each further comprise a third reset module and a third reset signal terminal, the third reset module is electrically connected to the third reset signal terminal, the third level terminal, and a second side signal output terminal, and the signal output terminal of each of the shift register units is a first side signal output terminal; the display panel further comprises a plurality of gate signal lines and a plurality of pixels, the gate signal lines are electrically connected to the pixels, and the gate signal lines are electrically connected to the first side signal output terminals and the second side signal output terminals; and along an extension direction of the gate signal lines, the output modules and the third reset modules of the shift register units are located on two opposite sides of the gate signal lines, respectively.

14. The display panel according to claim 1, wherein the display panel further comprises a plurality of gate signal lines, a plurality of pixels, and a first reset signal line, and the gate signal lines are electrically connected to the pixels; the second shift register units comprise a driving shift register unit and a dummy shift register unit, the driving shift register unit provides a gate driving signal to the gate signal lines, and the dummy shift register unit does not provide a gate driving signal to the gate signal lines; the driving shift register unit and the dummy shift register unit each further comprise a first reset module and a first reset signal terminal; in a same one of the shift register units, the first reset module is electrically connected to the first reset signal terminal, the first level terminal, and the first node; the i-th stage of the shift register units is the driving shift register unit, and the first reset signal terminal of the i-th stage of the shift register units is electrically connected to the signal output terminal of the j-th stage of the shift register units, where i and j are both positive integers, and i+N≤j<i+2N; the p-th stage of the shift register units is the dummy shift register unit, and the first reset signal terminal of the p-th stage of the shift register units is electrically connected to the first reset signal line, where p is a positive integer; and the first reset signal line provides a reset active pulse which is the same as the first active pulse.

15. The display panel according to claim 1, wherein the restoration signal which is received by the second shift register units further comprises a second active pulse; an operation process of the display panel comprises a frame period which comprises the first active pulse and the second active pulse; and a starting moment of the second active pulse is after a terminating moment of an active pulse of a gate driving signal which is output by each of the stages of shift register units.

16. A display panel, comprising:

a driver circuit, a first restoration signal line, and a second restoration signal line;

the driver circuit comprising a plurality of stages of shift register units which each comprise an input module, an output module, a signal input terminal, a first clock terminal, a first level terminal, and a signal output terminal;

in each of the shift register units, the input module being electrically connected to the signal input terminal and the output module, and the input module and the output module being electrically connected to a first node; the output module being electrically connected to the first node, the first clock terminal, and the signal output terminal; the first level terminal being configured to receive a first level signal; and the first clock terminal being configured to receive a first clock signal;

at least a part of the shift register units being first-type shift register units which each further comprise a restoration module and a restoration signal terminal; in each of the first-type shift register units, the restoration module being electrically connected to the restoration signal terminal and the first level terminal, and the restoration module being further electrically connected to the first node and/or the signal output terminal; and the restoration signal terminal being configured to receive a restoration signal;

a plurality of stages of the first-type shift register units comprising at least one stage of first shift register unit and at least one stage of second shift register unit;

the restoration signal terminal of the first shift register unit being electrically connected to the first restoration signal line; and the restoration signal terminal of the second shift register unit being electrically connected to the second restoration signal line;

the first restoration signal line and the second restoration signal line are insulated from each other; and a first level signal line, the first level terminal of the at least one stage of first shift register unit and the first level terminal of the at least one stage of second shift register unit being both electrically connected to the first level signal line; and the first restoration signal line being electrically connected to the first level signal line.

17. A display apparatus, comprising a display panel, the display panel comprising:

a driver circuit, the driver circuit comprising a plurality of stages of shift register units which each comprise an input module, an output module, a signal input terminal, a first clock terminal, a first level terminal, and a signal output terminal;

in each of the shift register units, the input module being electrically connected to the signal input terminal and the output module, and the input module and the output module being electrically connected to a first node; the output module being electrically connected to the first node, the first clock terminal, and the signal output terminal; the first clock terminal being configured to receive a first clock signal; and the first level terminal being configured to receive a first level signal;

at least a part of the shift register units being first-type shift register units which each further comprise a restoration module and a restoration signal terminal; in each of the first-type shift register units, the restoration module being electrically connected to the restoration signal terminal and the first level terminal, and the restoration module being further electrically connected to the first node and/or the signal output terminal; and the restoration signal terminal being configured to receive a restoration signal;

the signal output terminal of the i-th stage of the shift register units being electrically connected to the signal input terminal of the (i+N)-th stage of the shift register units; and i and N being both positive integers;

a plurality of stages of the first-type shift register units comprising at least one stage of first shift register unit and at least one stage of second shift register unit; and the restoration signal of the second shift register unit comprising at least a first active pulse, and at least within a time period in which the first active pulse of the restoration signal of the second shift register unit is, the restoration signal of the first shift register unit being at an inactive level;

a starting moment of the first active pulse being before a starting moment of a starting active pulse of the first clock signal of the at least one stage of first shift register unit; and a first level signal line, the first level terminal of the at least one stage of first shift register unit and the first level terminal of the at least one stage of second shift register unit being both electrically connected to the first level signal line; and the first restoration signal line being electrically connected to the first level signal line.

* * * * *